United States Patent [19]

Cahill, III

[11] Patent Number: 5,682,179
[45] Date of Patent: Oct. 28, 1997

[54] HORIZONTALLY SCALING IMAGE SIGNALS ACCORDING TO A SELECTED SCALING MODE

[75] Inventor: Benjamin M. Cahill, III, Ringoes, N.J.

[73] Assignee: Intel Corporation, Santa Clara, Calif.

[21] Appl. No.: 253,866

[22] Filed: Jun. 3, 1994

Related U.S. Application Data

[63] Continuation of Ser. No. 86,636, Jul. 1, 1993, abandoned.

[51] Int. Cl.$^6$ .................................................. G09G 5/00
[52] U.S. Cl. ................................. 345/127; 395/139
[58] Field of Search ............................ 345/127–131, 345/202, 132, 138, 118, 119, 189, 191; 395/139, 164; 348/580–581, 451–453; 382/44, 47

[56] References Cited

U.S. PATENT DOCUMENTS

| | | |
|---|---|---|
| 4,107,665 | 8/1978 | Mayer et al. . |
| 4,703,230 | 10/1987 | Yamagami . |
| 4,855,831 | 8/1989 | Miyamoto et al. . |
| 4,975,976 | 12/1990 | Kimata et al. . |
| 5,001,469 | 3/1991 | Pappas et al. . |
| 5,068,905 | 11/1991 | Hackett et al. . |
| 5,081,450 | 1/1992 | Lucas et al. . |
| 5,237,432 | 8/1993 | Calarco et al. . |
| 5,335,295 | 8/1994 | Ferracini et al. ............... 382/47 |
| 5,343,238 | 8/1994 | Takata et al. . |
| 5,384,912 | 1/1995 | Ogrinc et al. . |
| 5,400,051 | 3/1995 | Krueger, Jr. . |
| 5,487,172 | 1/1996 | Hyatt ........................ 395/800 |

*Primary Examiner*—Steven Saras
*Attorney, Agent, or Firm*—Steve Mendelsohn; William H. Murray

[57] ABSTRACT

A plurality of image signals corresponding to an image are received. One or more first-sum signals are generated by adding together one or more pairs of image signals and one or more second-sum signals are generated by adding together one or more pairs of the first-sum signals. One or more first-average signals are generated in accordance with the first-sum signals and one or more second-average signals are generated in accordance with the second-sum signals. The image signals, the first-average signals, and the second-average signals are selectively stored into a plurality of registers in accordance with the selection of a mode of operation of a plurality of modes of operation.

18 Claims, 30 Drawing Sheets

|   | (0) | | | | (1) | | | | (2) | | | |
|---|---|---|---|---|---|---|---|---|---|---|---|---|
|   | 0 | 1 | 2 | 3 | 4 | 5 | 6 | 7 | 8 | 9 | 10 | 11 |
| (0) 0 | YUV | Y | Y | Y | YUV | Y | Y | Y | YUV | Y | Y | Y |
| 1 | Y | Y | Y | Y | Y | Y | Y | Y | Y | Y | Y | Y |
| 2 | Y | Y | Y | Y | Y | Y | Y | Y | Y | Y | Y | Y |
| 3 | Y | Y | Y | Y | Y | Y | Y | Y | Y | Y | Y | Y |
| (1) 4 | YUV | Y | Y | Y | YUV | Y | Y | Y | YUV | Y | Y | Y |
| 5 | Y | Y | Y | Y | Y | Y | Y | Y | Y | Y | Y | Y |
| 6 | Y | Y | Y | Y | Y | Y | Y | Y | Y | Y | Y | Y |
| 7 | Y | Y | Y | Y | Y | Y | Y | Y | Y | Y | Y | Y |

HORIZONTALLY SCALING IMAGE SIGNALS ACCORDING TO A SELECTED SCALING MODE

This is a continuation of application Ser. No. 08/086,636 filed on Jul. 1, 1993 is now abandoned.

BACKGROUND OF THE INVENTION

1. Field of the Invention

The present invention relates to image signal processing, and, in particular, to systems for capturing, compressing, decompressing, and displaying digital images.

2. Description of the Related Art

It is desirable to provide a flexible video system for the capture, compression, decompression, and display of motion video images in a personal computer (PC) environment in real time. Such a video system is preferably capable of supporting a variety of operating modes such as the pass-through, compression, and playback modes.

In pass-through mode, a video generator (e.g., a video camera) generates video images that are processed by the video system for real-time display on a display monitor. In compression mode, the video images are compressed by the video system in real-time for storage in a mass storage device (e.g., a computer hard disk). In playback mode, compressed video images stored in a mass storage device (e.g., a CD-ROM) are decompressed and processed by the video system for display on a display monitor.

Moreover, the video system is preferably capable of displaying video images into specified windows on the display screen. This typically involves scaling and positioning all or part of the display image into the desired display window. The video system also preferably supports the merging of video images with images from graphics processors, such as an IBM Video Graphics Array (VGA) processor or a VGA compatible processor.

Referring now to FIG. 1, there is shown a block diagram of a video system 100 that performs the above-described functions. Video system 100 is exemplary of conventional video systems that implement the pass-through, compression, and playback modes. In pass-through mode, video signals generated by video generator 106 are processed by an Intel® ActionMedia-II® subsystem 108 for display on display monitor 110. In compression mode, ActionMedia-II® subsystem 108 compresses the video data for access by host processor 102 and for storage to mass storage device 104 via host bus 114. In playback mode, host processor 102 accesses compressed video images stored in mass storage device 104 and transmits the compressed data via host bus 114 to ActionMedia-II® subsystem 108, which decompresses and processes the video data for display on display monitor 110. In either pass-through or playback mode, the video images may be optionally merged with images from graphics processor 112.

Referring now to FIG. 2, there is shown a block diagram of ActionMedia-II® subsystem 108 of video system 100. In pass-through mode, video decoder/digitizer 202 receives an analog video signal from video generator 106 of FIG. 1, decodes the analog video signal into three linear components (e.g., a luminance Y component and two chrominance U and V components), and digitizes each of the three linear component signals. The digitized data is then captured and stored to dual-port video random access memory (VRAM) 208 by capture/VRAM controller 204 via subsystem bus 216.

Pixel processor 206 then accesses the video data stored in VRAM 208, scales the data for display in the desired window of the display screen, and stores the scaled data back to VRAM 208. Display processor 210 then accesses the scaled bitmap data in VRAM 208 to generate video data for transmission to video/graphics merger 212, which optionally merges the video data with images from graphics processor 112 of FIG. 1 for display on display monitor 110.

In compression mode, the captured video data stored in VRAM 208 is accessed by pixel processor 206 via subsystem bus 216 for compression and then stored as compressed video data back to VRAM 208. Host interface 214 then accesses the compressed video data stored in VRAM 208 via subsystem bus 216 for transmission to host processor 102 of FIG. 1 via host bus 114 for storage in mass storage device 104 of FIG. 1.

In playback mode, host interface 214 receives compressed video data from host processor 102 via host bus 114 and stores the compressed data to VRAM 208 via subsystem bus 216. Pixel processor 206 then accesses the compressed data stored in VRAM 208, decompresses the compressed data, and stores a decompressed bitmap back to VRAM 208. Pixel processor 206 then accesses the decompressed bitmap data from VRAM 208, scales the decompressed data for display, and stores a scaled bitmap back to VRAM 208. Display processor 210 then accesses the scaled bitmap data in VRAM 208 to generate video data for transmission to video/graphics merger 212, which optionally merges the video data with images from graphics processor 112 of FIG. 1 for display on display monitor 110.

Although ActionMedia-II® subsystem 108 provides the above-described operating modes and functions effectively, it still has certain limitations. For example, ActionMedia-II® subsystem 108 creates and stores complete scaled bitmaps to memory (i.e., VRAM 208) before displaying the scaled data. Moreover, those scaled bitmaps contain background pixels that are outside of the active video window pixel region (i.e., the region corresponding to actual video data). Furthermore, the display scaling implemented by ActionMedia-II® subsystem 108 is not continuously variable in both horizontal-and vertical dimensions. In addition, ActionMedia-II® subsystem 108 does not provide display scaling with interpolation of all three video components in both the horizontal and vertical dimensions. This is due, in part, to the fact that the pixel processor of ActionMedia-II® subsystem 108 does not have the bandwidth to interpolate as it performs the copy/scale function. Nor does the pixel processor of ActionMedia-II® subsystem 108 have the bandwidth to scale up during normal processing rates of 30 frames per second.

In addition, ActionMedia-II® subsystem 108 contains display processor 210 and three gate arrays (capture/VRAM controller 204, host interface 214, and keying/audio processor 220). Furthermore, to meet the data bandwidth requirements for video system 100 and to store separate and entire bit streams for the compressed video data and bitmaps for the decompressed video data and the scaled video data, ActionMedia-II® subsystem 108 contains two megabytes of dual-port VRAM 208.

It is desirable to provide a video system for the capture, compression, decompression, and display of video images in a personal computer environment that does not create and store complete scaled bitmaps to memory before displaying the scaled data. Such a video system preferably scales only pixel data corresponding to the active video window pixel region. In addition, the display scaling implemented by the video system is preferably continuously variable in both horizontal and vertical dimensions. Moreover, the video system preferably provides display scaling with interpolation of all three video components in both the horizontal and vertical dimensions at normal processing rates of 30 frames per second. Furthermore, it is desirable that the video system not have multiple gate arrays and a display processor. It is also desirable that the video system not have a relatively large dual-port memory device.

It is accordingly an object of this invention to overcome the limitations of the known art and to provide a video system for the capture, compression, decompression, and display of video images in a personal computer environment, where the video system does not create and store complete scaled bitmaps to memory before displaying the scaled data.

It is a further object of the present invention to provide such a video system that scales only pixel data corresponding to the active video window pixel region.

It is a further object of the present invention to provide such a video system that implements continuously variable display scaling in both horizontal and vertical dimensions.

It is a further object of the present invention to provide such a video system that implements display scaling with interpolation of all three video components in both the horizontal and vertical dimensions at normal processing rates of 30 frames per second.

It is a further object of the present invention to provide a video system that meets the above-listed objects without having a relatively large dual-port memory device such as a VRAM.

It is a further object of the present invention to provide a video system that meets the above-listed objects without having multiple separate gate arrays and a separate display processor.

It is a further object of the present invention to provide such a video system with a relatively low gate count and therefore a lower cost.

Further objects and advantages of this invention will become apparent from the detailed description of a preferred embodiment which follows.

SUMMARY OF THE INVENTION

The present invention is a computer-implemented method, apparatus, horizontal scaler, subsystem, and system for horizontally scaling image signals. According to a preferred embodiment, a plurality of image signals corresponding to an image are received. One or more first-sum signals are generated by adding together one or more pairs of image signals and one or more second-sum signals are generated by adding together one or more pairs of the first-sum signals. One or more first-average signals are generated in accordance with the first-sum signals and one or more second-average signals are generated in accordance with the second-sum signals. The image signals, the first-average signals, and the second-average signals are selectively stored into a plurality of registers in accordance with the selection of a mode of operation of a plurality of modes of operation.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 16 is a representation of the component data for a (12×8) video frame in co-located YUV9 format;

DESCRIPTION OF THE PREFERRED EMBODIMENT(S)

Description of video system

Figure 3:
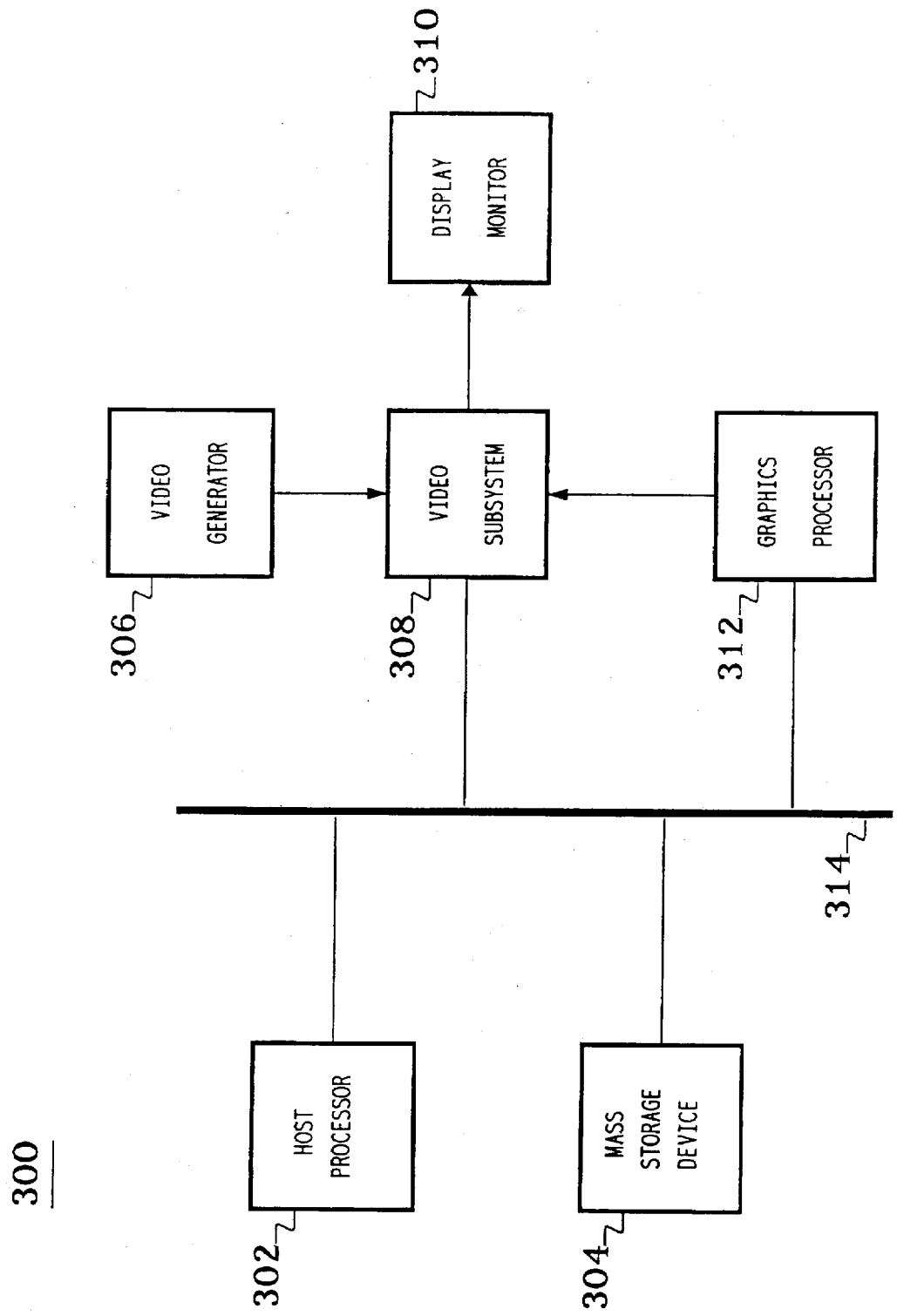
FIG. 3 is a block diagram of a video system according to a preferred embodiment of the present invention.

Referring now to FIG. 3, there is shown a block diagram of a video system 300 according to a preferred embodiment of the present invention. Video system 300 supports various modes of operation such as the pass-through, compression, and playback modes.

In pass-through mode, video generator 306 of video system 300 generates video images that are processed by video subsystem 308 for real-time display on display monitor 310. In particular, video generator 306 generates and transmits an analog video signal to video subsystem 308. Video subsystem 308 receives the analog video signal from video generator 306, processes (i.e., decodes, digitizes, filters, and scales) the video signal for display to a window of any size and position on display monitor 310, optionally merges the processed video data with images from graphics processor 312, and transmits the processed video signal to display monitor 310 for real-time display.

In compression mode, video generator 306 generates video images for capture and compression by video subsystem 308 and storage to mass storage device 304. In particular, the video images generated by video generator 306 are decoded, digitized, filtered, and compressed by video subsystem 308. The compressed video data are then transmitted to host processor 302 via host bus 314. Host processor 302 then stores the compressed video data to mass storage device 304 via host bus 314.

Video system 300 may be operated in both pass-through mode and compression mode at the same time. Under this dual-mode of operation, the captured video images are displayed in real time on display monitor 310 and compressed in real time for storage in mass storage device 304. Alternatively, video system 300 may be operated in compression mode with compression mode monitoring selected. Under compression mode monitoring, the compressed images, which are stored in mass storage device 304, are also decompressed and displayed in real time on display monitor 310. Those skilled in the art will understand that the generation of companded (i.e., decompressed) images is preferably an integral part of compression mode processing. In compression mode monitoring, video system 300 displays the companded images.

In playback mode, host processor 302 sends compressed video data to video subsystem 308 for decompression and display on display monitor 310. In a preferred embodiment, host processor 302 accesses compressed video data from mass storage device 304 via host bus 314 and transmits the compressed video data to video subsystem 308 via host bus 314. Video subsystem 308 decompresses the compressed video data, scales the decompressed video data, optionally merges the scaled video data with images from graphics processor 312, and transmits the scaled video data to display monitor 310 for display.

Host processor 302 may be any computer architecture system or conventional PC system such as an IBM PS/2 or AT PC, an Apple PC, a Sun workstation, or a compatible system. Host bus 314 may be a conventional data bus and is preferably an industry standard architecture (ISA) bus, an extended ISA (EISA) bus, a NU bus in a Apple Macintosh PC, or a VME or S bus in a Sun workstation.

Video system 300 may have more than one mass storage device 304. For example, video system 300 may have a hard drive and a CD ROM, where the hard drive receives compressed video data generated during compression mode and the CD ROM stores compressed video data used during playback mode.

Those skilled in the art will understand that, in alternative preferred embodiments of the present invention, host processor 302 may receive compressed data from sources other than mass storage devices and transmit compressed data to destinations other than mass storage devices. For example, compressed data could be received from and/or transmitted to a network or communications line, such as a T1 phone line, to support a video teleconferencing application.

Video generator 306 may be any source of analog video images such as a video camera, a VCR, or a laser disc player. Graphics processor 312 may be a conventional graphics processors, such as an IBM VGA processor or a VGA compatible processor. Display monitor 310 may be a conventional graphic display for a PC system such as a multi-sync or single-sync monitor, such as an IBM VGA or 8514A monitor.

As depicted in FIG. 3, video system 300 provides each of the three above-described modes of operation. In alternative preferred embodiments of the video system of the present invention, one or more of the subsystems of video system 300 depicted in FIG. 3 may be optional. For example, in video systems according to the present invention that operate only in pass-through mode, mass storage device 304 is optional. Similarly, display monitor 310 is optional in video systems that operate only in compression mode (without monitoring) and video generator 306 is optional in video systems that operate only in playback mode. Moreover, if graphics images are not merged with the video or otherwise displayed on display monitor 310, then graphics processor 312 is also optional.

Those skilled in the art will understand that audio signals corresponding to the video images processed by video system 300 of FIG. 3 are preferably processed by a separate audio subsystem (not shown). The audio subsystem is controlled by host processor 302 and may comprise a special-purpose audio processor and one or more speakers.

Description of Video Subsystem

Figure 4:
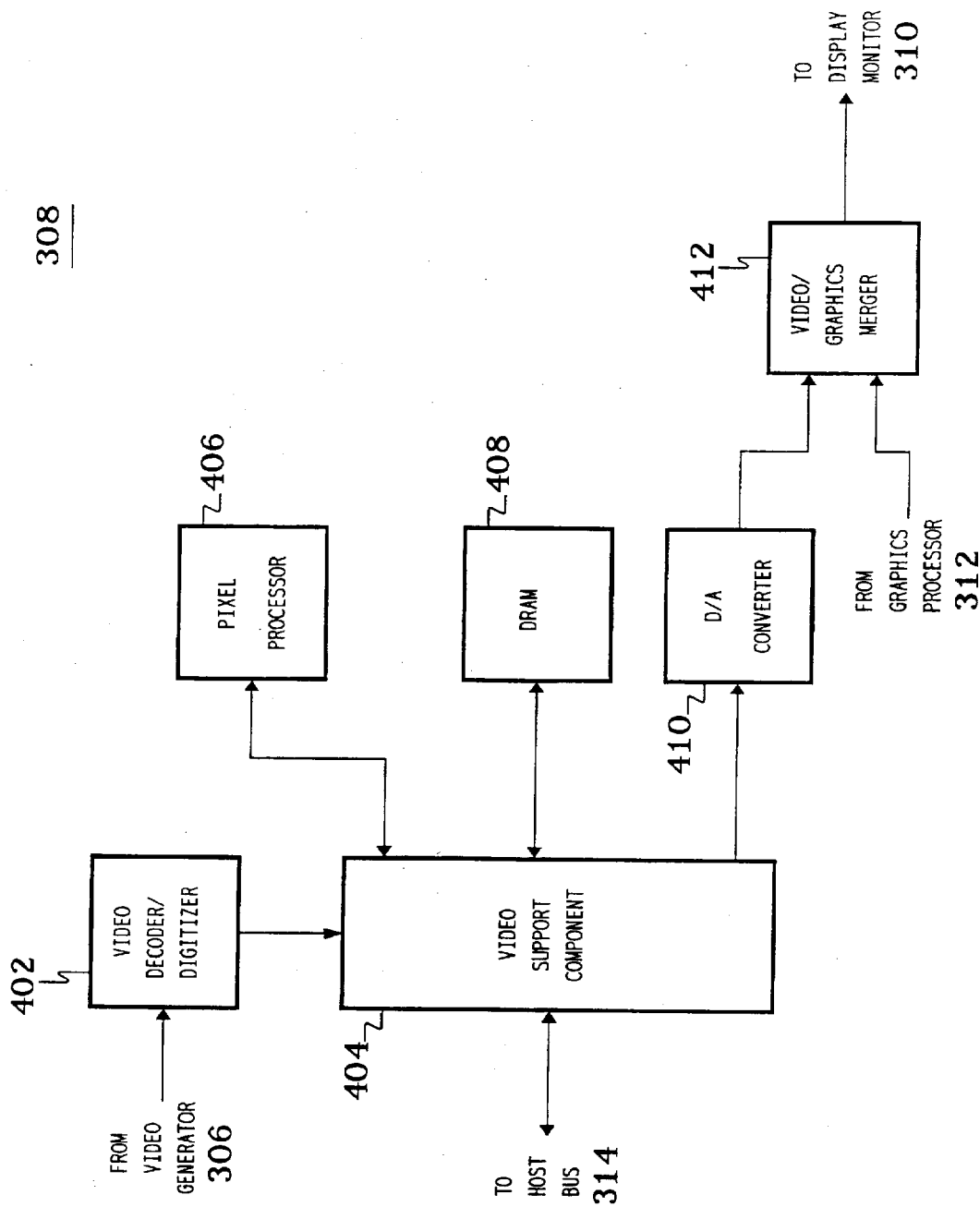
FIG. 4 is a block diagram of the video subsystem of the video system of FIG. 3.

Referring now to FIG. 4, there is shown a block diagram of video subsystem 308 of video system 300 of FIG. 3, according to a preferred embodiment of the present invention. When video system 300 is in pass-through mode, video decoder/digitizer 402 of video subsystem 308 receives an analog video signal from video generator 306 of FIG. 3, decodes the analog video signal into three linear components (e.g., Y, U, and V), digitizes the three linear components, and transmits digital video data to video support component 404.

Video support component 404 captures the video data and stores a captured bitmap to DRAM 408. Video support component 404 then accesses the captured bitmap from DRAM 408, scales the captured bitmap data for display, and transmits the scaled video data directly to D/A converter 410 (without saving a scaled bitmap back to DRAM 408). D/A converter 410 converts the scaled video data to analog signals for display on display monitor 310. Video/graphics merger 412 optionally merges the video signals with image signals generated by graphics processor 312 and transmits the video signal to display monitor 310 for display.

When video system 300 is in compression mode, video support component 404 captures and stores the captured video data from video decoder/digitizer 402 to DRAM 408, as in pass-through mode. Pixel processor 406 then accesses the captured bitmap from DRAM 408, compresses the captured data, decompresses the compressed data, and stores both compressed and companded video data back to DRAM 408 via video support component 404. Host processor 302 of FIG. 3 then accesses the compressed video data in DRAM 408 via video support component 404 and host bus 314 for storage in mass storage device 304.

When video system 300 is operated in pass-through and compression modes simultaneously, video support component 404 scales the captured bitmap for real-time display on display monitor 310 at the same time as pixel processor 406 compresses the captured bitmap for storage to mass storage device 304. When compression mode monitoring is selected, video support component 404 accesses the companded video data in DRAM 408 for scaling and transmission to D/A converter 410 for display on display monitor 310 as the compressed data is stored to mass storage device 304.

When video system 300 is in playback mode, the host processor 302 accesses compressed video data in mass storage device 304 via host bus 314 and stores the compressed video data to DRAM 408 via host bus 314 and video support component 404. Pixel processor 406 accesses the compressed video data from DRAM 408, decompresses the compressed video data, and stores a decompressed bitmap back to DRAM 408. The decompressed bitmap data may be in either full-resolution format or a subsampled format, such as YUV9, YUV12, or YUV16.

Video support component 404 then accesses the decompressed bitmap from DRAM 408, scales the decompressed video data for display, and transmits the scaled video data to D/A converter 410. D/A converter 410 converts the scaled video data to an analog video signal for transmission to video/graphics merger 412. Video/graphics merger 412 optionally merges the video signal with images from graphics processor 312 before transmitting the video signal to display monitor 310 for display.

When video subsystem 308 scales video data for display on display monitor 310, the scaled data is preferably transmitted directly to D/A converter 410 and is not stored back to DRAM 408 as a scaled bitmap. This display processing is described in further detail later in this specification in conjunction with FIG. 11. In a preferred embodiment, the scaled data generated by video support component 404 is fed to D/A converter 410 for analog multiplexing. In alternative preferred embodiments, video support component 404 feeds this data to a digital multiplexer or directly into a native graphics frame buffer without implementing a phase-locked-loop scheme.

Figure 2:
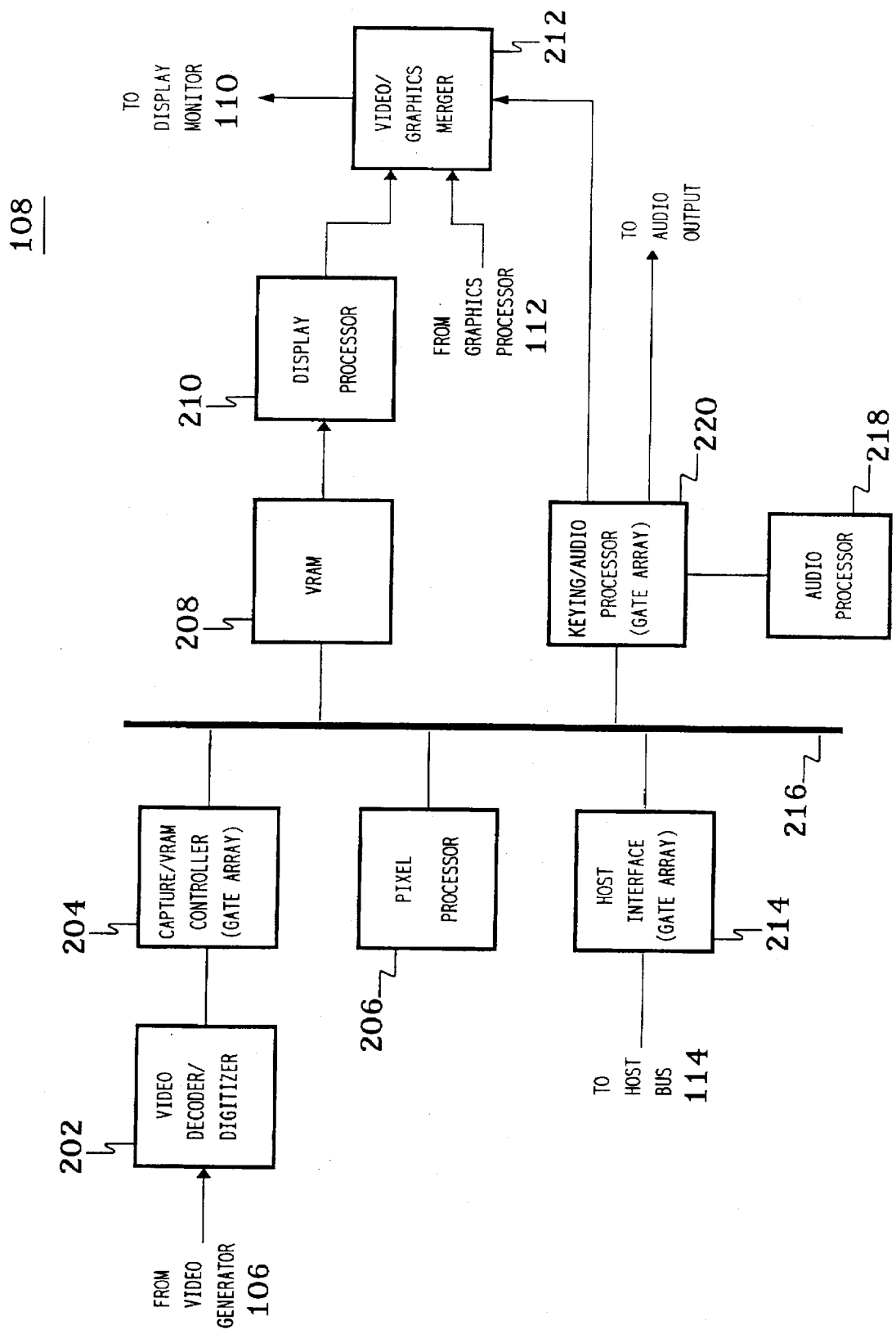
FIG. 2 is a block diagram of the ActionMedia-II® subsystem of the video system of FIG. 1.

Those skilled in the art will understand that, because a scaled bitmap is not stored back to memory, video subsystem 308 uses less memory and less data bandwidth than ActionMedia-II® subsystem 108 of FIG. 2. As a result of this smaller memory and bandwidth usage, video subsystem 308 is able to function with DRAM 408, while ActionMedia-II® subsystem 108 has VRAM 208.

Video support component 404 performs display processing based on information provided by host processor 302 and pixel processor 408. Host processor 302 transmits to video support component 404 information that dictates how the data in DRAM 408 is to be scaled for display. Pixel processor 406 transmits to video support component 404 the upper left corner address in DRAM 408 for the bitmap to be displayed. The video display window may have any position and size within the display raster.

Video decoder/digitizer 402 may be a conventional NTSC or PAL digital decoder, such as those manufactured by Phillips or Motorola. Pixel processor 406 may be any suitable compression/decompression engine and is preferably an Intel® 82750PB pixel processor. DRAM 408 may be any conventional dynamic random access memory device, such as those manufactured by Toshiba or Micron, and preferably has an access time of 60 nanoseconds or less. Those skilled in the art will understand that alternative preferred embodiments of the present invention may include memory devices other than dynamic RAM, such as VRAM or static RAM. D/A converter 410 may be a conventional 24-bit RGB digital-to-analog converter (DAC) and is preferably a Brooktree BT101 or similar device. Video/graphics merger 412 may be a fast analog multiplexer with key color detection, a simple signal combiner, or a digital merging DAC, such as a Brooktree BT885 dual-port DAC.

As depicted in FIG. 4, video subsystem 308 provides each of the three above-described modes of operation. In alternative preferred embodiments of the video subsystem of the present invention, one or more of the components of video subsystem 308 depicted in FIG. 4 may be optional. For example, in video subsystems according to the present invention that operate only in pass-through mode, pixel processor 406 is optional. Similarly, D/A converter 410 is optional in video systems that operate only in compression mode (without monitoring) and video decoder/digitizer 402 is optional in video systems that operate only in playback mode. Moreover, if graphics images are not merged with the video or otherwise displayed on display monitor 310, then video/graphics merger 412 is optional.

In addition, alternative preferred embodiments of video subsystems according to the present invention may have different data bus configurations. For example, in video subsystem 308 of FIG. 4, pixel processor 406 and DRAM 408 each have a separate data bus to video support component 404. The data bus to pixel processor 406 preferably is a 32-bit data bus. The data bus to DRAM 408 is preferably a 16-bit data bus. Thus, video support component 404 preferably has 48 pins for data busses to pixel processor 406 and DRAM 408.

In an alternative preferred embodiment, pixel processor 406 and DRAM 408 share one 16-bit data bus and pixel processor 406 also has a second 16-bit bus. In this alternative preferred embodiment, the video support component preferably has only 32 pins for the data busses to pixel processor 406 and DRAM 408. In still another alternative preferred embodiment, DRAM 408 is a 32-bit DRAM, and pixel processor 406 and DRAM 408 share the same 32-bit bus corresponding to 32 pins of video support component 404. Those skilled in the art will understand that fewer pins are preferable to more pins, but that sharing data busses involves increased arbitration of data flow.

Those skilled in the art will also understand that video support component 404 provides processing that replaces the copy/scale processing performed by pixel processor 206 in ActionMedia-II® video system 100.

Description of Video Support Component

Figure 5:
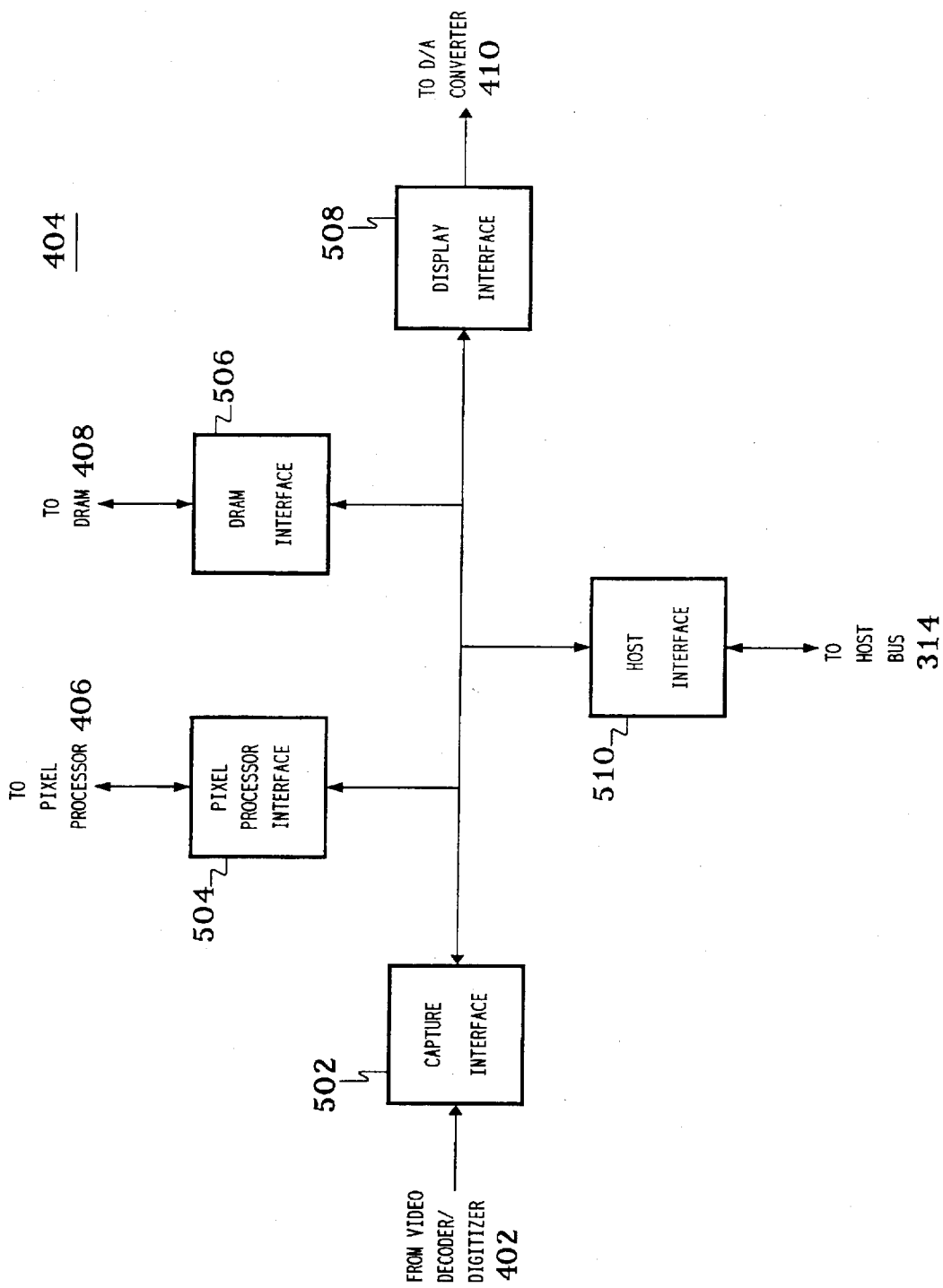
FIG. 5 is a block diagram of the video support component of the video subsystem of FIG. 4.

Referring now to FIG. 5, there is shown a block diagram of video support component 404 of video subsystem 308 of FIG. 4, according to a preferred embodiment of the present invention. Video support component 404 includes five interface subcomponents that are preferably supported in a single integrated circuit. In an alternative preferred embodiment, video support component 404 is integrated with pixel processor 406 into a single full custom die.

Video support-component 404 provides the ability to display a video window within a display raster. The video window may have any size and position within the display raster. Moreover, the visual contents of the window may be scaled up or down from a bitmap stored in DRAM 408 or any rectangular portion of that bitmap.

As will be described in further detail later in this specification in conjunction with FIGS. 7 and 11, video support component 404 filters data early in the data path. In addition, video support component 404 is designed to share subcomponents for the separate processing of Y-, U-, and V-component data. Furthermore, where practical, video support component 404 stores data in external DRAM 408 rather than in internal memory. Those skilled in the art will understand that these features of video support component 404 reduce internal gate count and internal memory and thereby reduce implementation costs.

When video system 300 is in pass-through mode, capture interface 502 of video support component 404 receives digital video data from video decoder/digitizer 402 of FIG. 4, filters the video data for capture, and transmits the captured data to DRAM interface 506. DRAM interface 506 stores the captured data to DRAM 408 as a captured bitmap. When requested via display interface 508, DRAM interface 506 accesses the captured bitmap in DRAM 408 and transmits the captured data to display interface 508. Display interface 508 scales the captured data for display and transmits the scaled data to D/A converter 410.

When video system 300 is in compression mode, the video data is captured by capture interface 502 and stored to DRAM 408 by DRAM interface 506, as in pass-through mode. When requested via pixel processor interface 504, DRAM interface 506 accesses the captured bitmap data in DRAM 408 and transmits the captured data to pixel processor interface 504. Pixel processor interface 504 transmits the captured data to pixel processor 406 for compression and decompression, receives both the compressed and companded data from pixel processor 406, and transmits the compressed and companded data back to DRAM interface 506. DRAM interface 506 stores the compressed and companded data to DRAM 408 as compressed bit streams and companded bitmaps.

When requested via host interface 510, DRAM interface 506 accesses the compressed bit stream in DRAM 408 and transmits the compressed data to host interface 510. Host interface 510 transmits the compressed data to host processor 302 via host bus 314. When compression mode monitoring is selected and when requested by display interface 508, DRAM interface 506 accesses the companded bitmap in DRAM 408 and transmits the companded data to display interface 508. Display interface 508 scales the companded data for transmission to D/A converter 410 for display on display monitor 310.

When video system 300 is in playback mode, host interface 510 receives compressed video data from host processor 302 via host bus 314 and transmits the compressed data to DRAM interface 506. DRAM interface 506 stores the compressed data to DRAM 408 as a compressed bit stream. When requested via pixel processor interface 504, DRAM interface 506 accesses the compressed bit stream in DRAM 408 and transmits the compressed data to pixel processor interface 504. Pixel processor interface 504 transmits the compressed data to pixel processor 406, receives decompressed data from pixel processor 406, and transmits the decompressed data to DRAM interface 506. DRAM interface 506 stores the decompressed data to DRAM 408 as a decompressed bitmap. When requested via display interface 508, DRAM interface 506 accesses the decompressed bitmap in DRAM 408 and transmits decompressed data to display interface 508. Display interface 508 scales the decompressed data for display and transmits the scaled data to D/A converter 410 for display on display monitor 310.

Other communication also occurs between the various interfaces of video support component 404. For example, host interface 510 relays commands from host processor 302 that control the values of registers that control the processing of the other interfaces. Host interface 510 also relays information from the various interfaces back to host processor 302 for operations monitoring.

General Description of DDA-Based Processing

Figure 6:
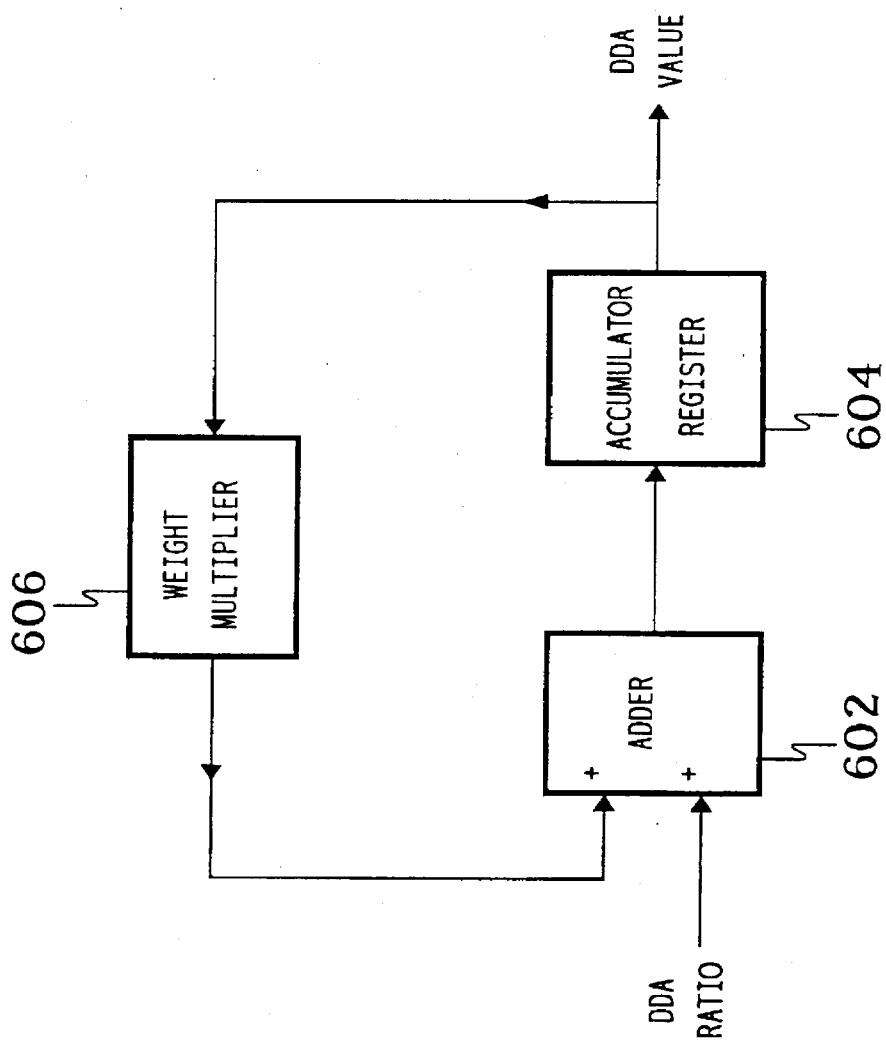
FIG. 6 is a block diagram of a digital differential accumulator.

Referring now to FIG. 6, there is shown a block diagram of a digital differential accumulator (DDA) 600. Much of the processing of video system 300 is implemented by DDA-based controllers. DDA-based processing is driven by a selected DDA ratio, which typically consists of an integer part and a fractional part. At every control cycle, adder 602 of DDA 600 increments the accumulated DDA value stored in accumulator register 604 by the DDA ratio.

The flow of processing may then be dictated by either the integer part of the accumulated DDA value, the fractional part of the accumulated DDA value, or both. Weight multiplier 606, which typically multiplies the accumulated DDA value by 1, may be used to reset accumulator register 604 by multiplying the accumulated DDA value by 0. Those skilled in the art will understand that DDA-based processing may be used to approximate analog or continuous processing.

In a preferred embodiment of video system 300 of the present invention, the specified DDA ratio and the accumulated DDA value are both 20-bit values with least significant bits 0–9 representing fractional or remainder parts and most significant bits 10–19 representing integer parts. Those skilled in the art will understand that alternative embodiments of the present invention may employ DDA ratios and accumulated DDA values with different lengths and/or formats.

Description of Capture Interface

Figure 7:
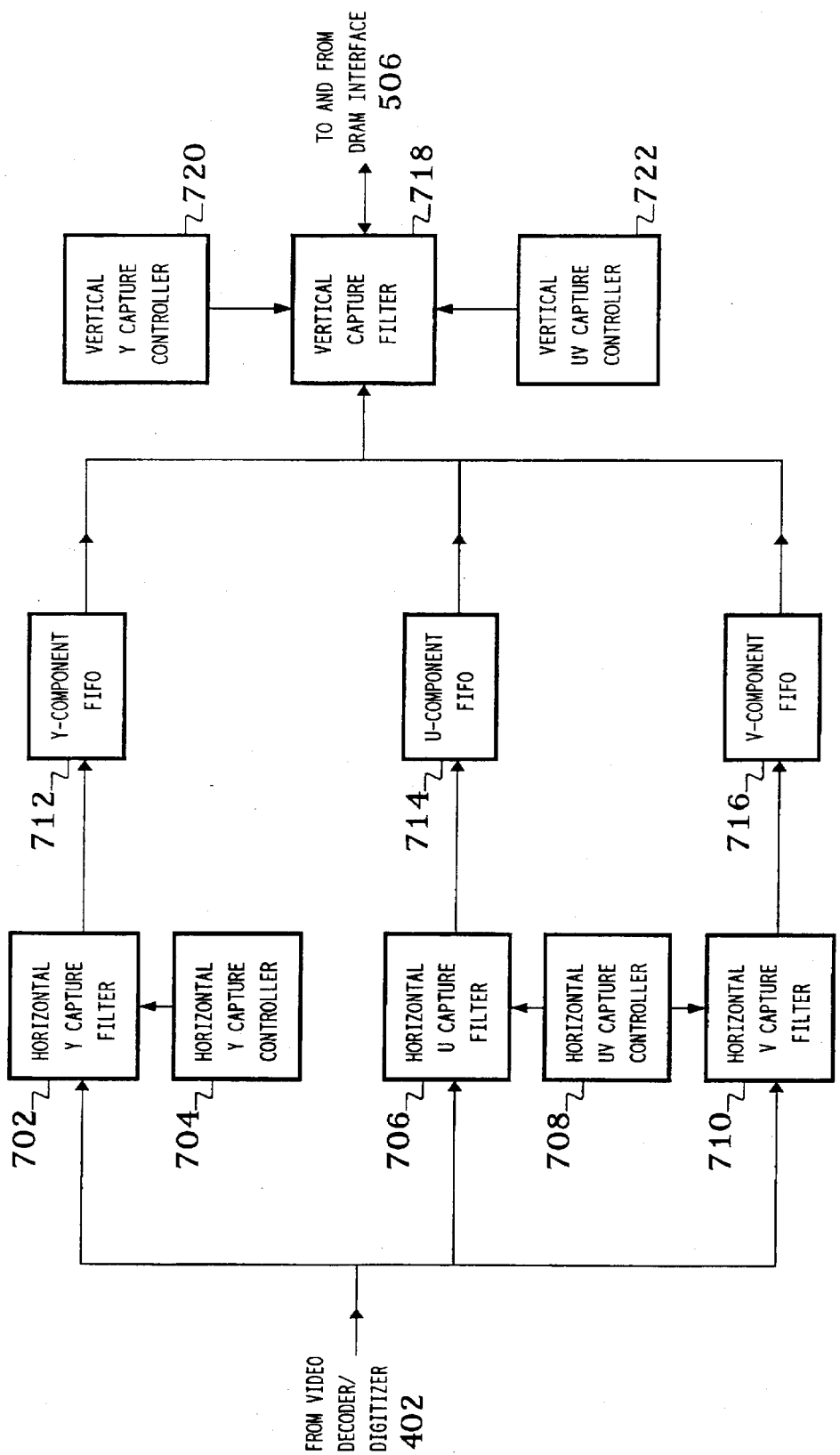
FIG. 7 is a block diagram of the capture interface of the video support component of FIG. 5.

Referring now to FIG. 7, there is shown a block diagram of capture interface 502 of video support component 404 of FIG. 5, according to a preferred embodiment of the present invention. Capture interface 502 receives three-component (preferably YUV) digitized video data from video decoder/digitizer 402, filters the video data both horizontally and vertically, and transmits the filtered data to DRAM interface 506 for storage as a captured bitmap in DRAM 408. The captured bitmap data is then available for subsequent processing which may include compression for storage to mass storage device 304 and/or scaling for display on display monitor 310.

The frames of video data received from video decoder/digitizer 402 may be of any dimension (i.e., any number of pixels per row and any number of rows per frame). Similarly, the captured bitmap may be of any specified dimension. In addition, the received and captured video data may be in either full-resolution format or in a subsampled format such as YUV16.

More particularly, Y-, U-, and V-component data are received from video decoder/digitizer 402 and distributed to the respective horizontal capture filters 702, 706, and 710. In a preferred embodiment, Y data are transmitted on an 8-bit portion of a data bus, while U and V data are time multiplexed on another 8-bit portion of the data bus. At each clock cycle, the 8-bit Y portion is distributed to horizontal Y capture filter 702 and the 8-bit UV portion is distributed to either horizontal U capture filter 706 or horizontal V capture filter 710 by selectively latching data into storage located within the appropriate one of the horizontal U and V capture filters 706 and 710.

Horizontal Y capture controller 704 controls the horizontal filtering of Y-component data implemented by horizontal Y capture filter 702. Horizontal UV capture controller 708 controls the horizontal filtering of U- and V-component data implemented by horizontal U capture filter 706 and horizontal V capture filter 710, respectively. The processing of horizontal capture controllers 704 and 708 and horizontal capture filters 702, 706, 710 is described in further detail later in this specification in conjunction with FIGS. 8 and 9, respectively.

The horizontally filtered Y-, U-, and V-component data are then transmitted to component first-in, first-out memory devices (FIFOs) 712, 714, and 716, respectively, to await transmission to and processing by vertical capture filter 718. Vertical Y capture controller 720 controls the vertical filtering of Y-component data implemented by vertical capture filter 718, while vertical UV capture controller 722 controls the vertical filtering of U- and V-component data implemented by vertical capture filter 718. The processing of vertical capture controllers 720 and 722 and vertical capture filter 718 is described in further detail later in this specification in conjunction with FIGS. 8 and 10, respectively.

The fully filtered Y-, U-, and V-component data are then transmitted to DRAM interface 506 for storage as a captured bitmap in DRAM 408.

Description of Horizontal and Vertical Capture Controllers

Figure 8:
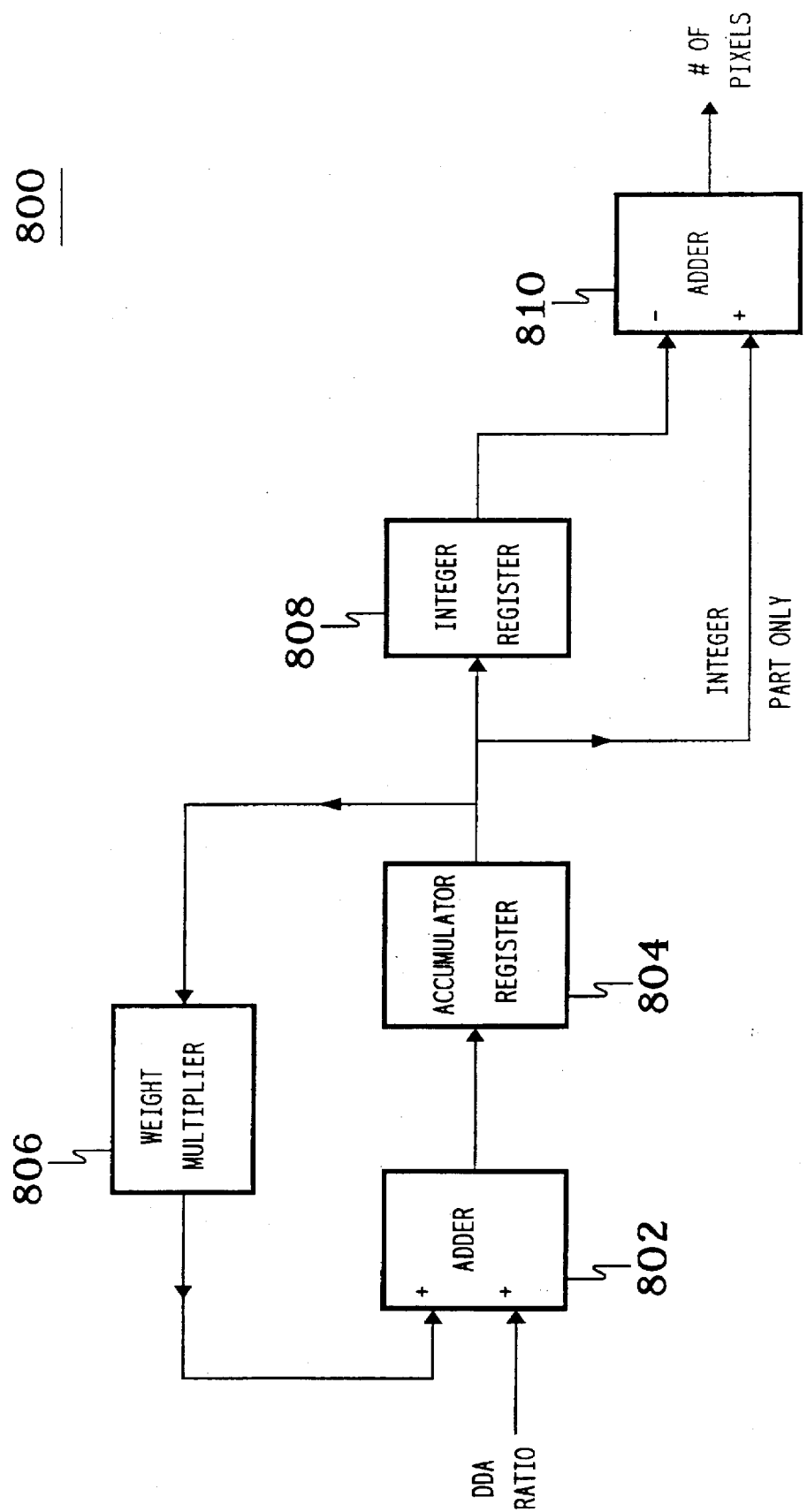
FIG. 8 is a block diagram of a capture controller of the capture interface of FIG. 7.

Referring now to FIG. 8, there is shown a block diagram of capture controller 800. Capture controller 800 is a preferred embodiment of horizontal Y capture controller 704, horizontal UV capture controller 708, vertical Y capture controller 720, and vertical UV capture controller 722 of capture interface 502 of FIG. 7. Capture controllers 704, 708, 720, and 722 implement DDA-based processing to determine the number of pixels or rows used in the filtering implemented by capture filters 702, 706, 710, and 718. In a preferred embodiment, capture controllers 704, 708, 720, and 722 are implemented in hardware.

Capture controller 800 is driven by a selected DDA ratio. The selected DDA ratio is based on the relative dimensions of the input video frames received by capture interface 502 from video decoder/digitizer 402 and the output video frames generated by capture interface 502 for storage as captured bitmaps to DRAM 408.

Thus, the horizontal DDA ratios used by horizontal capture controllers 704 and 708 are a ratio based on the number of components per row of an input video frame and the number of components per row of an output video frame. Similarly, the vertical DDA ratios used by vertical capture controllers 720 and 722 are ratio based on number of rows per input video frame and the number of rows per output video frame.

Those skilled in the art will understand that, when the format of the digital data received from video decoder/digitizer 402 is the same as the captured data format, the horizontal and vertical DDA ratios for the Y component are the same as the horizontal and vertical DDA ratios for the U and V components, respectively. When the formats are different (i.e., when capture interface 502 changes the format), the horizontal and vertical DDA ratios for the Y component will typically be different from the horizontal and vertical DDA ratios for the U and V components, respectively.

When the DDA ratios are greater than 1, capture interface 502 reduces the video image. A DDA ratio of exactly 1 implies that the video data are to be captured without any filtering. The horizontal and vertical DDA ratios may be different or the same depending on the dimensions of the input video frames and the desired captured bitmaps.

Referring again to FIG. 8, accumulator register 804 holds the current accumulated DDA value. Every control cycle, adder 802 updates the accumulated DDA value stored in register 804 by adding the selected DDA ratio. Weight multiplier 806, which typically multiplies the accumulated DDA value by 1, may be used to reset accumulator register 804 by multiplying the accumulated DDA value by 0. Adder 802, accumulator register 804, and weight multiplier 806 form a DDA similar to DDA 600 of FIG. 6. Integer register 808 holds the integer part of the previous accumulated DDA value. Adder 810 adds the integer part of the current accumulated DDA value to the negative of the integer part of the previous accumulated DDA value to determine an integer difference value.

Table I presents the sequence of integer difference values generated by capture controller 800 for a DDA ratio of 3.4, where the accumulated DDA value in accumulator register 804 is initialized to 0. The integer difference value determines the filtering scheme implemented by the appropriate capture filter. For horizontal capture filters 702, 706, and 710, the integer difference value is the number of consecutive pixels in a row used during horizontal filtering. For vertical capture filter 718, the integer difference value is the number of consecutive pixels in a column used in vertical filtering. The processing of horizontal capture filters 702, 706, and 710 and the processing of vertical capture filter 718 are described in further detail later in this specification in conjunction with FIGS. 9 and 10, respectively.

TABLE I

CAPTURE CONTROLLER PROCESSING FOR DDA RATIO OF 3.4

| CONTROL CYCLE | ACCUMULATED DDA VALUE | # OF PIXELS |
|---|---|---|
| 1 | 3.4 | 3 |
| 2 | 6.8 | 3 |
| 3 | 10.2 | 4 |
| 4 | 13.6 | 3 |
| 5 | 17.0 | 4 |
| 6 | 20.4 | 3 |
| 7 | 23.8 | 3 |
| 8 | 27.2 | 4 |
| 9 | 30.6 | 3 |
| 10 | 34.0 | 4 |
| : | : | : |

Description of Horizontal Capture Filters

Figure 9:
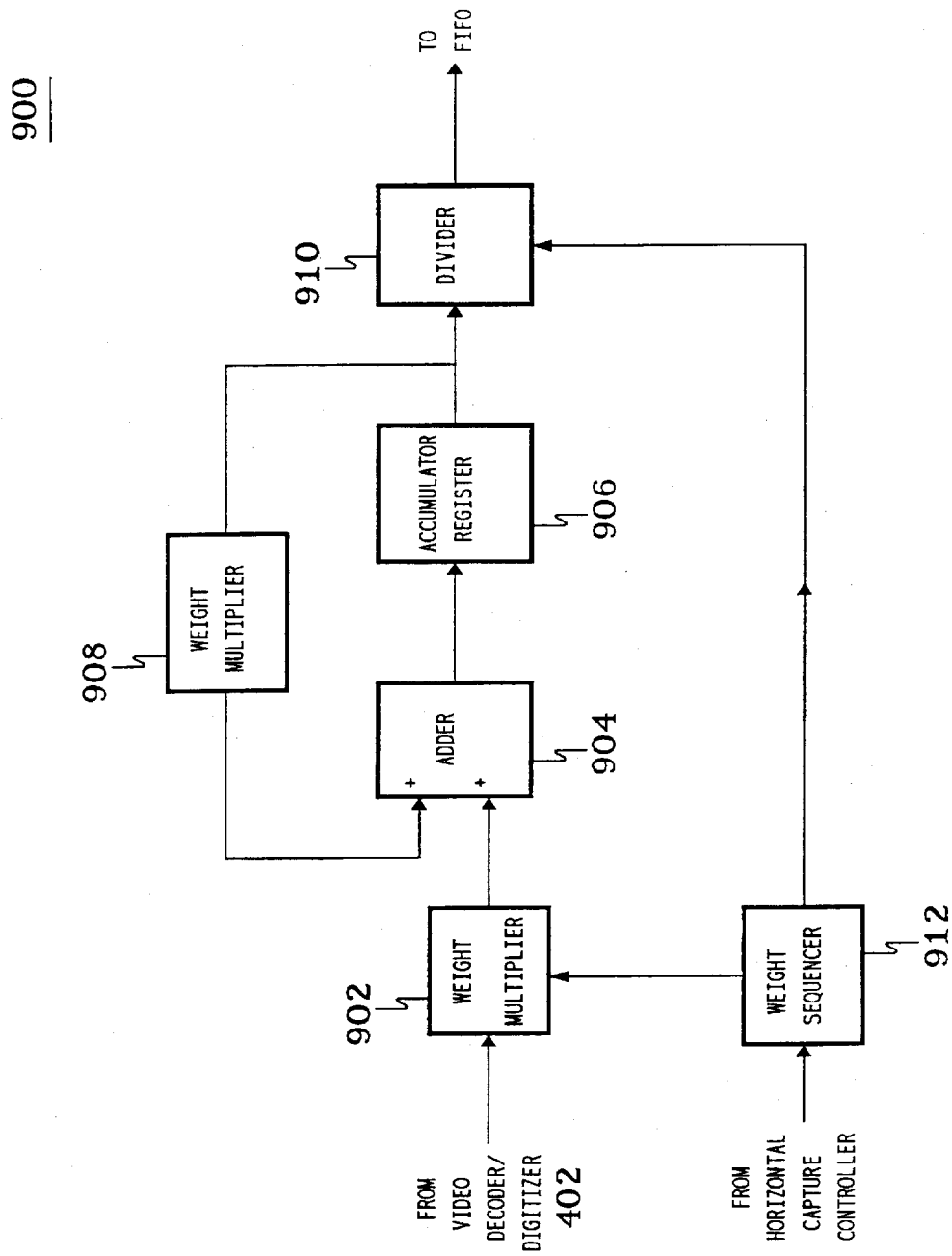
FIG. 9 is a block diagram of a horizontal capture filter of the capture interface of FIG. 7.

Referring now to FIG. 9, there is shown a block diagram of horizontal capture filter 900. Horizontal capture filter 900 is a preferred embodiment of horizontal Y capture filter 702, horizontal U capture filter 706, and horizontal V capture filter 710 of capture interface 502 of FIG. 7. Based on the integer difference value received from capture controller 800 of FIG. 8, horizontal capture filter 900 filters video component data received from video decoder/digitizer 402 and transmits the filtered data to the appropriate component FIFO of capture interface 502. In a preferred embodiment, horizontal capture filters 702, 706, and 710 are implemented in hardware.

More particularly, weight sequencer 912 receives the integer difference value from capture controller 800. This integer difference value determines the filtering scheme for the next set of component data received from video decoder/digitizer 402. Table II lists the preferred filtering schemes associated with different integer difference values. For example, when the integer difference value is 5, then the next five components are multiplied by 1, 2, 2, 2, and 1, respectively. The resulting products are added together and the total is then divided by 8.

TABLE II

CAPTURE FILTERING SCHEMES

| # OF PIXELS | WEIGHT FACTORS | DIVISOR |
|---|---|---|
| 1 | 1 | 1 |
| 2 | 1 1 | 2 |
| 3 | 1 2 1 | 4 |
| 4 | 1 1 1 1 | 4 |
| 5 | 1 2 2 2 1 | 8 |
| 6 | 1 1 2 2 1 1 | 8 |
| 7 | 1 1 1 2 1 1 1 | 8 |
| 8 | 1 1 1 1 1 1 1 1 | 8 |
| 9 | 1 2 2 2 2 2 2 2 1 | 16 |
| : | : | : |

To implement these filtering schemes, weight sequencer 912 transmits the appropriate weight factor to weight multiplier 902. Weight multiplier 902 uses the weight factor to weight the component value received from video decoder/digitizer 402. Adder 904 adds the weighted component value to the running total stored in accumulator register 906. After all the pixels in the selected horizontal filtering scheme set have been properly weighted and added together, divider 910 divides the running total by the appropriate divisor received from weight sequencer 912. The result, which is then transmitted to the appropriate component FIFO of capture interface 502, is a single filtered component value that corresponds to the components in the selected horizontal filtering scheme set. Weight multiplier 908, which typically multiplies the accumulated DDA value by 1, may be used to reset accumulator register 906 by multiplying the accumulated DDA value by 0 at the start of processing for each selected horizontal filtering scheme set.

Those skilled in the art will understand that the weight factors and divisors for the filtering schemes listed in Table II have been selected to be integer powers of 2 to permit multiplication and division of binary values by bit shifts in hardware. Those skilled in the art will also understand that other capture filtering schemes, with or without weight factors that are integer powers of 2, also fall within the scope of the present invention.

Description of Vertical Capture Filter

Figure 10:
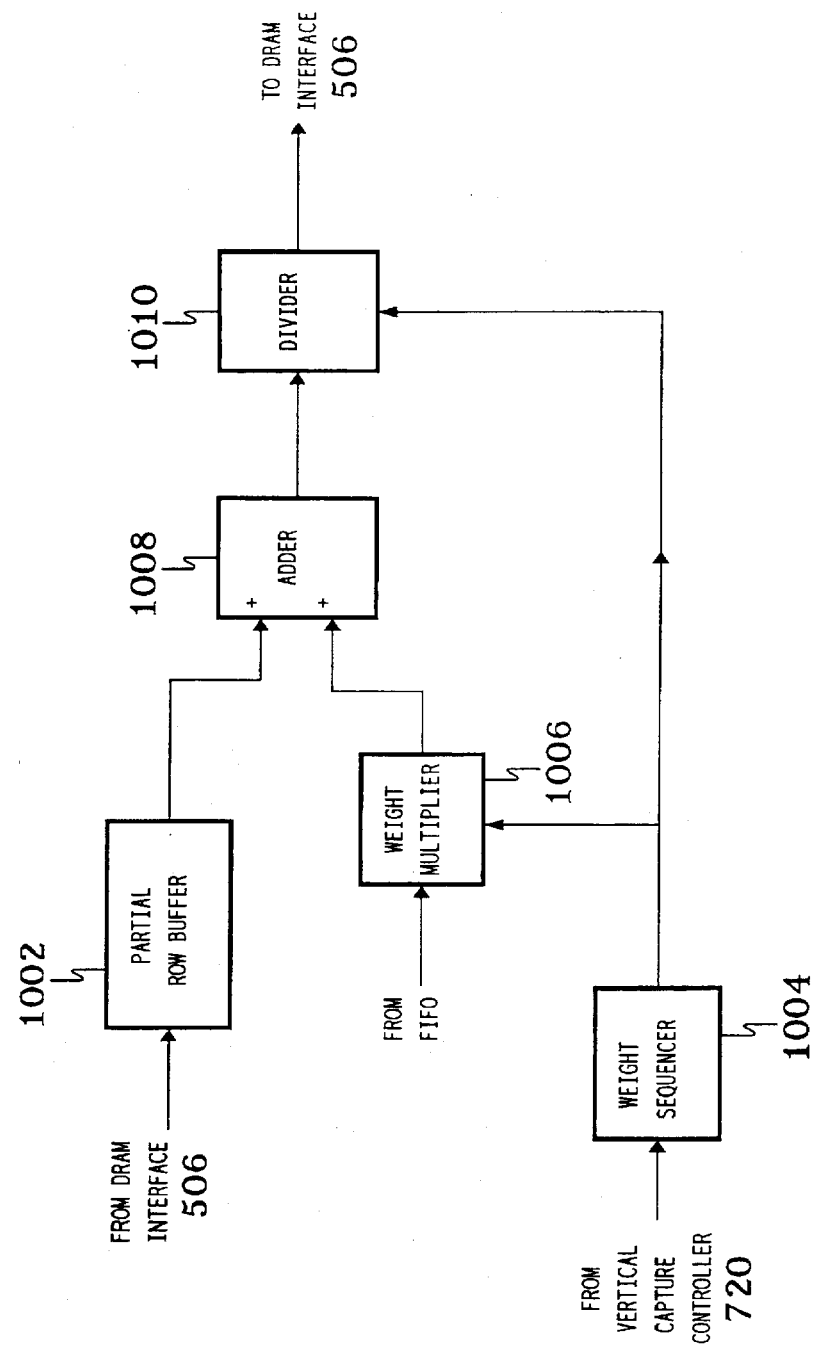
FIG. 10 is a block diagram of the vertical capture filter of the capture interface of FIG. 7.

Referring now to FIG. 10, there is shown a block diagram of vertical capture filter 718 of capture interface 502 of FIG. 7, according to a preferred embodiment of the present invention. Based on the integer difference value received from either vertical Y capture controller 720 or vertical UV capture controller 722, vertical capture filter 718 filters video data for one component at a time as received from component FIFOs 712, 714, and 716 and transmits the filtered data to DRAM interface 506 for storage as a captured bitmap in DRAM 408. In a preferred embodiment, vertical capture filter 718 is implemented in hardware.

More particularly, weight sequencer 1004 receives the integer difference value from either vertical Y capture controller 720 or vertical UV capture controller 722 which dictates the filtering scheme to be implemented. In a preferred embodiment, vertical capture filter 718 implements the filter schemes listed above in Table II.

Since video generator 306 generates video data one row at a time, capture interface 502 filters the input video data one row at a time. Since the vertical filtering schemes implemented by vertical capture filter 718 typically span multiple rows of video data, vertical capture filter 718 partially processes the horizontally filtered data received from FIFOs 712, 714, and 716 and temporarily stores the partial vertical filtering results to DRAM 408 to await subsequent processing of the next row of video data. Those skilled in the art will understand that such temporary storage of partial vertical filtering results reduces the internal memory requirements of capture interface 502.

Thus, weight sequencer 1004 transmits the appropriate weight factor to weight multiplier 1006. Weight multiplier 1006 uses the weight factor to weight the horizontally filtered component value for the current row as received from FIFO 712, 714, or 716. In the meantime, partial row buffer 1002 receives from DRAM interface 506 the corresponding partial vertical filtering results that were temporarily stored to DRAM 408. The partial vertical filtering results correspond to earlier processing by vertical capture filter 718 on the previous rows of video data that are within the currently selected vertical filtering scheme.

In a preferred embodiment, partial row buffer 1002 holds 32 bytes of data. Those skilled in the art will understand that the selection of the size of partial row buffer 1002 takes into account the competing goals of reduced internal memory within capture interface 502 and improved data bandwidth between video support component 404 and DRAM 408. It will be understood that each non-sequential or random access into DRAM 408 requires extra overhead time since the row address must be asserted. Following the row address, the column address may be asserted multiple times in sequence for rapid data access. DRAM bandwidth is improved by maximizing the number of column address cycles in sequence, which requires more internal storage.

Adder 1008 adds the weighted component value from weight multiplier 1006 to the corresponding partial result (i.e., the partial result for the same column number) from partial row buffer 1002. When the last row of the currently selected vertical filtering scheme is being processed, divider 1010 divides the output of adder 1008 by the divisor received from weight sequencer 1004 (and selected from Table II). The result is a single component value that corresponds to the pixels in the currently selected vertical filtering scheme set. This value becomes a permanent component value in the captured bitmap.

When any row other than the last row of the currently selected vertical filtering scheme is being processed, divider 1010 transmits the output of adder 1008 to DRAM interface 506 without dividing to be stored as a temporary partial vertical filtering result in DRAM 408. At the start of processing for each selected vertical filtering scheme set, a new set of temporary partial results are generated. Thus, when the first row of the currently selected vertical filtering scheme is being processed, adder 1008 does not add any values from partial row buffer 1002 to the weighted components generated by weight multiplier 1006.

Description of Display Interface

Figure 11:
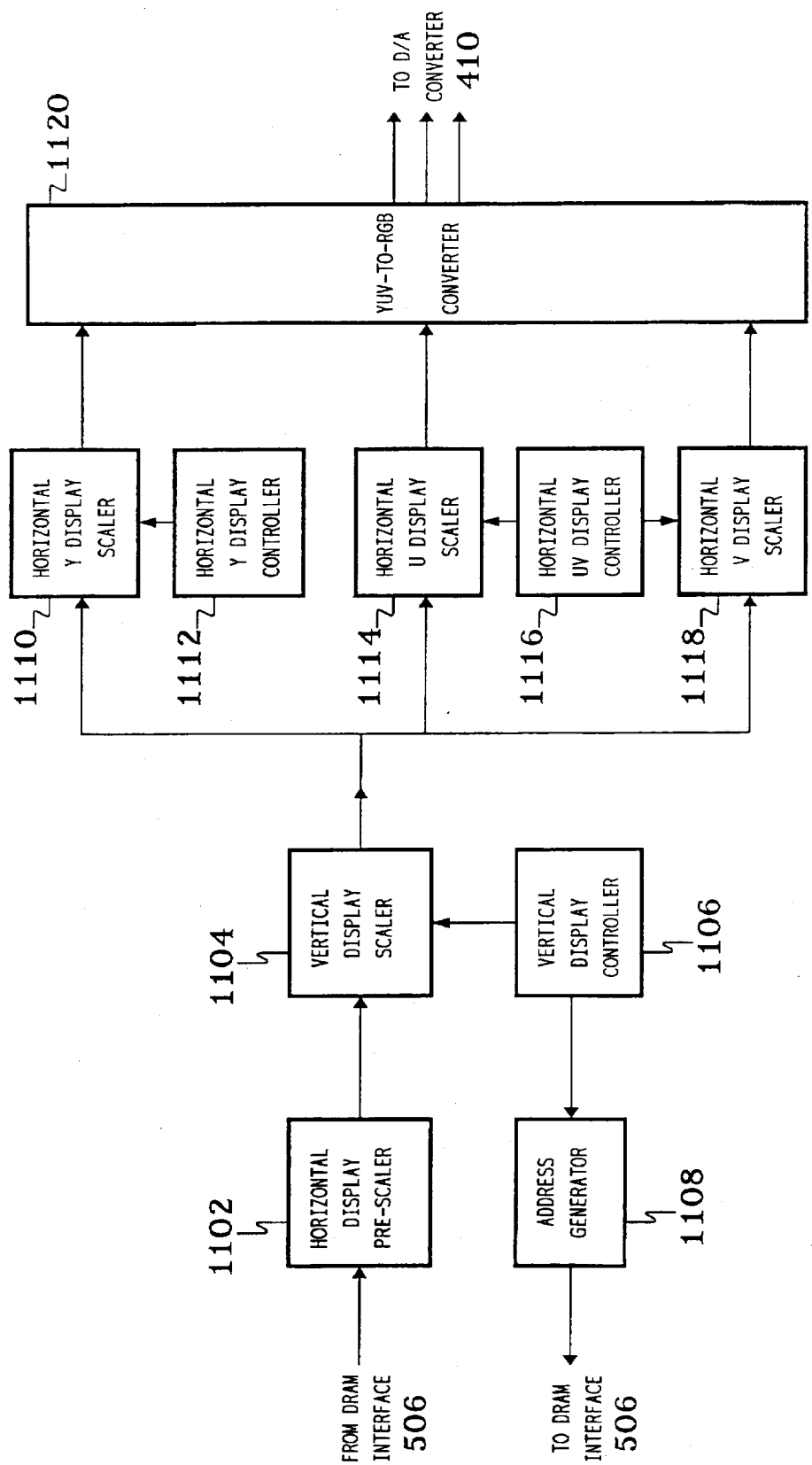
FIG. 11 is a block diagram of the display interface of the video support component of FIG. 5.

Referring now to FIG. 11, there is shown a block diagram of display interface 508 of video support component 404 of FIG. 5, according to a preferred embodiment of the present invention. Display interface 508 sizes, positions, and optionally YUV/RGB converts data from a bitmap stored in DRAM 408. Display interface 508 preferably processes only that data from the bitmap that is to be actively displayed on display monitor 310. The bitmap may be a captured video bitmap generated during pass-through or compression mode processing, a companded bitmap generated during compression mode processing, or a decompressed bitmap generated during playback mode. The bitmap data may be in full-resolution or in a subsampled format and is preferably stored a three separate Y, U, and V component bitmaps.

Display interface 508 performs DDA-based processing to achieve continuously variable scaling of the video data in both vertical and horizontal dimensions for eventual display on display monitor 310. The DDA value is accumulated once for each display pixel. The integer part of the accumulated DDA value indicates the pixel number in the bitmap, while the remainder part indicates the amount of interpolation to be performed with the next neighboring bitmap pixel.

Display interface 508 receives a specified number of bytes of the bitmap data from DRAM interface 506. Display interface 508 converts the bitmap data to video data for any desired window size and position within the display raster of display monitor 310. In a preferred embodiment, display interface 508 then converts the scaled data from YUV format to RGB format and transmits the converted data to D/A converter 410 for eventual display on display monitor 310. Those skilled in the art will understand that display interface 508 receives, scales, and transmits data corresponding to portions of the image to be displayed without creating a scaled bitmap containing the scaled data for the entire image. It will be understood that, when the specified number of bytes received correspond to the entire image, then each image portion received by display interface 508 will be an entire image.

Display scaling may involve enlarging or reducing all or part of the bitmap data stored in DRAM 408 in the vertical and horizontal dimensions, independently. As such display interface 508 supports video functions such as zooming in, zooming out, panning, and stretching in either the horizontal or vertical dimensions.

Those skilled in the art will understand that DDA-based scaling improves video quality at certain window sizes and also eliminates the need for pixel processor 406 to implement a copy/scale function.

More particularly, in a preferred embodiment, horizontal display pre-scaler 1102 of display interface 508 receives component data from DRAM interface 506 and optionally pre-scales the data horizontally. When the display window is relatively narrow, horizontal pre-scaling is preferably selected to shrink the data horizontally before the data is scaled vertically and further scaled horizontally. Horizontal pre-scaling preferably involves some type of averaging of multiple pixels, although pre-scaling by skipping pixels is also within the scope of the present invention.

Those skilled in the art will understand that horizontal pre-scaling allows for internal storage (within display interface 508) of proportionally more of the bitmap scan line's content. This allows narrow windows to be displayed where sufficient time may be otherwise unavailable to read the complete scan line from memory while traversing the window. Storing proportionally more of the bitmap data gives the internal row buffer more of a "head start" in reading the scan line from memory by pre-fetching more bitmap data from external memory (i.e., DRAM 408) before beginning the display of the window.

Horizontal pre-scaling need not be selected when displaying to relatively wide windows. Wide windows allow enough time to read data from memory as the window is being traversed, since the pace of bitmap data consumption is less for a wide window. Since horizontal pre-scaling is preferably limited to narrow display windows, there is little loss of image resolution due to the averaging implemented during horizontal pre-scaling.

In a preferred embodiment, horizontal display pre-scaler 1102 optionally reduces the amount of data horizontally by 2:1 or 4:1 ratios as selected. The processing of horizontal display pre-scaler 1102 is described in further detail later in this specification in conjunction with FIGS. 30 and 12.

Vertical display scaler 1104 scales the horizontally pre-scaled data in the vertical dimension. The processing of vertical display scaler 1104 is controlled by vertical display controller 1106. By placing vertical display scaler 1104 before horizontal display scalers 1110, 1114, and 1118 permits the use of only one vertical scaler to process data for all three components Y, U, and V. Those skilled in the art will understand that such placement provides a reduction in overall gate count. The processing of vertical display scaler 1104 is described in further detail later in this specification in conjunction with FIG. 13. Vertical display controller 1106 is based on a DDA similar to DDA 600 of FIG. 6. Address generator 1108 generates addresses to access data from DRAM 408 via DRAM interface 506 based on the accumulated DDA value generated by vertical display controller 1106.

The vertically scaled data is then transmitted to the appropriate one of horizontal display scalers 1110, 1114, and 1118. The distribution of vertically scaled data to the appropriate horizontal display scaler is implemented by selectively latching data into storage located within the appropriate one of the horizontal display scalers.

Horizontal display scalers 1110, 1114, and 1118 horizontally scale the component data and transmit the fully scaled data to YUV-to-RGB converter 1120. Horizontal Y display controller 1112 controls the processing of horizontal Y display scaler 1110, while horizontal UV display controller 1116 controls the processing of horizontal U display scaler 1114 and horizontal V display scaler 1118. The processing of horizontal display scalers 1110, 1114, and 1118 is described in further detail later in this specification in conjunction with FIG. 14. Horizontal Y display controller 1112 is based on a DDA similar to DDA 600 of FIG. 6. The processing of horizontal UV display controller 1116 is described in further detail later in this specification in conjunction with FIG. 15.

YUV-to-RGB converter 1120 converts the fully scaled video data from YUV format to RGB format. Those skilled in the art will understand that such conversion may be implemented according to Equations (1)–(3) below:

$$R = Y + 1.270705V - 191.45029 \quad (1)$$

$$G = Y - 0.698001V - 0.337633U + 116.56116 \quad (2)$$

$$B = Y + 1.732446U - 237.75314 \quad (3)$$

In a preferred embodiment, YUV-to-RGB converter 1120 converts video data from YUV format to RGB format by implementing Equations (4)–(6) below:

$$R = Y + \frac{11}{8} V - 192 \quad (4)$$

$$G = Y - \frac{11}{16} V - \frac{3}{8} U + 116 \quad (5)$$

$$B = Y + \frac{7}{4} U - 238 \quad (6)$$

Any results of Equations (4)–(6) that are greater than 255 or less than 0 are clipped to 255 and 0, respectively. Those skilled in the art will understand that Equations (4)–(6) have been selected to allow implementation of all divisions as binary shifts in hardware.

In a preferred embodiment of display interface 508, horizontal display pre-scaler 1102, vertical display scaler 1104, and vertical display controller 1106 operate at 50 MHz under the control of the video subsystem clock. On the other hand, the clock of display monitor 310 preferably controls the processing of horizontal Y display scaler 1110, horizontal Y display controller 1112, horizontal U display scaler 1114, horizontal UV display controller 1116, horizontal V display scaler 1118, and YUV-to-RGB converter 1120.

The processing of display interface 508 is driven by parameter values loaded into control registers by host processor 302. These parameters relate to bitmap location, scaling, and positioning. Bitmap location parameters include the start addresses and pitches for the Y-, U-, and V-component bitmaps. Scaling parameters include the horizontal and vertical scale values for the Y component, which are also used to process the U and V components. Positioning parameters include start and stop positions for the horizontal and vertical displays relative to the Hsync and Vsync signals of the display raster, respectively.

Description of Raster Generator

Figure 29:
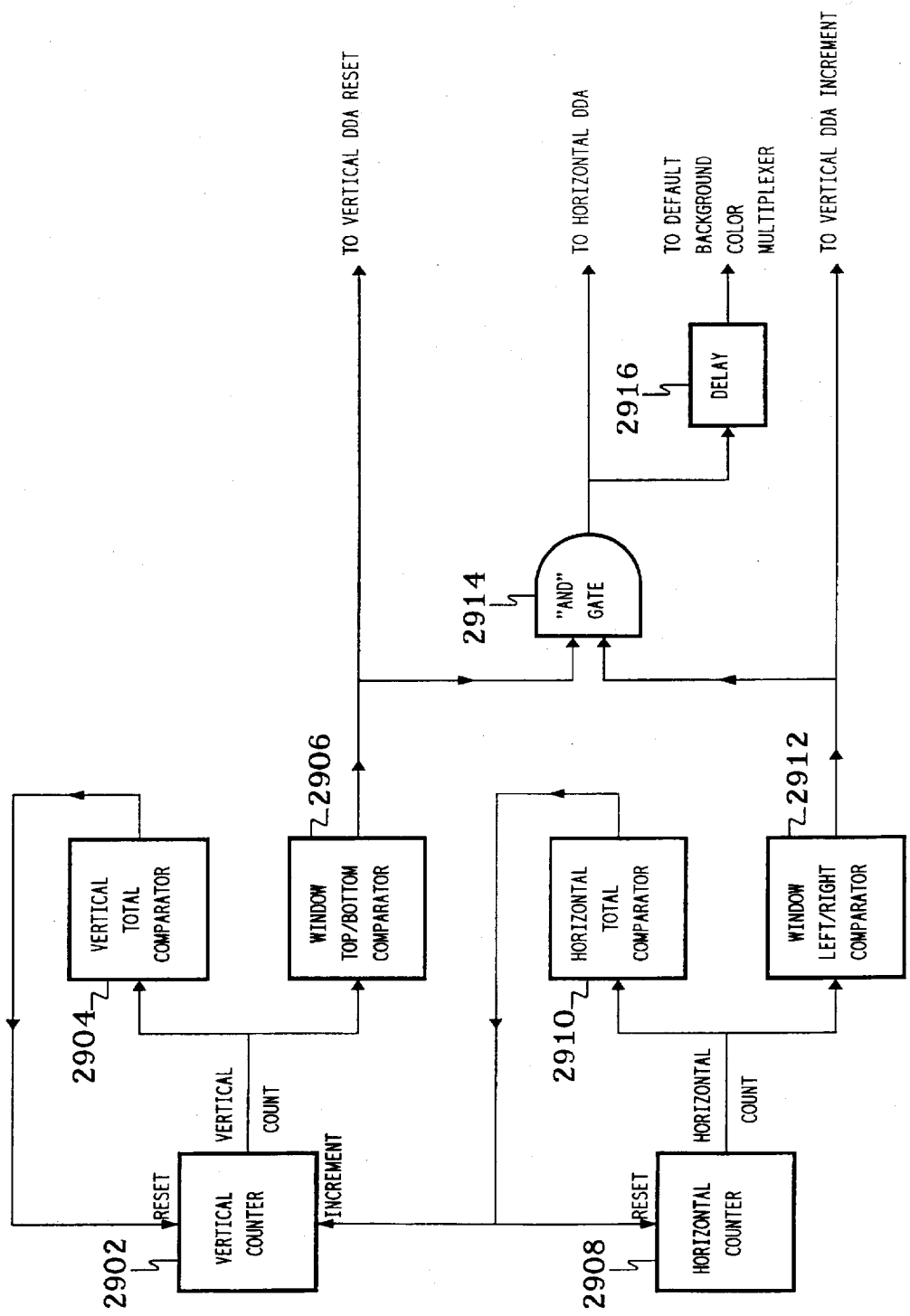
FIG. 29 is a block diagram of the raster generator of the display interface of FIG. 11.

Referring now to FIG. 29, there is shown a block diagram of raster generator 2900 of display interface 508 (not shown in FIG. 11). Raster generator 2900 generates a repeating sequence of counts that associate the position of the raster of display monitor 310 with vertical and horizontal count values. Raster generator 2900 either may generate sync signals or may gen-lock to external sync signals by conventional means known to those skilled in the art.

The position and size of the video window to be displayed on display monitor 310 are specified by values stored in registers in video support component 404. The left and right edges of the video window within the overall raster are specified by window left and right values. Similarly, the top and bottom edges of the video window within the overall raster are specified by window top and bottom values.

Vertical counter 2902 and horizontal counter 2908 of raster generator 2900 generate vertical and horizontal counts, respectively. Window left/right comparator 2912 compares the horizontal count to the specified window left and right values. Window left/right comparator 2912 outputs a "true" signal when the horizontal count is between the window left and window right values; otherwise comparator 2902 outputs a "false" signal. Similarly, window top/bottom comparator 2906 compares the vertical count to the specified window top and bottom values. Window top/bottom comparator 2906 outputs a "true" signal when the vertical count is between the window top and window bottom values; otherwise comparator 2906 outputs a "false" signal.

When the outputs of both window comparators 2906 and 2912 are true, then the video window is determined to be active by "AND" gate 2914. In that case, the bitmap data stored within the partial line buffers of horizontal display scalers 1110, 1114, and 1118 are processed by scalers 1110, 1114, and 1118 and YUV-to-RGB converter 1120 for display on display monitor 310. When this data is processed, the horizontal DDA increments on each display pixel clock, controlling the horizontal scaling appropriately. The processing of horizontal display scalers 1110, 1114, and 1118 is described in further detail later in this specification in conjunction with FIG. 14.

While horizontal display scalers 1110, 1114, and 1118 outputs data, more data is fetched from the display bitmaps in DRAM 408 to replace the data already processed, using values from the vertical DDA to control the vertical scaling. When the output of window left/right comparator goes "false," the right side of the video window is reached and any remaining data in the partial line buffers of horizontal display scalers 1110, 1114, and 1118 is considered invalid. In that case, new data is pre-fetched for the new scan line until the partial line buffers are refilled.

When the output of either window comparator 2906 or 2912 is false, processing stops and the horizontal DDA is reset to its start value, which is typically 0. In addition, when the output of window top/bottom comparator 2906 is false (without regard to the output of window left/right comparator 2912) then the vertical DDA is reset to its start value, which is also typically 0. When the output of window top/bottom comparator 2906 is true, the vertical DDA increments with each new display scan line, as determined by the output of window left/right comparator 2912 going "false," thereby controlling the vertical scaling appropriately as data for a new display scan line is fetched.

Horizontal total comparator 2910 compares the horizontal count with a specified value corresponding to the total number of columns per scan line in the raster field. When the horizontal count exceeds the specified horizontal limit, the end of a raster scan line is reached. In that case, horizontal counter 2908 is reset and vertical counter 2902 is incremented for the beginning of the next raster scan line.

Similarly, vertical total comparator 2904 compares the vertical count with a specified value corresponding to the total number of scan lines per raster field. When the vertical count exceeds the specified vertical limit, the end of a raster field is reached. In that case, vertical counter 2902 is reset and a pre-fetch operation is begun to pre-fetch data for the very first display scan line of the video window in the new raster field.

In a preferred embodiment, a multiplexer (not shown) may be placed at the output of YUV-to-RGB converter 1120 to assert a default background color when the output of either window comparator 2906 or 2912 is "false." The signal to control this multiplexer is delayed (by delay 2916) to compensate for processing delays in the data path within and after horizontal display scalers 1110, 1114, and 1118.

Description of Horizontal Display Pre-Scaler

Figure 30:
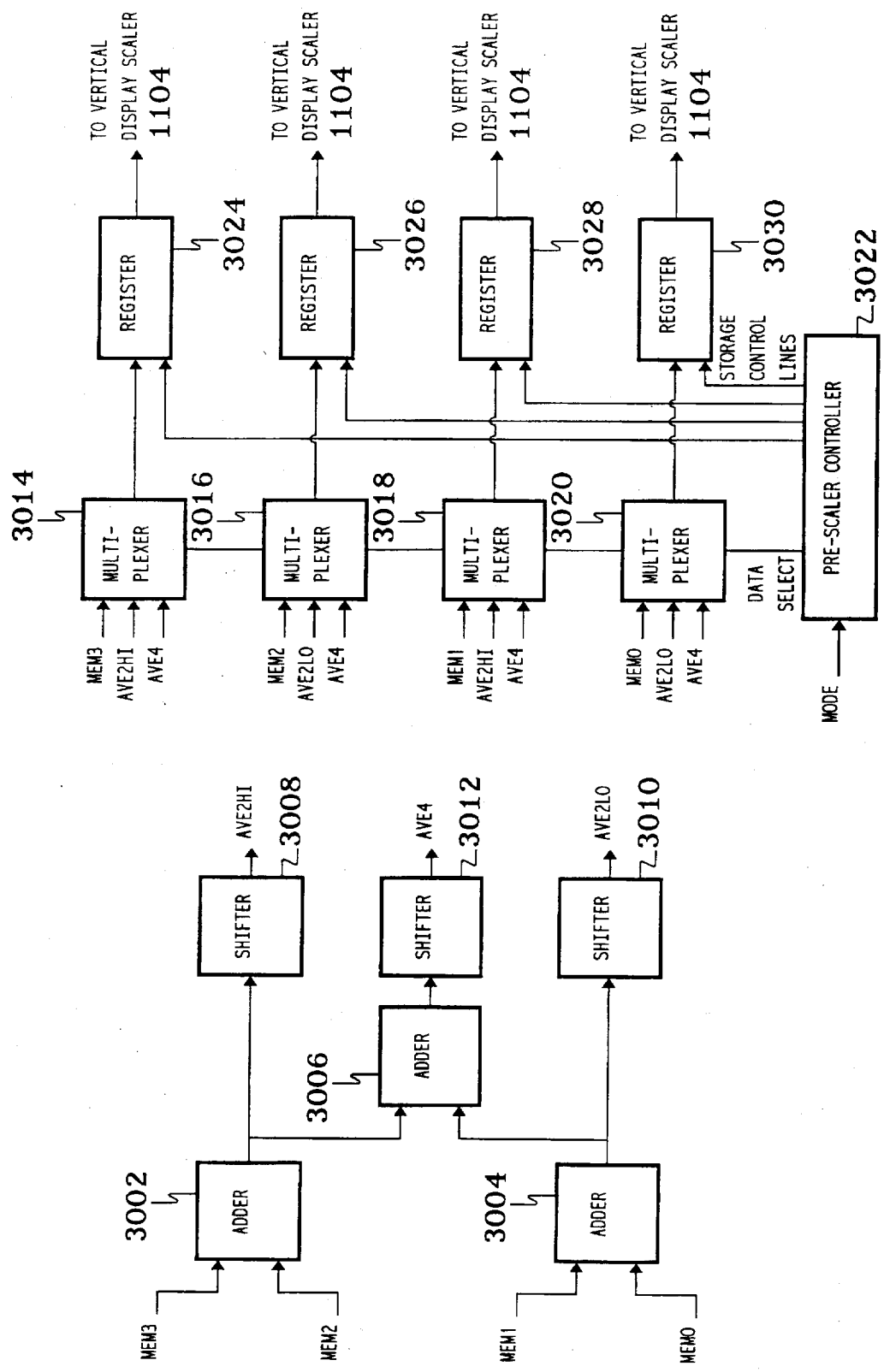
FIG. 30 is a block diagram of the horizontal display pre-scaler of the display interface of FIG. 11.

Referring now to FIG. 30, there is shown a block diagram of a preferred embodiment of horizontal display pre-scaler 1102 of display interface 508 of FIG. 11, according to a preferred embodiment of the present invention. Horizontal display pre-scaler 1102 receives from DRAM interface 506 component data corresponding to a bitmap stored in DRAM 408 and pre-filters the data horizontally in one of three modes of operation. Mode 0 involves no horizontal pre-scaling, while modes 1 and 2 involve horizontal pre-scaling by averaging two and four consecutive component values, respectively.

Pre-scaler 1102 receives data from DRAM 408 four bytes (i.e., mem0, mem1, mem2, and mem3) at a time. Adder 3002 adds mem2 and mem3, while adder 3004 adds mem0 and mem1. Adder 3006 adds the outputs of adders 3002 and 3004 to form the sum of all four bytes. Shifter 3008 shifts the output of adder 3002 right one bit to generate the average (i.e., ave2hi) of mem2 and mem3. Similarly, shifter 3010 shifts the output of adder 3004 right one bit to generate the average (i.e., ave2lo) of mem0 and mem1, while shifter 3012 shifts the output of adder 3006 right two bits to generate the average (i.e., ave4) of all four bytes.

The data values mem0, mem1, mem2, mem3, ave2hi, ave2lo, and ave4 are transmitted to four multiplexers 3014, 3016, 3018, and 3020 as presented in FIG. 30. The specified mode determines the output of each multiplexer. In mode 0 (i.e., 1:1 or no pre-scaling), multiplexers 3014, 3016, 3018, and 3020 output values mem3, mem2, mem1, or mem0, respectively. In mode 1 (i.e., 2:1 pre-scaling), multiplexers 3014, 3016, 3018, and 3020 output values ave2hi, ave2lo, ave2hi, and ave2lo, respectively. In mode 2 (i.e., 4:1 pre-scaling), multiplexers 3014, 3016, 3018, and 3020 all output value ave4.

Horizontal pre-scale controller 3022 controls the clock lines (i.e., storage control lines) for registers (i.e., storage elements) 3024, 3026, 3028, and 3030 depending on the specified mode. In mode 0, controller 3022 clocks all four clock lines simultaneously to fill all four registers 3024, 3026, 3028, and 3030 simultaneously with values mem3, mem2, mem1, and mem0, respectively.

In mode 1, controller 3022 clocks registers 3028 and 3030 simultaneously to load registers 3028 and 3030 with values ave2hi and ave2lo, respectively, for the first four bytes of data from DRAM 408. Controller 3022 then clocks registers 3024 and 3026 simultaneously to load registers 3024 and 3028 with values ave2hi and ave2lo, respectively, for the second four bytes of data from DRAM 408.

In mode 2, controller 3022 clocks register 3030 to load register 3030 with value ave4 for the first four bytes of data from DRAM 408. Similarly, controller 3022 sequentially clocks registers 3028, 3026, and 3024 to load registers 3028, 3026, and 3024 with the value ave4 for the second, third, and fourth four bytes of data from DRAM 408, respectively.

In either modes 0, 1, or 2, once all four registers 3024, 3026, 3028, and 3030 are filled with valid data, then the pre-filtered data is transmitted to vertical display scaler 1104.

Figure 12:
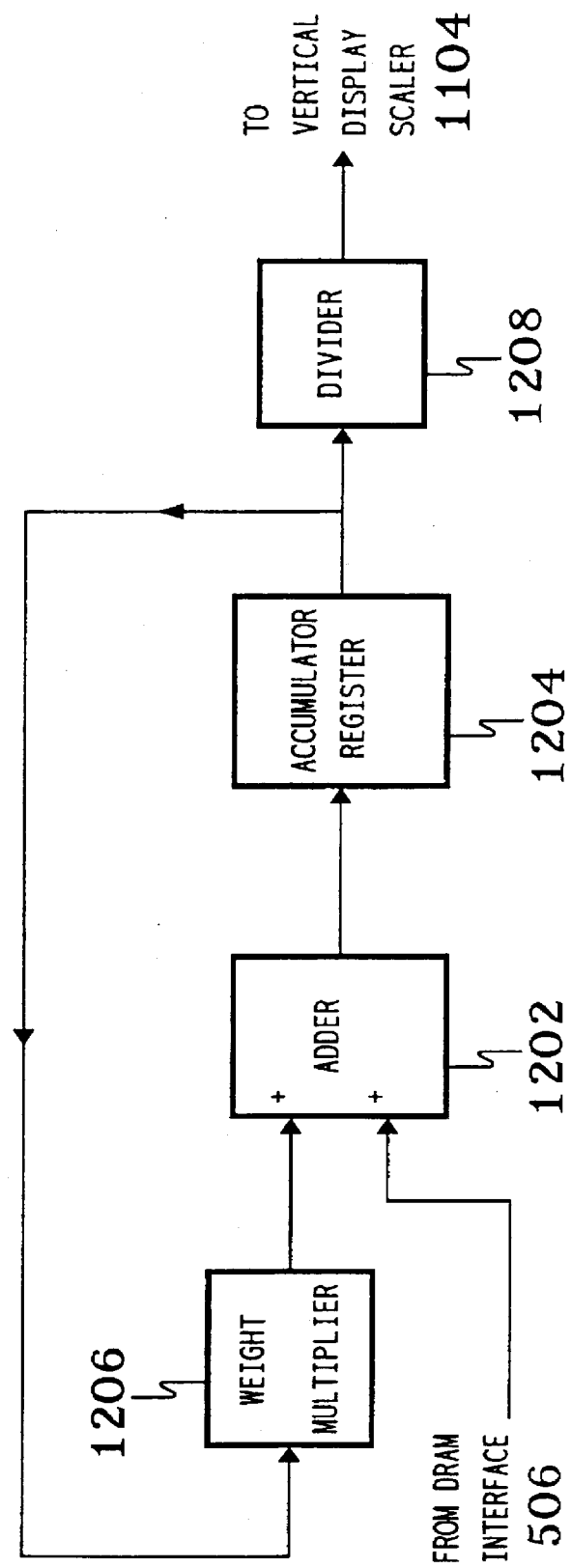
FIG. 12 is a block diagram of an alternative preferred embodiment of the horizontal display pre-scaler of the display interface of FIG. 11.

Referring now to FIG. 12, there is shown a block diagram of an alternative preferred embodiment of horizontal display pre-scaler 1102 of display interface 508 of FIG. 11, according to a preferred embodiment of the present invention. Horizontal display pre-scaler 1102 receives from DRAM interface 506 component data corresponding to a bitmap stored in DRAM 408 and filters the data horizontally in one of three modes of operation. Mode 0 involves no horizontal pre-scaling, while modes 1 and 2 involve horizontal pre-scaling by averaging two and four consecutive component values, respectively.

In mode 1, pre-scaler 1102 averages consecutive components i and i+1. When adder 1202 receives component i from DRAM interface 506, weight multiplier 1206 multiplies the output from accumulator register 1204 by 0 to initialize accumulator register 1204 to the value of component i. When adder 1202 receives component i+1 from DRAM interface 506, weight multiplier 1206 multiplies the output from accumulator register 1204 by 1 to add the values of components i and i+1 together. Divider 1208 then divides the accumulated total by two and transmits the horizontally pre-scaled component value to vertical display scaler 1104.

In mode 2, pre-scaler 1102 averages consecutive components i, i+1, i+2, and i+3 under processing similar to that of mode 1, except that the accumulated total is reset after every four components and divider 1208 divides by four.

Those skilled in the art will understand that divider 1208 preferably divides by shifting bits in hardware.

In mode 0, pre-scaler 1102 performs no averaging. In mode 0, weight multiplier 1206 continuously multiplies the output of accumulator register 1204 by 0 and divider 1208 performs no division. As such, each component received by adder 1202 from DRAM interface 506 is passed through pre-scaler 1102 unchanged.

Those skilled in the art will understand that alternative preferred embodiments of the horizontal display pre-scaler may implement other averaging schemes and/or other non-averaging filtering schemes such as simply skipping pixel components.

Description of Vertical Display Scaler

Figure 13:
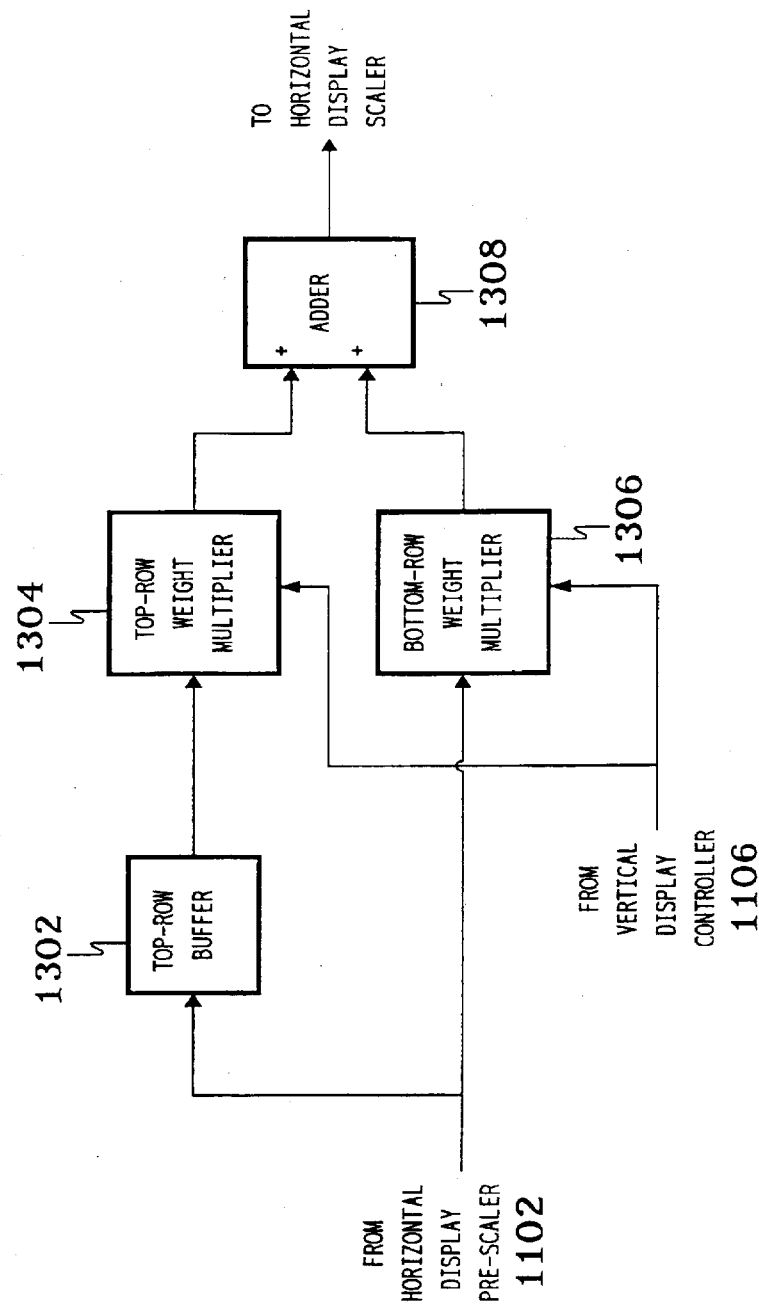
FIG. 13 is a block diagram of the vertical display scaler of the display interface of FIG. 11.

Referring now to FIG. 13, there is shown a block diagram of vertical display scaler 1104 of display interface 508 of FIG. 11, according to a preferred embodiment of the present invention. The processing of vertical display scaler 1104 is dictated by the accumulated DDA value generated by DDA-based vertical display controller 1106. The accumulated vertical display DDA value determines whether vertical display scaler 1104 operates in one of three filtering modes or one non-filtering mode. In the filtering modes (modes 1, 2, and 3), vertical display scaler 1104 filters between consecutive bitmap rows. In the non-filtering mode (mode 0), vertical display scaler 1104 simply transmits a single row of bitmap data to the appropriate horizontal display scaler of display interface 508.

Table III presents four modes implemented by vertical display scaler 1104 as dictated by the accumulated vertical display DDA value. When the two most significant bits (MSBs) of the remainder (i.e, the fractional part of the accumulated vertical display DDA value) are 00, then vertical display scaler 1104 operates in non-interpolating mode 0. Otherwise, vertical display scaler 1104 implements one of the three interpolation schemes listed in Table III for modes 1, 2, and 3.

TABLE III

VERTICAL DISPLAY SCALER OPERATING MODES

| MODE | DDA VALUE REMAINDER MSBs | TOP-LINE WEIGHT FACTOR | BOTTOM-LINE WEIGHT FACTOR |
|---|---|---|---|
| 0 | 00 | 0 | 1 |
| 1 | 01 | 3/4 | 1/4 |
| 2 | 10 | 1/2 | 1/2 |
| 3 | 11 | 1/4 | 3/4 |

In non-interpolating mode 0, vertical display scaler 1104 receives from horizontal display pre-scaler 1102 horizontally pre-scaled data from a single row i of the bitmap stored in DRAM 408. In that case, the data passes through bottom-row weight multiplier 1306 (without being multiplied) and through adder 1308 (without being added) to the appropriate one of horizontal display scalers 1110, 1114, and 1118.

In interpolating modes 1, 2, and 3, a portion of row i of the bitmap in DRAM 408 is optionally pre-scaled by horizontal display pre-scaler 1102 and stored to top-row buffer 1302. In a preferred embodiment, top-row buffer 1302 holds up to 32 bytes of data. Corresponding data from bitmap row i+1 are then optionally pre-scaled and received by bottom-row weight multiplier 1306.

As bottom-row weight multiplier 1306 multiplies the data for bitmap row i+1 by a specified weight factor, top-row weight multiplier 1304 receives the corresponding data for bitmap row i from top-row buffer 1302 and multiplies that data by a (potentially different) specified weight factor. The specified weight factors are those listed in Table III and are selected by vertical display controller 1106 based upon the accumulated vertical display DDA value.

Adder 1308 then adds the corresponding weighted data together and transmits the vertically scaled data to the appropriate one of horizontal display scalers 1110, 1114, and 1118.

In a preferred embodiment, the value of i is equal to the integer part of the accumulated DDA value for all four operating modes of vertical display scaler 1104.

Those skilled in the art will understand that vertical display scaler 1104 may be used to enlarge or reduce the bitmap stored in DRAM 408 in the vertical dimension by any amount. For example, Table IV presents the flow of processing when vertical display scaler 1104 enlarges the bitmap vertically based on a specified vertical display DDA ratio of 0.25. As a further example, Table V presents the flow of processing when vertical display scaler 1104 reduces the bitmap vertically based on a specified vertical display DDA ratio of 2.75. Those skilled in the art will understand that, when the bitmap is enlarged for display, the same two rows of the bitmap may be processed for different accumulated DDA values. Similarly, when the bitmap is reduced for display, rows of the bitmap may be skipped.

TABLE IV

VERTICAL DISPLAY SCALING FOR DDA RATIO = 0.25

| ACCUMULATED DDA VALUE | REMAINDER MSBs | MODE | TOP ROW | BOTTOM ROW |
|---|---|---|---|---|
| 0.00 | 00 | 0 | — | 0 |
| 0.25 | 01 | 1 | 0 | 1 |
| 0.50 | 10 | 2 | 0 | 1 |
| 0.75 | 11 | 3 | 0 | 1 |
| 1.00 | 00 | 0 | — | 1 |
| 1.25 | 01 | 1 | 1 | 2 |
| 1.50 | 10 | 2 | 1 | 2 |
| . | . | . | . | . |

TABLE V

VERTICAL DISPLAY SCALING FOR DDA RATIO = 2.75

| ACCUMULATED DDA VALUE | REMAINDER MSBs | MODE | TOP ROW | BOTTOM ROW |
|---|---|---|---|---|
| 0.00 | 00 | 0 | — | 0 |
| 2.75 | 11 | 3 | 2 | 3 |
| 5.50 | 10 | 2 | 5 | 6 |
| 8.25 | 01 | 1 | 8 | 9 |
| 11.00 | 00 | 0 | — | 11 |
| 13.75 | 11 | 3 | 13 | 14 |
| 16.50 | 10 | 2 | 16 | 17 |
| . | . | . | . | . |

In a preferred embodiment, vertical display scaler 1104 processes blocks of up to 32 component samples, one component at a time, whenever there is room in the internal buffers of one of the horizontal display scalers 1110, 1114, and 1118.

Those skilled in the art will understand that interpolating schemes other than those listed in Table III fall within the scope of the present invention. In addition, alternative preferred embodiments of the vertical display scaler may select the best fit rather than interpolate between lines, where the best fit may be the row closest to the accumulated DDA value or simply the row corresponding to the integer part of the accumulated DDA value.

Description of Horizontal Display Scaler

Figure 14:
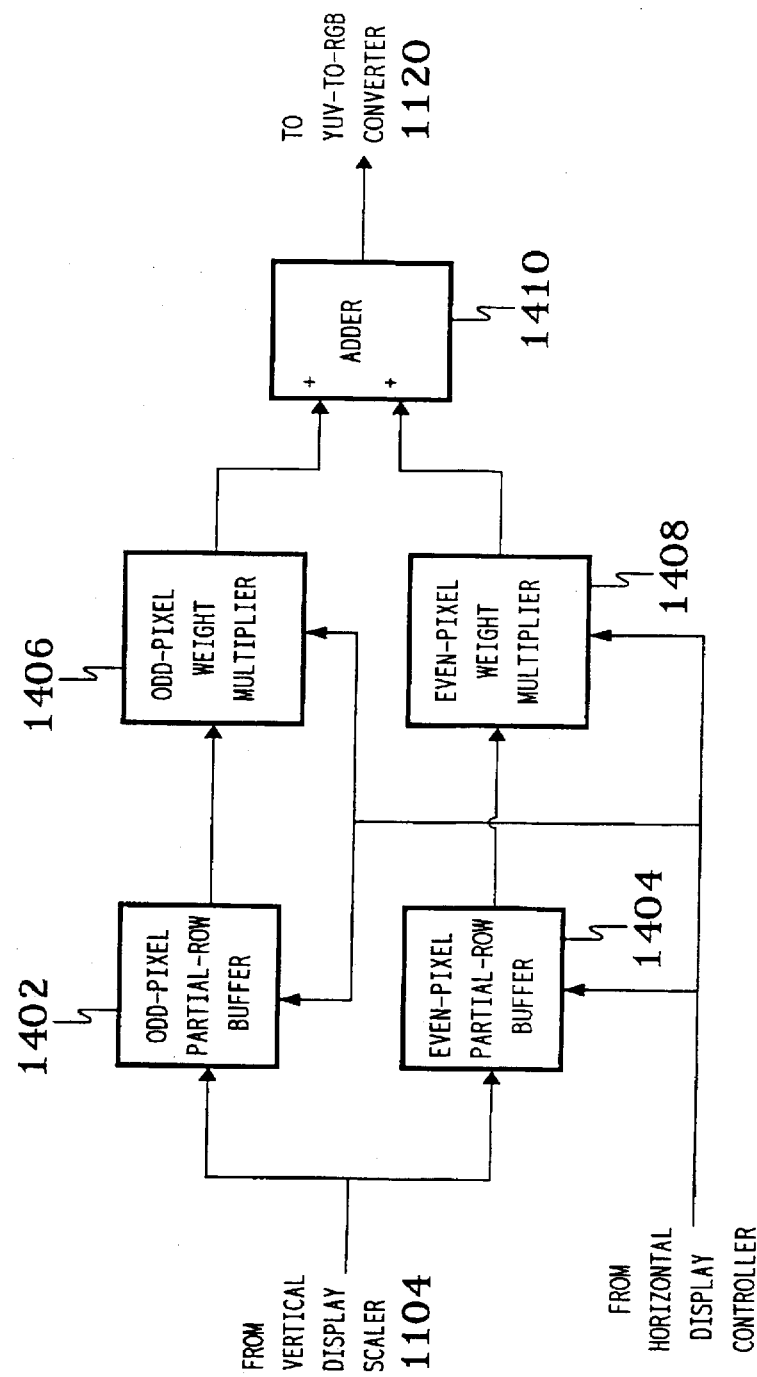
FIG. 14 is a block diagram of a horizontal display scaler of the display interface of FIG. 11.

Referring now to FIG. 14, there is shown a block diagram of a horizontal display scaler 1400. Horizontal display scaler 1400 is a preferred embodiment of horizontal Y display scaler 1110, horizontal U display scaler 1114, and horizontal V display scaler 1118 of display interface 508 of FIG. 11. Horizontal Y display scaler 1110 is controlled by DDA-based horizontal Y display controller 1112. Horizontal U and V display scalers 1114 and 1118 are controlled by horizontal UV display controller 1116, which is described in further detail later in this specification in conjunction with FIG. 15. The three horizontal display scalers 1110, 1114, and 1118 provide partial row buffering and any specified shrinkage or expansion of the three components Y, U, and V, respectively, in the horizontal dimension within the display window.

Table VI summarizes the eight different modes of operation of horizontal display scaler 1400. The least significant bit (LSB) of the integer part and the two MSBs of the remainder part of the accumulated DDA value generated by the appropriate horizontal display controller dictate the current operating mode for horizontal display scaler 1400.

TABLE VI

HORIZONTAL DISPLAY SCALER OPERATING MODES

| MODE | DDA VALUE INTEGER LSB | DDA VALUE REMAINDER MSBs | EVEN-PIXEL WEIGHT FACTOR | ODD-PIXEL WEIGHT FACTOR |
|---|---|---|---|---|
| 0 | 0 | 00 | 1 | 0 |
| 1 | 0 | 01 | ¾ | ¼ |
| 2 | 0 | 10 | ½ | ½ |
| 3 | 0 | 11 | ¼ | ¾ |
| 4 | 1 | 00 | 0 | 1 |
| 5 | 1 | 01 | ¼ | ¾ |
| 6 | 1 | 10 | ½ | ½ |
| 7 | 1 | 11 | ¾ | ¼ |

Referring again to FIG. 14, vertically scaled data for a single video component is received from vertical display scaler 1104 and distributed with the odd pixels (i.e., those pixels in columns 1, 3, 5, etc. of the bitmap in DRAM 408) stored to odd-pixel partial-row buffer 1402 and the even pixels (i.e., those pixels in columns 0, 2, 4, etc. of the bitmap) stored to even-pixel partial-row buffer 1404. In a preferred embodiment of horizontal Y display scaler 1110, partial-row buffers 1402 and 1404 are 32-byte buffers that have random access read capability. Similarly, in preferred embodiments of horizontal U display scaler 1114 and horizontal V display scaler 1118, partial-row buffers 1402 and 1404 are 16-byte buffers that have random access read capability.

Based on the accumulated DDA value generated by the appropriate horizontal display controller, a pair of consecutive pixels (i.e., one odd pixel and one even pixel) is selected from partial-row buffers 1402 and 1404. Odd-pixel weight multiplier 1406 multiplies the odd-pixel value by a selected weight factor, while even-pixel weight multiplier 1408 multiplies the even-pixel value by a possibly different selected weight factor. The weight factors are selected by the appropriate horizontal display controller based on the accumulated DDA value as listed in Table VI.

Adder 1410 then adds the weighted pixel values together and transmits the resulting fully scaled value to YUV-to-RGB converter 1120.

Those skilled in the art will understand that horizontal display scaler 1400 may be used to enlarge or reduce the bitmap in the horizontal dimension by any amount. For example, Table VII presents the flow of processing when horizontal display scaler 1400 enlarges the bitmap horizontally based on a specified horizontal display DDA ratio of 0.25. As a further example, Table VIII presents the flow of processing when horizontal display scaler 1400 reduces the bitmap horizontally based on a specified horizontal display DDA ratio of 2.75. Those skilled in the art will understand that, when the bitmap is enlarged for display, the same two pixels of the bitmap may be processed for different accumulated DDA values. Similarly, when the bitmap is reduced for display, pixels of the bitmap may be skipped.

TABLE VII

HORIZONTAL DISPLAY SCALING FOR DDA RATIO = 0.25

ACCU-

| ACCU-MULATED DDA VALUE | INTEGER LSB | REMAINDER MSBs | MODE | EVEN PIXEL | ODD PIXEL |
|---|---|---|---|---|---|
| 0.00 | 0 | 00 | 0 | 0 | 1 |
| 0.25 | 0 | 01 | 1 | 0 | 1 |
| 0.50 | 0 | 10 | 2 | 0 | 1 |
| 0.75 | 0 | 11 | 3 | 0 | 1 |
| 1.00 | 1 | 00 | 4 | 2 | 1 |
| 1.25 | 1 | 01 | 5 | 2 | 1 |
| 1.50 | 1 | 10 | 6 | 2 | 1 |
| 1.75 | 1 | 11 | 7 | 2 | 1 |
| 2.00 | 0 | 00 | 0 | 2 | 3 |
| 2.25 | 0 | 01 | 1 | 2 | 3 |
| 2.50 | 0 | 10 | 2 | 2 | 3 |
| . | . | . | . | . | . |
| . | . | . | . | . | . |
| . | . | . | . | . | . |

TABLE VIII

HORIZONTAL DISPLAY SCALING FOR DDA RATIO = 2.75

| ACCU-MULATED DDA VALUE | INTEGER LSB | REMAINDER MSBs | MODE | EVEN PIXEL | ODD PIXEL |
|---|---|---|---|---|---|
| 0.00 | 0 | 00 | 0 | 0 | 1 |
| 2.75 | 0 | 11 | 3 | 2 | 3 |
| 5.50 | 1 | 10 | 6 | 6 | 5 |
| 8.25 | 0 | 01 | 1 | 8 | 9 |
| 11.00 | 1 | 00 | 4 | 12 | 11 |
| 13.75 | 1 | 11 | 7 | 14 | 13 |
| 16.50 | 0 | 10 | 2 | 16 | 17 |
| 19.25 | 1 | 01 | 5 | 20 | 19 |
| 22.00 | 0 | 00 | 0 | 22 | 23 |
| 24.75 | 0 | 11 | 3 | 24 | 25 |
| 27.50 | 1 | 10 | 6 | 28 | 27 |
| . | . | . | . | . | . |
| . | . | . | . | . | . |
| . | . | . | . | . | . |

Those skilled in the art will understand that the DDA ratios selected for use by horizontal display controllers 1112 and 1116 must take into account any selected horizontal pre-scaling implemented by horizontal display pre-scaler 1102. For example, if a (320×240) bitmap is to be displayed to a (256×192) window and if pre-scaler 1102 performs 2:1 horizontal pre-scaling, then the horizontal Y DDA ratio must be reduced from 320/256 or 1.25 by a factor of 2 to 0.625. Note that the vertical DDA ratio remains at 1.25, since pre-scaling is only in the horizontal dimension.

Those skilled in the art will also understand that interpolating schemes other than those listed in Table VI fall within the scope of the present invention. In addition, alternative preferred embodiments of the horizontal display scaler may select the best fit rather than interpolate between pixels, where the best fit may be the pixel closest to the accumulated DDA value or simply the pixel corresponding to the integer part of the accumulated DDA value.

Description of Horizontal UV Display Controller

Figure 15:
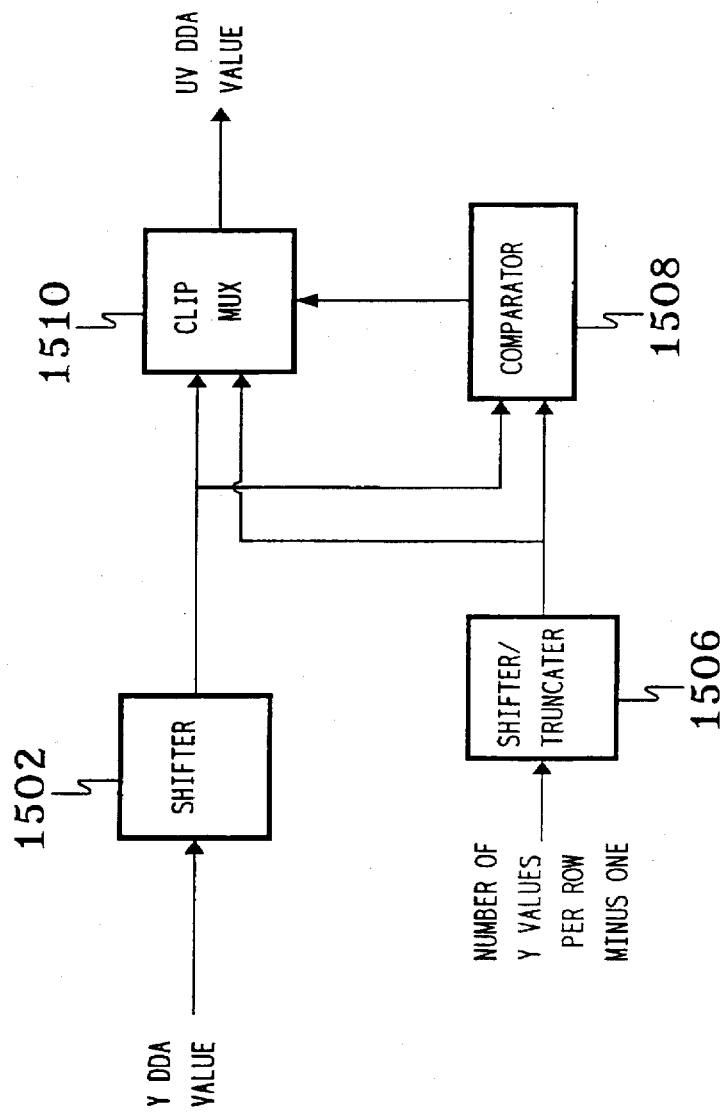
FIG. 15 is a block diagram of the horizontal UV display controller of the display interface of FIG. 11.

Referring now to FIG. 15, there is shown a block diagram of horizontal UV display controller 1116 of display interface 508 of FIG. 11, according to a preferred embodiment of the present invention. In a preferred embodiment of display interface 508, horizontal UV display controller 1116 uses the accumulated Y DDA value generated by horizontal Y display controller 1112 to control the processing performed by horizontal U and V display scalers 1114 and 1118. Those skilled in the art will understand that this allows horizontal display controllers 1112 and 1116 to share a common DDA, which is similar to DDA 600 of FIG. 6.

Horizontal UV display controller 1116 is preferably implemented in hardware. In a preferred embodiment of display interface 508, host processor 302 loads scaling registers only for the Y-component data. The hardware of controller 1116 generates the corresponding values for scaling the U- and V-component data, based on the specified subsampling ratios.

In particular, shifter 1502 of horizontal UV display controller 1116 receives the accumulated Y DDA value from horizontal Y display controller 1112 and, if appropriate, shifts the DDA value to adjust for subsampling of the U and V data. For example, if the U and V data are subsampled at a 2:1 ratio with respect to the Y data, then the accumulated Y DDA value is shifted right by one bit to divide the DDA value by two for use in processing U and V data. Similarly, for 4:1 subsampling, shifter 1502 shifts the Y DDA value right by two bits. If the video data is not subsampled, then shifter 1502 performs no shifting on the U and V component data.

In addition to shifting to adjust for subsampling, horizontal UV display controller 1116 also handles the processing of U and V data at the edges of frames of subsampled video data. Referring now to FIG. 16, there is shown a representation of the component data for a (12×8) bitmap 1600 in co-located YUV9 format. In co-located YUV9 data, the locations of the U and V data correspond to the locations of the Y components in the top left corner of each (4×4) block of Y data.

When co-located subsampled data are scaled for display, the subsampled U and V data are interpolated to "fill in" component values for all pixels. Thus, for example, for row 0 of bitmap 1600 of FIG. 16, the U components for columns 1, 2, and 3 are generated by interpolating between the U components for columns 0 and 4. Horizontal UV display controller 1116 preferably replicates the U and V values of column 8 to generate the U and V values for columns 9, 10, and 11.

To implement this replication, shifter/truncater 1506 receives a value corresponding to one less than the number of Y components per row. Shifter/truncater 1506 then shifts and truncates the received value to generate a UV end value. Shifter/truncater 1506 shifts right one bit for 2:1 subsampling and shifts right two bits for 4:1 subsampling.

Comparator 1508 then compares the UV end value with the shifted Y DDA value from shifter 1502. Based on that comparison, clip multiplexer (mux) 1510 transmits the lesser of the two values as the DDA value to be used for processing U and V data.

Referring again to the example of FIG. 16, shifter/truncater 1506 receives a value of 1011 (binary) (i.e., 11 (decimal)) corresponding to one less than the number of Y components per row of bitmap 1600 and decrements that value by one. Shifter/truncater 1506 shifts the value 1011 (binary) right two bits and truncates to generate a UV end value of 10 (binary) (i.e., 2 (decimal)). Those skilled in the art will understand that the UV end value corresponds to the last column in the subsampled U- and V-component bitmaps, where the first column is column 0. Thus, when the shifted Y DDA value exceeds 2.0, horizontal UV display controller 1116 generates a UV DDA value of 2.0. This forces horizontal U and V display scalers 1114 and 1118 to fill out the U and V data by replicating the U and V data in the last column of the U and V component bitmaps.

Those skilled in the art will understand that this replication occurs whether the bitmap is enlarged, reduced, or kept at the same horizontal dimension.

Those skilled in the art will understand that display interface 508 implements similar processing to handle the replication of subsampled U and V component data at the bottom edge of co-located subsampled data.

Those skilled in the art will understand further that centered subsampled data may be processed by appropriate shifting of the DDA values used for processing the U- and V-component data. Alternatively, horizontal UV display controller 1116 may have its own DDA with programmable initialization of accumulator register values to provide replication of U and V data along the left and top edges of the bitmap.

Description of Compression Mode Processing

Figure 17:
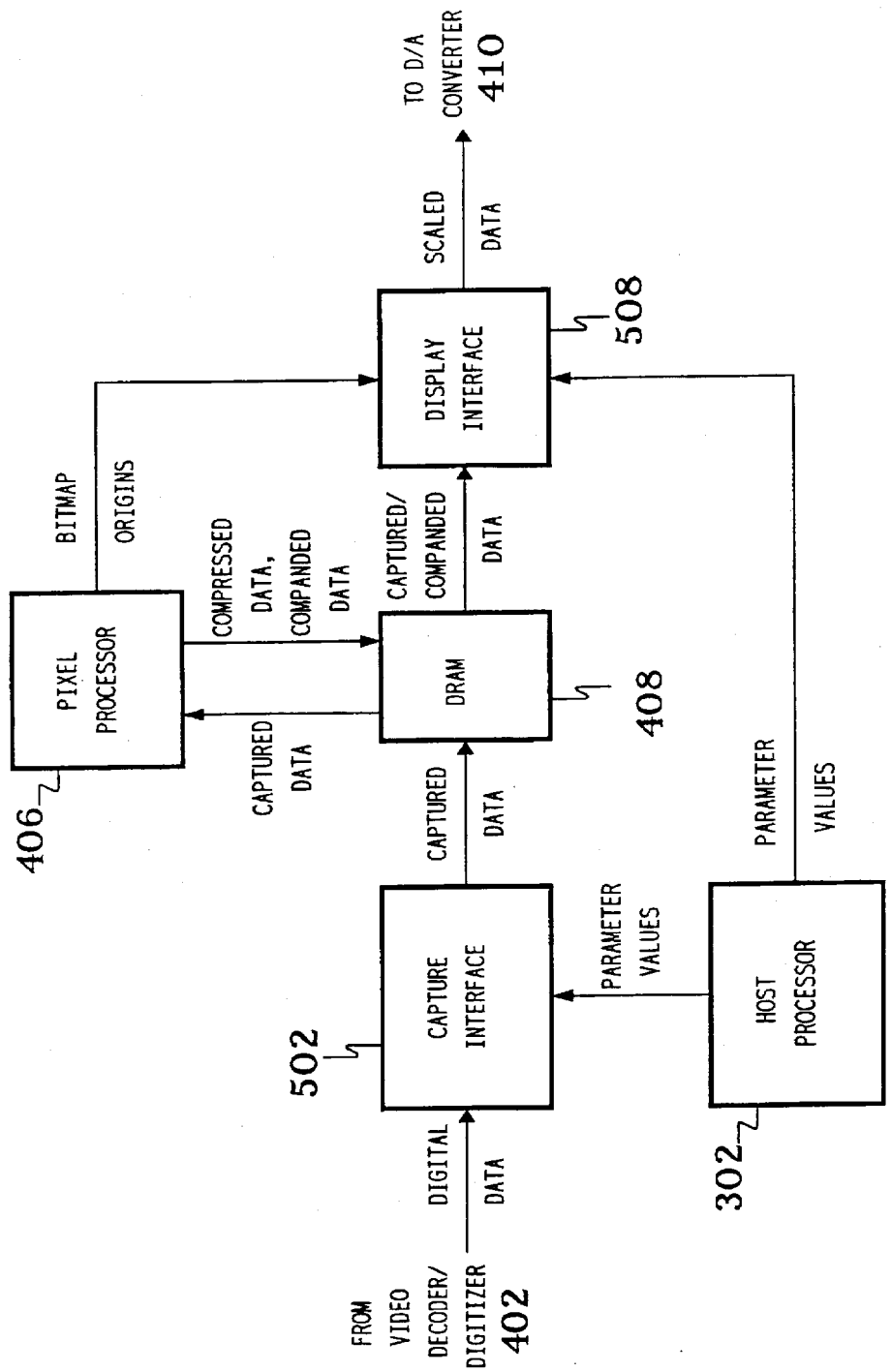
FIG. 17 is a block diagram of the compression mode processing of the video system of FIG. 3.

Referring now to FIG. 17, there is shown a block diagram of compression mode processing 1700 of video system 300. FIG. 17 represents the distribution of processing functions for video capture and does not depict all hardware connections and interfaces. In a preferred embodiment of the present invention, control of compression mode processing is divided between host processor 302 and video support component 404. Host processor 302 is responsible for real-time control of image capture as well as removal of compressed data from the compressed data buffer in DRAM 408. Video support component 404 is responsible for real-time control of compression of the captured data as well as deposit of the compressed data into the compressed data buffer.

Video generator 306 of video system 300 of FIG. 3 generates video data at a fixed rate. For example, when the National Television Systems Committee (NTSC) standard is used, video generator 306 generates approximately 60 fields of video data per second (30 even fields interleaved with 30 odd fields), where a full frame of video data consists of an even field and an odd field. In a preferred embodiment, capture interface 502 captures either only even field or only odd fields, as selected by host processor 302. Moreover, capture interface 502 need not capture every field of the selected type. Since capture interface 502 preferably captures only even or only odd fields, the terms "field of video data" and "frame of video data" are used interchangeably throughout most of this specification. Capture interface 502 also supports capture of video data generated under PAL scan rates.

When host processor 302 tells capture interface 502 to capture another field of video data, it also passes to capture interface 502 the bitmap origins (i.e., the locations in DRAM 408 to which the components Y, U, and V of the captured data are to be stored) and the various scaling parameters (e.g., DDA ratios) to be used in capturing the video data. Capture interface 502 then captures and stores the video data accordingly to DRAM 408.

In pass-through mode, the captured data may then be processed by display interface 508 and transmitted to display monitor 310 for display. In compression mode, the captured data is compressed by pixel processor 406 and stored back to DRAM 408 as a compressed bit stream. Those skilled in the art will understand that, during compressing mode, pixel processor 406 decompresses the compressed data to generate a companded bitmap that is also stored back to DRAM 408 and is used as a reference for compressing the next frame of video data as well as a display bitmap for compression mode monitoring.

Figure 1:
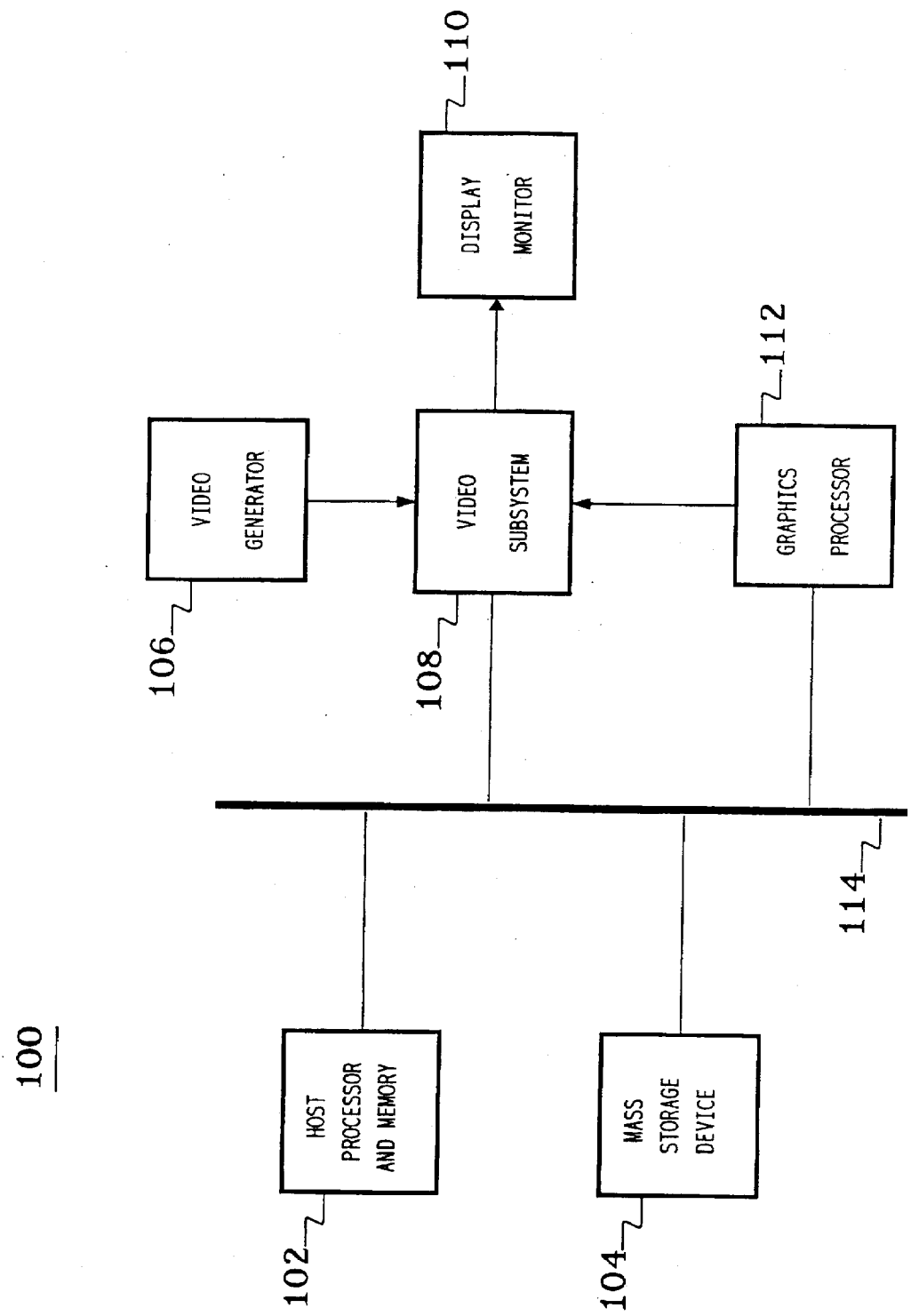
FIG. 1 is a block diagram of a conventional video system.

Thus, when video system 300 is operated in compression mode with monitoring selected, every frame of data that is captured and compressed is also decompressed and displayed, in real time. This differs from ActionMedia-II® video system 100 of FIG. 1, which, for example, captures and compresses even fields, and captures and displays odd fields that have not been compressed and decompressed. ActionMedia-II® video system 100 does not support real-time monitoring of the compression mode processing.

More particularly, compression mode processing is implemented via host compression driver which runs on host processor 302 and pixel processor compression control which runs on pixel processor 406. The host compression driver comprises an initialization function which initializes video subsystem 308 for capture, compression, and optional display of a video frame, a timing control function which controls the timing of when frames are captured and compressed, a data delivery function which reads compressed data from DRAM 408, and a window control function which updates registers in video support component 404 that control the size and position of the video window. Pixel processor compression control comprises algorithm set-up which sets up video support component 404 to capture a video frame into DRAM 408 and pixel processor 406 to encode (i.e., compress) a video frame stored in DRAM 408, encode algorithm which encodes the video frame, and algorithm follow-up which updates bitmap origin registers in video support component 404 to provide for the display of either the raw captured image (in pass-through mode) or the companded image (in compression mode monitoring). Pixel processor compression control is repeated for each frame of video data.

Initialization Function of Host Compression Driver

The initialization function of the host compression driver loads DRAM 408 with the following code and parameters for use by pixel processor 406:

1. Pixel processor algorithm set-up;
2. Pixel processor encode algorithm;
3. Pixel processor algorithm follow-up;
4. Address list for pixel processor algorithm set-up, encode algorithm, and algorithm follow-up; and
5. Encode control parameters.

The encode control parameters consist of values that indicate memory allocation parameters, bitmap circular buffer parameters, and bitmap characteristics parameters to the algorithm set-up and algorithm follow-up. The control parameters are pointed to by a value stored in a pixel processor 406 register, which is programmed initially by the initialization function.

The following memory allocation parameters indicate the location and size of blocks of data in DRAM 408:

1. Workspace origin;
2. Compressed data buffer queue base;
3. Compressed data buffer pitch;
4. Y bitmap queue base;
5. U bitmap queue base;
6. V bitmap queue base;
7. Y bitmap pitch;
8. U bitmap pitch; and
9. V bitmap pitch.

Workspace in DRAM 408 is used by algorithms for temporary storage of data.

The following bitmap circular buffer parameters indicate the current positions in the bitmap queues and compressed buffer queues:

1. Bitmap index;
2. Bitmap index maximum;
3. Compressed buffer index; and
4. Compressed buffer maximum.

Only one index value is needed for the compressed buffer because compressed data for all three components are combined into one bit stream.

The following bitmap characteristics parameters describe the address differences from scan line to scan line of video component bitmaps in DRAM 408:

1. Y scan line pitch;
2. U scan line pitch; and
3. V scan line pitch.

In addition, the initialization function loads a monitor program into the program memory of pixel processor 406. This monitor program walks down the address list, loads code pointed to by each address, and then passes control of pixel processor 406 to the code just loaded. In this way, the monitor program causes the algorithm set-up, encode algorithm, and algorithm follow-up to be loaded and executed in a repeating loop.

The initialization function also initializes the following "permanent" locations in the data memory of pixel processor 406:

1. Address list used by the monitor program;
2. Locations of encode control parameters;
3. Content indicators for compressed data buffers;
4. Control word; and
5. Compression signal.

Figure 18:
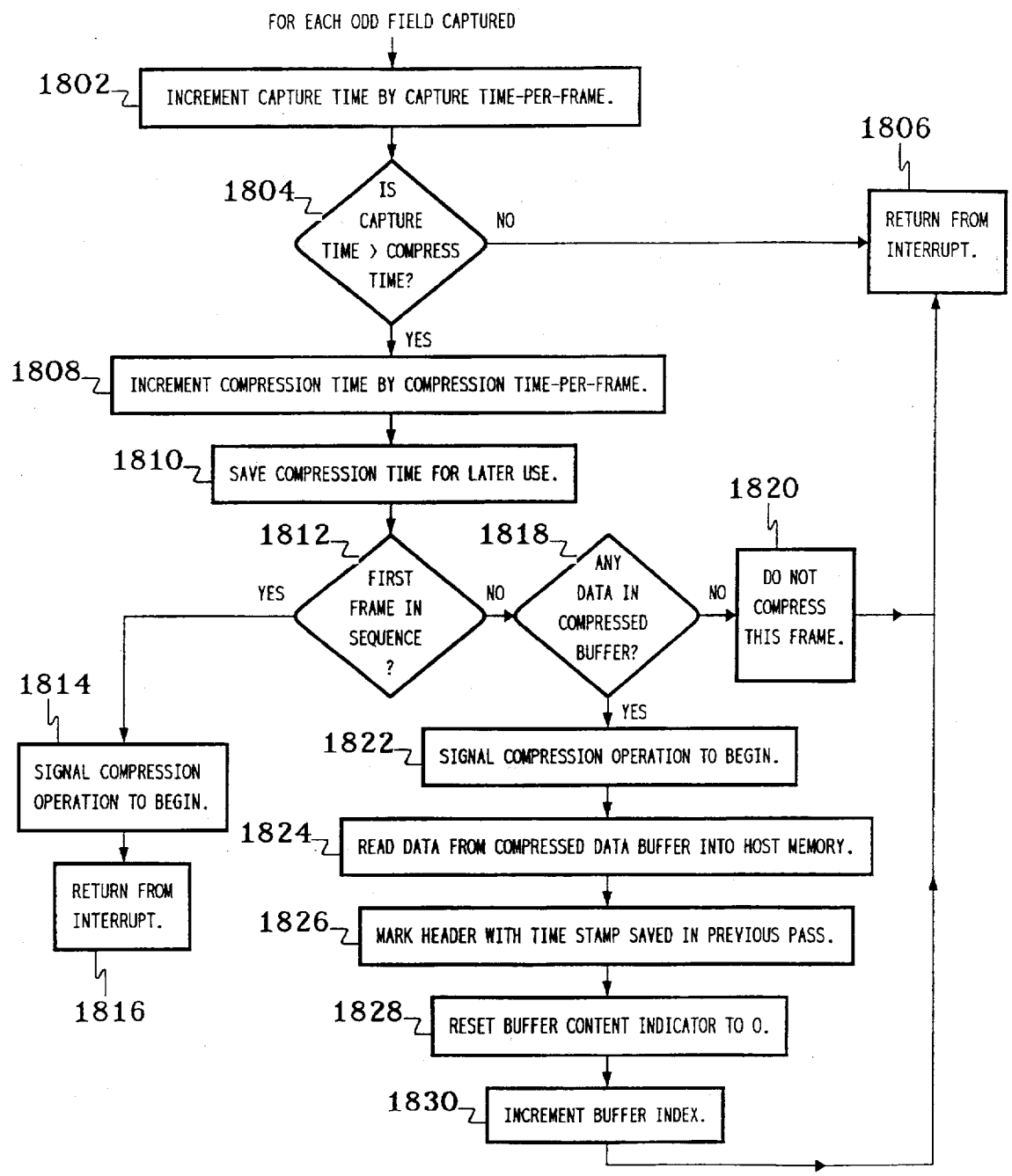
FIG. 18 is a process flow diagram of the interrupt service of the host compression driver for the compression mode processing of FIG. 17.

Referring now to FIG. 18, there is shown a process flow diagram of the interrupt service of the host compression driver for the compression mode processing of FIG. 17. The interrupt service comprises the timing control function and the data delivery function.

Timing Control Function of Host Compression Driver

The timing control function keeps track of time, based on polling the status of, or receiving interrupts from, capture interface 502 of video support component 404. Capture interface 502 differentiates between even fields and odd fields of video data generated by video generator 306. In a preferred embodiment, only odd fields are captured, thereby eliminating vertical jitter which may result when both odd and even fields are captured and compressed.

The timing control function maintains two time values (capture time and compression time), both of which are initialized to zero at the beginning of a capture/compression sequence. Capture time is incremented by the specified capture time-per-frame value each time an odd video source field has been captured (block 1802 of FIG. 18). Compression time is incremented by the specified encode time-per-frame value each time compression of a video frame is requested (block 1808).

If capture time is not greater than compression time (block 1804), then it is not yet time to capture a frame and the timing control function returns from the interrupt (block 1806). If capture time is greater than compression time (block 1804), then a compression of the current frame is desired. The timing control function also increments the compression time by the compression time-per-frame value (block 1808) and stores the updated compression time to be used as a time stamp when compressed data is read back into host processor 302 after the compression operation is complete (block 1810). This digital time accumulation scheme regulates the periodic compression of captured video at any specified compression frame rate, using the video source field rate as a controlling clock.

Data Delivery Function of Most Compression Driver

The data delivery function is executed once for each frame of compressed video data delivered from DRAM 408 to the video application software running on host processor 302. The data delivery function reads compressed data from a circular queue of data buffers in DRAM 408 and uses buffer content indicators to coordinate with the pixel processor compression control. There is preferably one buffer content indicator for each buffer used. In a preferred embodiment, two buffers are used in an alternating fashion, where one buffer is read by host processor 302 while the other buffer is filled by pixel processor 406.

The data delivery function monitors one of the buffer content indicators to determine when a compressed frame is available from video subsystem 308. If the current frame is the first frame in the sequence of video frames (block 1812 of FIG. 18), then the data delivery function signals the pixel processor compression control to proceed with a compression operation (block 1814), before returning from the interrupt (block 1816).

If the current frame is not the first frame (block 1812) and there is no data in the compressed buffer (block 1818), then the data delivery function does not signal a compression operation to begin. In this case, pixel processor 406 is still in the process of compressing a previous frame. Instead, the data delivery function skips the current frame (block 1820) and returns from the interrupt (block 1806).

If the current frame is not the first frame (block 1812) and there is data in the compressed buffer (block 1818), then pixel processor 406 has completed compression of the previous frame. The data delivery function signals the pixel processor compression control to proceed with a new compression operation (block 1822) (which will also cause the pixel processor compression control to modify capture interface 502 to deposit the next video data field in a new area of DRAM 408).

Once a frame is available, the data delivery function reads the compressed data from DRAM 408 into a memory buffer in host processor 302 for use by the video application software (block 1824) and marks the frame header with a compression time value (stored when the compression operation was initially signalled to pixel processor 406) (block 1826). The data delivery function then resets the buffer content indicator to zero (block 1828) and increments the buffer index (block 1830) before returning from the interrupt (block 1806).

Window Control Function of Host Compression Driver

The window control function of the host compression driver is executed whenever the video application software determines that the video window on display monitor 310 needs to change size or position. The video application software delivers the new window parameters to the host compression driver, indicating the size of the video window and its position on the display screen of display monitor 310. The video application software also delivers bitmap size to the host compression driver.

The window control function calculates the proper parameters to control the window parameter registers in video support component 404 and then loads these values into the corresponding hardware registers in video support component 404.

Pixel Processor Compression Control

The pixel processor compression control implements algorithm set-up, encode algorithm, and algorithm follow-up to compress and compand a frame of video data. Video frames are captured (by capture interface 502) into, compressed from, companded into, and displayed (by display interface 508) from a circular buffer of bitmaps in DRAM 408.

In a preferred embodiment, when compression mode monitoring is selected, only three bitmaps are used for each of the Y, U, and V components. For each component, one bitmap (the reference/display bitmap) serves as the display bitmap as well as the reference bitmap for performing compression based on frame differencing. A second bitmap (the companded bitmap) is compressed by the encode algorithm and then companded to serve as a reference frame for the next frame to be compressed. A third bitmap (the capture bitmap) is used as the destination for the capture process and will be the next frame to be compressed.

This rotating bitmap scheme allows the encode process to proceed in a hidden fashion without being displayed to the viewer. Once a bitmap has been compressed and then companded, the pixel processor compression control determines when to switch the bitmaps to display the newly companded bitmap. The previously displayed bitmap may then be hidden and used to capture a new video image.

When compression mode monitoring is selected, the current companded bitmaps for Y, U, and V are indicated directly by the bitmap index. The origins of the current companded bitmaps are preferably calculated using the following formula:

Companded Bitmap Origin=Bitmap Queue Base+(Bitmap Index×Bitmap Pitch)

The reference/display bitmaps are indicated by the bitmap index minus one. The origins of the current reference/display bitmaps are preferably calculated using the following formula:

Reference/Display Bitmap Origin=Bitmap Queue Base+((Bitmap Index−1)×Bitmap Pitch)

If the bitmap index is one, then:

Reference/Display Bitmap Origin=Bitmap Queue Base+(Bitmap Index Max×Bitmap Pitch)

The capture bitmaps are indicated by the bitmap index plus one. The origins of the current capture bitmaps are calculated using the following formula:

Capture Bitmap Origin=Bitmap Queue Base+((Bitmap Index+1)×Bitmap Pitch)

If the bitmap index is equal to the maximum bitmap index, then:

Capture Bitmap Origin=Bitmap Queue Base

In a preferred embodiment, when pass-through mode is selected and no compression is performed, only one bitmap is used for each of the Y, U, and V components. In that case, the capture and display bitmap origins are the bitmap queue base for each component.

During compression mode processing, compressed data are stored into a circular queue of compressed data buffers in DRAM 408. In a preferred embodiment, two buffers are used in an alternating fashion, so that one buffer may be read by host processor 302 while the other buffer may be filled by pixel processor 406.

The current compressed data buffer is indicated directly by the compressed buffer index. The origin of the current compressed data buffer is preferably calculated using the following formula:

Compressed Buffer Origin=Compressed Buffer Queue Base+ (Compressed Buffer Index×Compressed Buffer Pitch)

Figure 19:
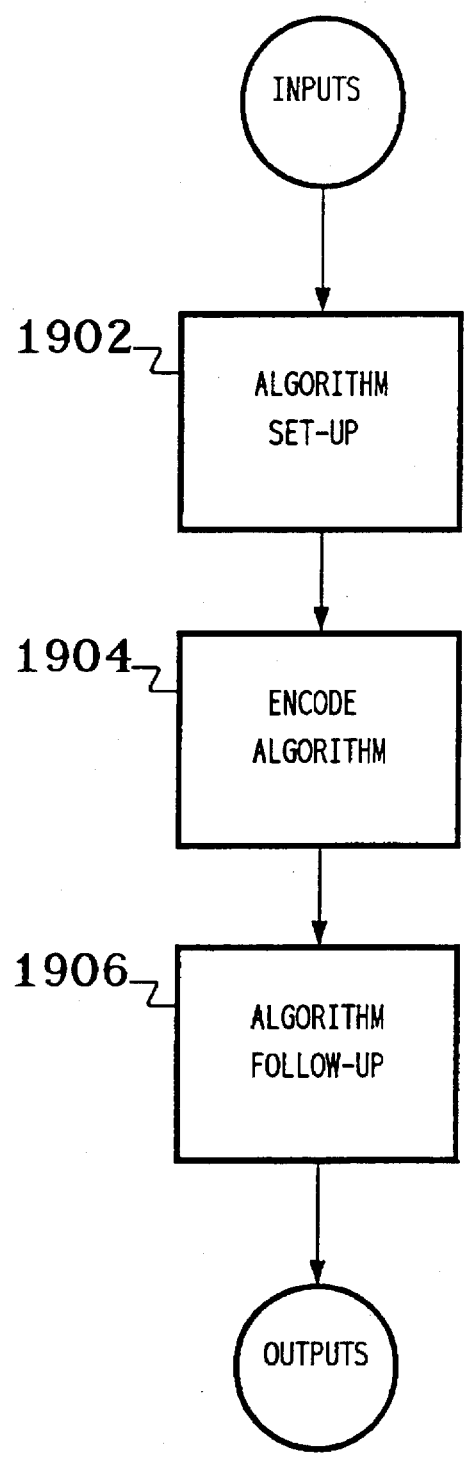
FIG. 19 is a process flow diagram of the processing implemented by the pixel processor of the video support component of FIG. 5 to encode one frame of video data.

Referring now to FIG. 19, there is shown a process flow diagram of the pixel processor compression control implemented by pixel processor 406 to encode (i.e., compress) one frame of video data stored as a captured bitmap in DRAM 408. The pixel processor compression control implements algorithm set-up (block 1902 Of FIG. 19), encode algorithm (block 1904), and algorithm follow-up (block 1906).

Algorithm Set-up of Pixel Processor Compression Control

Figure 20:
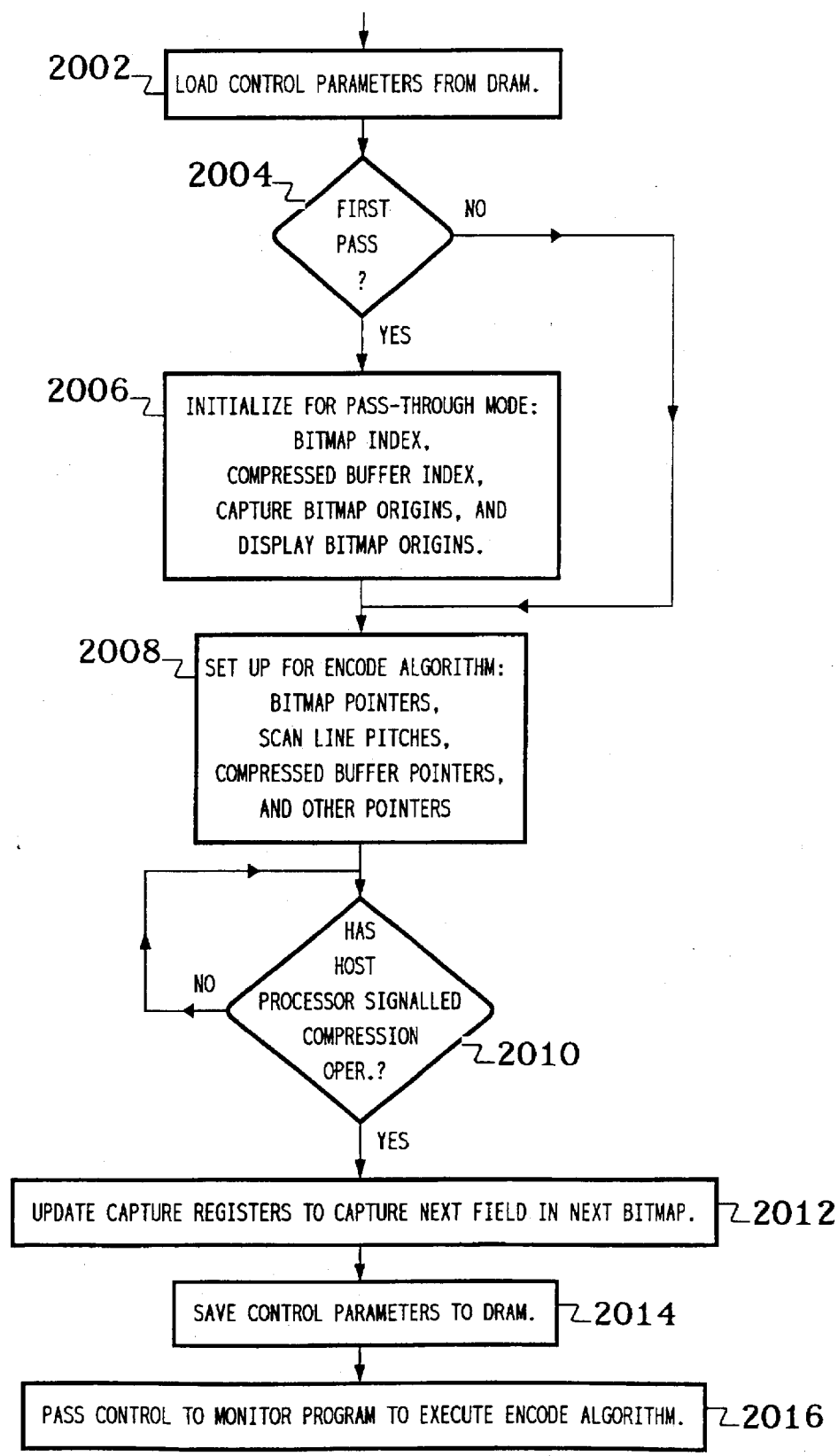
FIG. 20 is a process flow diagram of the algorithm set-up of the pixel processor compression driver of FIG. 19 for the compression mode processing of FIG. 17.

Referring now to FIG. 20, there is shown a process flow diagram of the algorithm set-up (block 1902 of FIG. 19) of the pixel processor compression driver for the compression mode processing of FIG. 17. The algorithm set-up performs the following functions before execution of the encode algorithm:

1. Loads control parameters from DRAM 408 into pixel processor 406 (block 2002 of FIG. 20);

2. Initializes bitmap and compressed buffer indices, capture interface 502 registers, and display interface 508 registers, for the first execution of the repeating decode loop of FIG. 19 (blocks 2004 and 2006);

3. Sets up bitmap pointers for Y, U, and V data in pixel processor 406 registers for use by the encode algorithm (block 2008). These pointers are calculated from the current bitmap index, the Y, U, and V bitmap queue bases, and the Y, U, and V bitmap pitches stored in the control parameters;

4. Sets up scan line pitches for Y, U, and V in pixel processor 406 registers for use by the encode algorithm (block 2008). These pitches are copied from the scan line pitches stored in the control parameters.

5. Sets up the compressed buffer pointers in pixel processor 406 registers for use by the encode algorithm (block 2008). These pointers are calculated from the compressed buffer index, the compressed buffer base, and the compressed buffer pitch stored in the control parameters;

6. Sets up other pointers needed by the encode algorithm, such as workspace pointers and parameter pointers, as calculated from or copied from the control parameters (block 2008);

7. Waits for the signal from host processor 302 to compress one full frame (block 2010);

8. Sets up pointers in capture interface 502 registers to be used to capture the next field of video data into the next bitmap in the queue in DRAM 408 (block 2012). These pointers are calculated from the bitmap index, the bitmap bases, and the bitmap pitches stored in the control parameters;

9. Stores control parameters back into DRAM 408 for later use (block 2014); and

10. Passes control of pixel processor 406 back to the monitor program (block 2016), which in turn loads and executes the encode algorithm.

Encode Algorithm of Pixel Processor Compression Control.

At block 1904 of FIG. 19, pixel processor 406 accesses the captured bitmap and companded reference bitmap from DRAM 408, compresses and compands the captured data, and stores the compressed bit stream and companded bitmap back to DRAM 408. In a preferred embodiment of the present invention, the pixel processor encode algorithm may be any encode code that executes on pixel processor 406 and uses the same parameter interface which is supported by the algorithm set-up. The encode algorithm preferably encodes one frame of captured video data.

Algorithm Follow-up of Pixel Processor Compression Control

Figure 21:
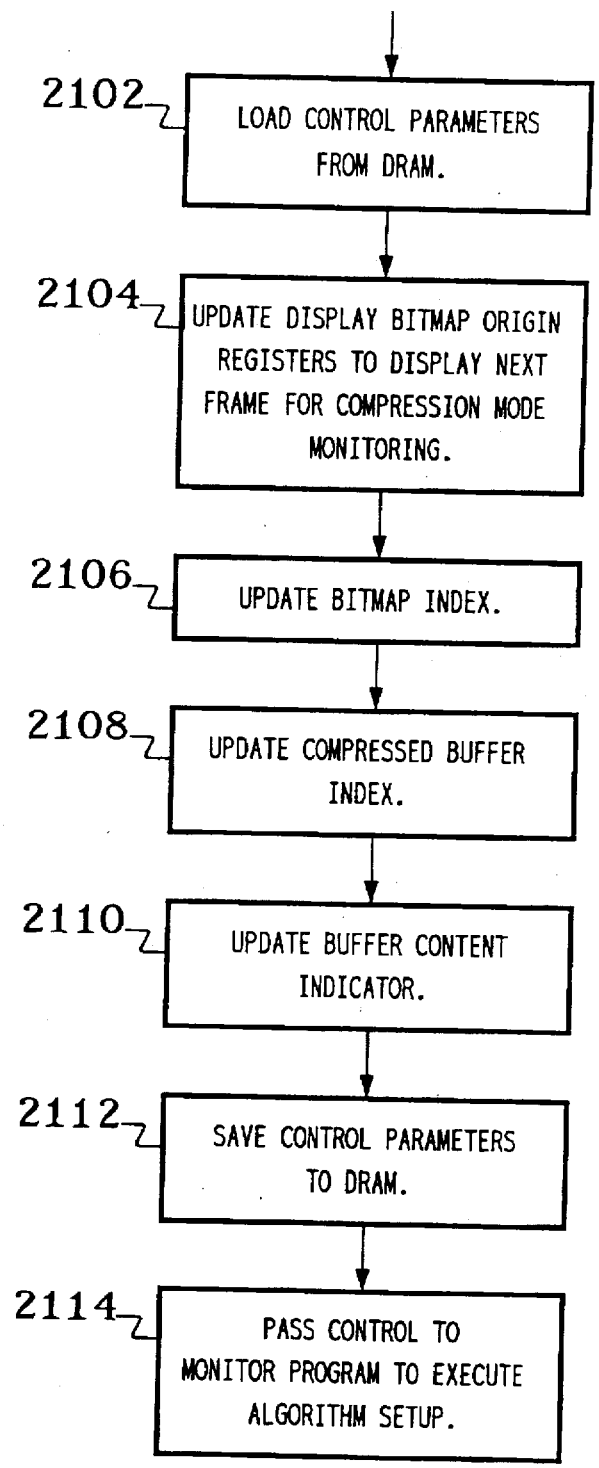
FIG. 21 is a process flow diagram of the algorithm follow-up of the pixel processor compression driver of FIG. 19 for the compression mode processing of FIG. 17.

Referring now to FIG. 21., there is shown a process flow diagram of the algorithm follow-up (block 1906 of FIG. 19) of the pixel processor compression driver for the compression mode processing of FIG. 17. The algorithm follow-up performs the following functions after execution of the encode algorithm:

1. Loads control parameters from DRAM 408 into pixel processor 406 (block 2102 of FIG. 21);
2. Updates display bitmap origin registers in video support component 404 to point to new bitmaps to be displayed (block 2104);
3. Updates bitmap index to point to the next bitmap in the bitmap queue (block 2106);
4. Updates compressed buffer index to point to the next buffer in the compressed buffer queue (block 2108);
5. Updates buffer content indicator for the compressed buffer just filled to indicate to host processor 302 how many compressed data bytes have been created by the encode algorithm and stored in the compressed buffer (block 2110);
6. Stores control parameters back into DRAM 408 for later use (block 2112); and
7. Passes control of pixel processor 406 back to the monitor program (block 2114), which in turn loads and executes the algorithm set-up.

Memory Map for Compression Mode Processing

Figure 22:
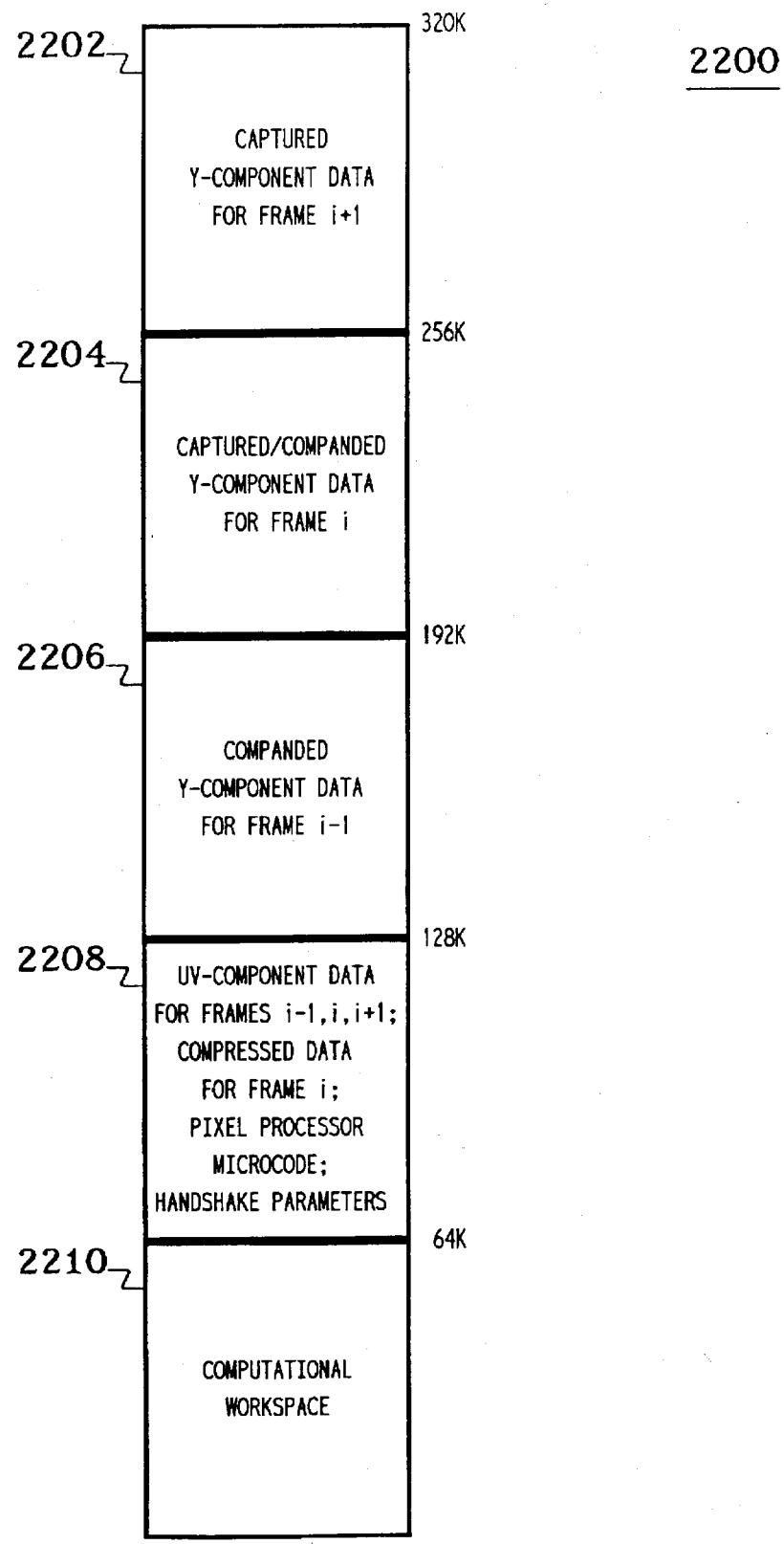
FIG. 22 represents the memory map in the DRAM of the video support component used by the video system of FIG. 3 to capture and compress video data.

Referring now to FIG. 22, there is depicted a representation of memory map 2200 in DRAM 408 used by video system 300 to capture and compress video data, when compression mode monitoring is selected. In a preferred embodiment in which a captured (256×240) frame of video data is in subsampled YUV9 format, memory map 2200 comprises five 64K memory blocks in DRAM 408. The Y-component data for video frame i+1 which is currently being captured is stored to block 2202.

Block 2204 contains the captured Y-component data for video frame i. Pixel processor 406 reads captured data from block 2204, compresses the captured data, and stores the compressed data for video frame i to block 2208. Pixel processor 406 also decompresses the compressed video data and stores the companded data for video frame i back to block 2204 overwriting the corresponding captured data.

Block 2206 contains the companded Y-component data for video frame i-1, which is used as a reference by pixel processor 406 in compressing video frame i. In addition to receiving the compressed data for video frame i, block 2208 contains the U- and V-component data for video frames i-1, i, and i+1 that corresponds to the Y-component data stored in blocks 2202, 2204, and 2206. Block 2208 also contains the microcode used by pixel processor 406 and certain handshake parameters. Block 2210 serves as computational work space for pixel processor 406.

FIG. 22 represents memory map 2200 at a particular point in the capture and compression processing of video system 300. Those skilled in the art will understand that blocks 2202, 2204, and 2206 function as a circular buffer for Y-component data. Thus, after video frame i is fully compressed and companded and after video frame i+1 is fully captured, then the companded bitmap for video frame i in block 2204 is used as a reference for compressing the captured bitmap for video frame i+1 in block 2202, while the captured data for video frame i+2 is stored to block 2206 overwriting the companded data for video frame i-1. The regions of block 2208 for U- and V-component data function similarly as circular buffers.

Those skilled in the art will understand that, if the raw captured data is to be displayed during compression mode, then a fourth buffer for video data is preferably provided in memory map 2200 to contain a stable raw image that is completely captured, but not yet companded.

Description of Playback Mode Processing

Figure 23:
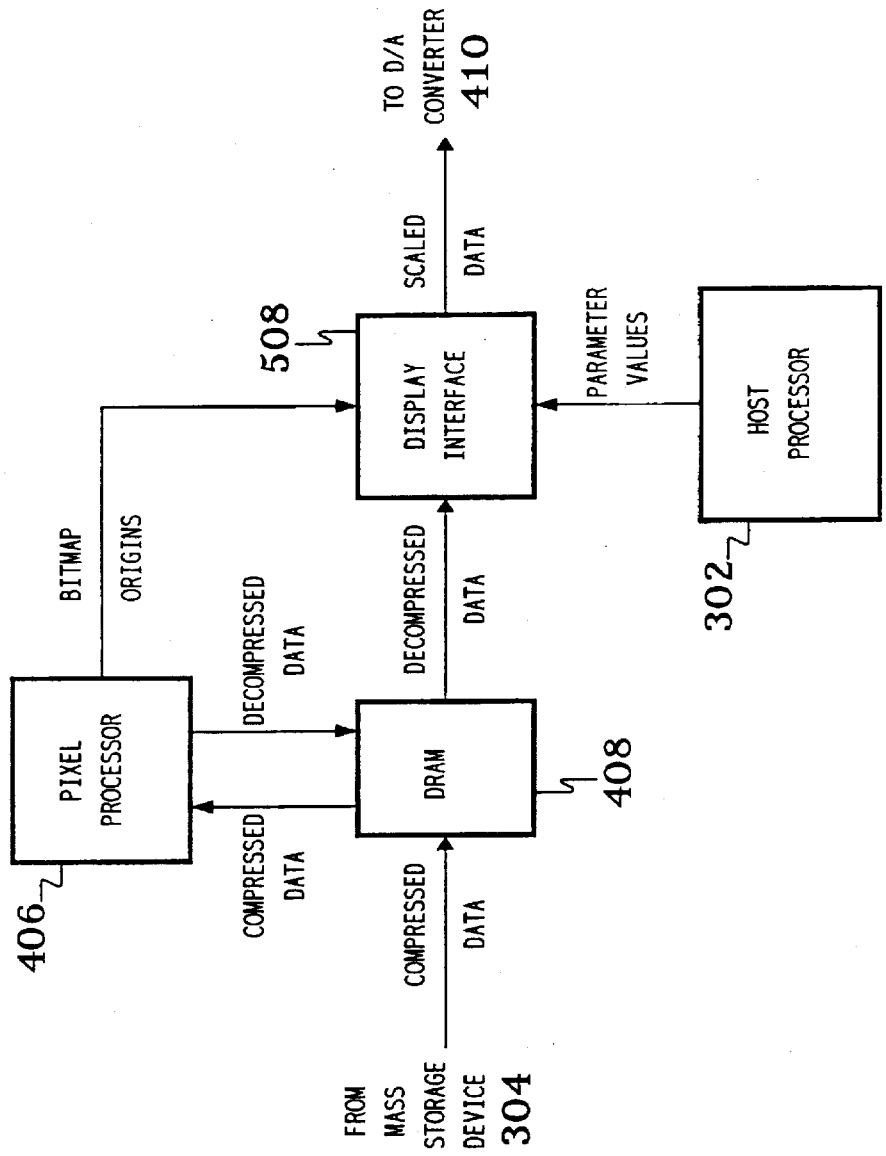
FIG. 23 is a block diagram of the playback mode processing of the video system of FIG. 3.

Referring now to FIG. 23, there is shown a block diagram of playback mode processing 2300 of video system 300.

FIG. 23 represents the distribution of processing functions for video playback and does not depict all hardware connections and interfaces. In a preferred embodiment of the present invention, control of playback mode processing is divided between host processor 302 and video support component 404. Host processor 302 is responsible for delivering compressed data into a compressed data buffer in DRAM 408 as well as the control of the size and position of the video window on display monitor 310. Video support component 404 is responsible for control of the decompression of the compressed data as well as the display of the decompressed images.

Compressed data from mass storage device 304 are stored as a compressed bit stream in DRAM 408. Pixel processor 406 accesses and decompresses the compressed data and stores the decompressed data back to DRAM 408 as a decompressed bitmap. Display interface 508 accesses and scales the decompressed bitmap for transmission to D/A converter 410 for eventual display on display monitor 310. The display processing of display interface 508 is dictated by control parameters stored in registers loaded by host processor 302. These control parameters include DDA ratios and other window location and size parameters. Pixel processor 406 informs display processor 508 of the location of the origin in DRAM 408 for the most recently completed decompressed bitmap.

More particularly, playback mode processing is implemented via host decompression driver which runs on host processor 302 and pixel processor decompression control which runs on pixel processor 406. The host decompression driver comprises an initialization function which initializes video subsystem 308 for decompression and display of a video frame, a data delivery function which delivers compressed data to DRAM 408, and a window control function which updates registers in video support component 404 that control the size and position of the video window. Pixel processor decompression control comprises algorithm set-up which sets up pixel processor 406 to decode (i.e., decompress) a video frame stored in DRAM 408, decode algorithm which decodes the video frame, and algorithm follow-up which updates bitmap origin registers in video support component 404 to provide for the display of the newly decoded frame. Pixel processor decompression control is repeated for each frame of video data.

Initialization Function of Most Decompression Driver

The initialization function of the host decompression driver loads DRAM 408 with the following code and parameters for use by pixel processor 406:

1. Pixel processor algorithm set-up;
2. Pixel processor decode algorithm;
3. Pixel processor algorithm follow-up;
4. Address list for pixel processor algorithm set-up, decode algorithm, and algorithm follow-up; and
5. Decode control parameters.

The decode control parameters consist of values that indicate memory allocation parameters, bitmap circular buffer parameters, bitmap characteristics parameters, and display timing parameters to the algorithm set-up and algorithm follow-up. The control parameters are pointed to by a value stored in a pixel processor 406 register, which is programmed initially by the initialization function.

The following memory allocation parameters indicate the location and size of blocks of data in DRAM 408:

1. Workspace origin;
2. Compressed data queue origin;
3. Compressed data queue size;

4. Y bitmap queue base;

5. U bitmap queue base;

6. V bitmap queue base;

7. Y bitmap pitch;

8. U bitmap pitch; and

9. V bitmap pitch.

Workspace in DRAM 408 is used by algorithms for temporary storage of data.

The bitmap circular buffer parameter (i.e., bitmap index) indicates the current position in the bitmap queues. Only one parameter is used, because the three components Y, U, and V track each other.

The following bitmap characteristics parameters describe the address differences from scan line to scan line of video component bitmaps in DRAM 408:

1. Y scan line pitch;

2. U scan line pitch; and

3. V scan line pitch.

The following are the two display timing parameters:

1. Decode time-per-frame; and

2. Display time-per-frame.

In addition, the initialization function loads a monitor program into the program memory of pixel processor 406. This monitor program walks down the address list, loads code pointed to by each address, and then passes control of pixel processor 406 to the code just loaded. In this way, the monitor program causes the algorithm set-up, decode algorithm, and algorithm follow-up to be loaded and executed in a repeating loop.

The initialization function also initializes the following permanent locations in the data memory of pixel processor 406:

1. Address list used by the monitor program;

2. Locations of decode control parameters;

3. Host queue pointer; and

4. Pixel processor queue pointer.

Data Delivery Function of Host Decompression Driver

Figure 24:
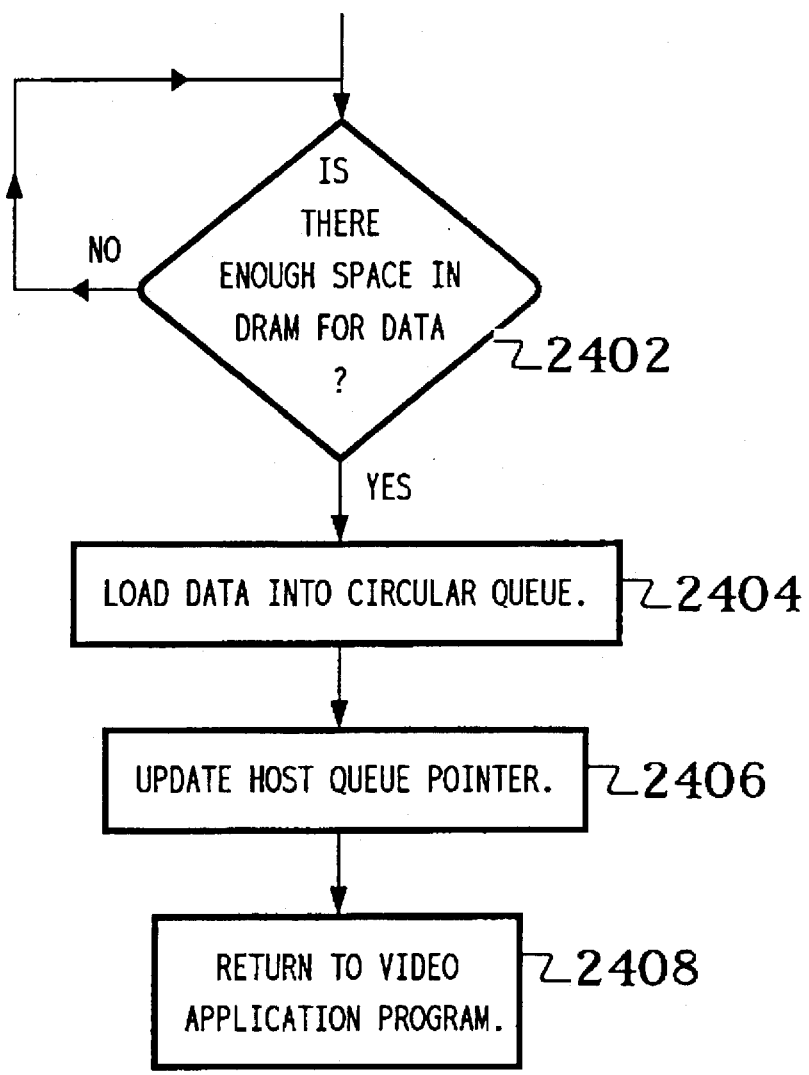
FIG. 24 is a process flow diagram of the data delivery function of the host decompression driver for the playback mode processing of FIG. 23.

Referring now to FIG. 24, there is shown a process flow diagram of the data delivery function of the host decompression driver for the playback mode processing of FIG. 23. The data delivery function is executed once for each block of compressed data delivered DRAM 408 by the video application software running on host processor 302. The data delivery function fills a circular buffer (i.e., queue) in DRAM 408 and uses the following two pointers to coordinate with the pixel processor decompression control:

1. Host queue pointer, which indicates the location of the next byte in the queue to be loaded by host processor 302; and 2. Pixel processor queue pointer, which indicates the location of the next byte in the queue to be used by pixel processor 406.

The difference in value between these two pointers is calculated to determine the amount of empty queue data space available in DRAM 408 to be filled by host processor 302. Since data must be loaded by host processor 302 before it can be consumed by pixel processor 406, host processor 302 is always ahead of pixel processor 406 in the circular queue.

Since the data is stored in a circular queue, if the host queue pointer is greater than the pixel processor queue pointer, then the amount of empty space is preferably calculated by subtracting the pixel processor queue pointer from the host queue pointer, and then subtracting that value from the size of the circular buffer. If, however, the host queue pointer is not greater than the pixel processor queue pointer, then the host queue pointer has wrapped around to the start of the circular buffer and the amount of empty space may be calculated by subtracting the host queue pointer from the pixel processor queue pointer.

The data delivery function waits until a sufficient amount of empty space is available (block 2402 of FIG. 24) before transferring the block of data from the video application software into the circular queue in DRAM 408 (block 2404) using standard data transfer techniques known to those skilled in the art. Once data is transferred, host processor 302 updates the host queue pointer to indicate how much data is now available for use by pixel processor 406 (block 2406) before returning control to the video application program (block 2408).

Window Control Function of Host Decompression Driver

The window control function of the host decompression driver is executed whenever the video application software determines that the video window on display monitor 310 needs to change size or position. The video application software delivers the new window parameters to the host decompression driver, indicating the size of the video window and its position on the display screen of display monitor 310. The video application software also delivers the decompressed bitmap size to the host decompression driver.

The window control function calculates the proper parameters to control the window parameter registers in video support component 404 and then loads these values into the corresponding hardware registers in video support component 404.

Pixel Processor Decompression Control

The pixel processor decompression control implements algorithm set-up, decode algorithm, and algorithm follow-up to decode video frames into a circular buffer of bitmaps. In a preferred embodiment of the present invention, the circular buffer of bitmaps contains only two bitmaps for each of the Y, U, and V components. For each component, one bitmap serves as the display bitmap as well as the reference bitmap for performing decoding based on frame differencing, while the other bitmap is written into by the decode algorithm to build the newly decoded bitmap.

This alternating bitmap scheme allows the decode process to proceed in a hidden fashion without being displayed to the viewer. Once a bitmap has been decoded, the pixel processor decompression control determines when to switch the bitmaps to display the newly decoded bitmap. The previously displayed bitmap may then be hidden and used to build the next decoded bitmap.

The current bitmaps for Y, U, and V are indicated by the bitmap index. The origins of the current bitmaps are preferably calculated using the following formula:

Bitmap Origin=Bitmap Queue Base+(Bitmap Index×Bitmap Pitch)

The pixel processor decompression control maintains a time value in the control parameters. After executing the decode algorithm, whenever the time value is greater than zero, the algorithm follow-up will change the display bitmaps by loading new values into the bitmap origin registers in video support component 404.

The pixel processor decompression control increments the time value by a multiple of the display time-per-frame value when the pixel processor decompression control detects a change in the display field counter, which is preferably a hardware counter. The display field counter indicates the progression of display fields to display monitor 310. Every time a vertical sync pulse is issued to display monitor 310 (to retrace the raster to the top of the display), the field counter increments by one. Because multiple fields can be displayed while executing the decode algorithm, the pixel processor decompression control detects the change in the display field counter since the last check of the display field counter, and preferably increments time using the following formula:

(Current Field Count−Previous Field Count)×Display Time-Per-Field

The pixel processor decompression control decrements the time value by the decode time-per-frame value after loading new values into the bitmap origin registers to change the display updates.

This digital time accumulation scheme regulates the periodic display of decoded video at arbitrary frame rates using the display field rate as a controlling clock.

Figure 25:
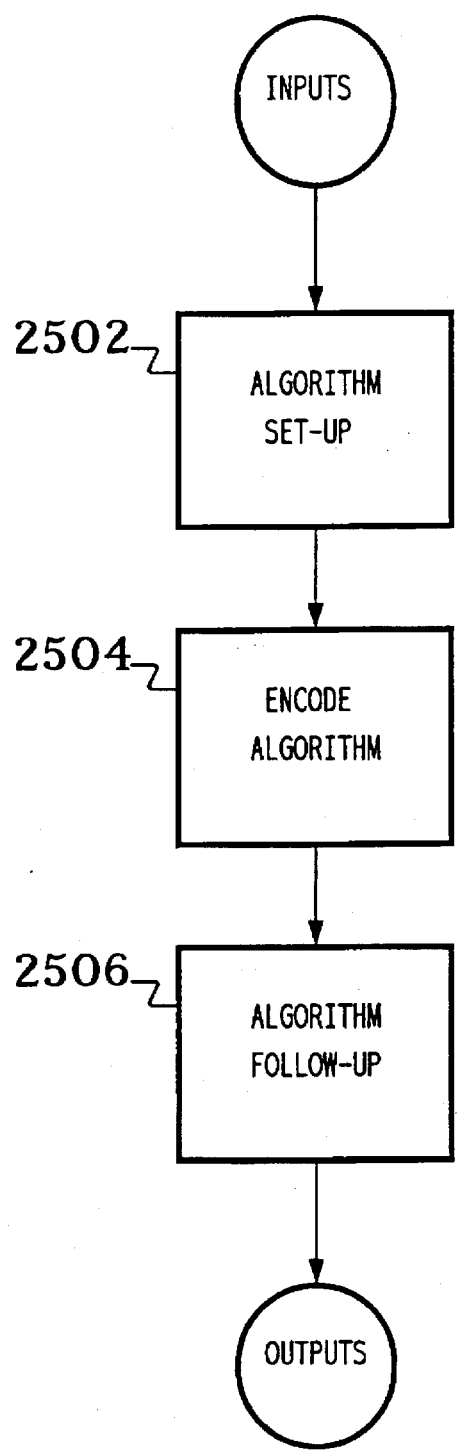
FIG. 25 is a process flow diagram of the pixel processor decompression control implemented by the pixel processor of the video support component of FIG. 5 to decode one frame of video data.

Referring now to FIG. 25, there is shown a process flow diagram of the pixel processor decompression control implemented by pixel processor 406 to decode (i.e., decompress) one frame of video data stored as a compressed bit stream in DRAM 408. The pixel processor decompression control implements algorithm set-up (block 2502 of FIG. 25), decode algorithm (block 2504), and algorithm follow-up (block 2506).

Algorithm Set-up of Pixel Processor Decompression Control

Figure 26:
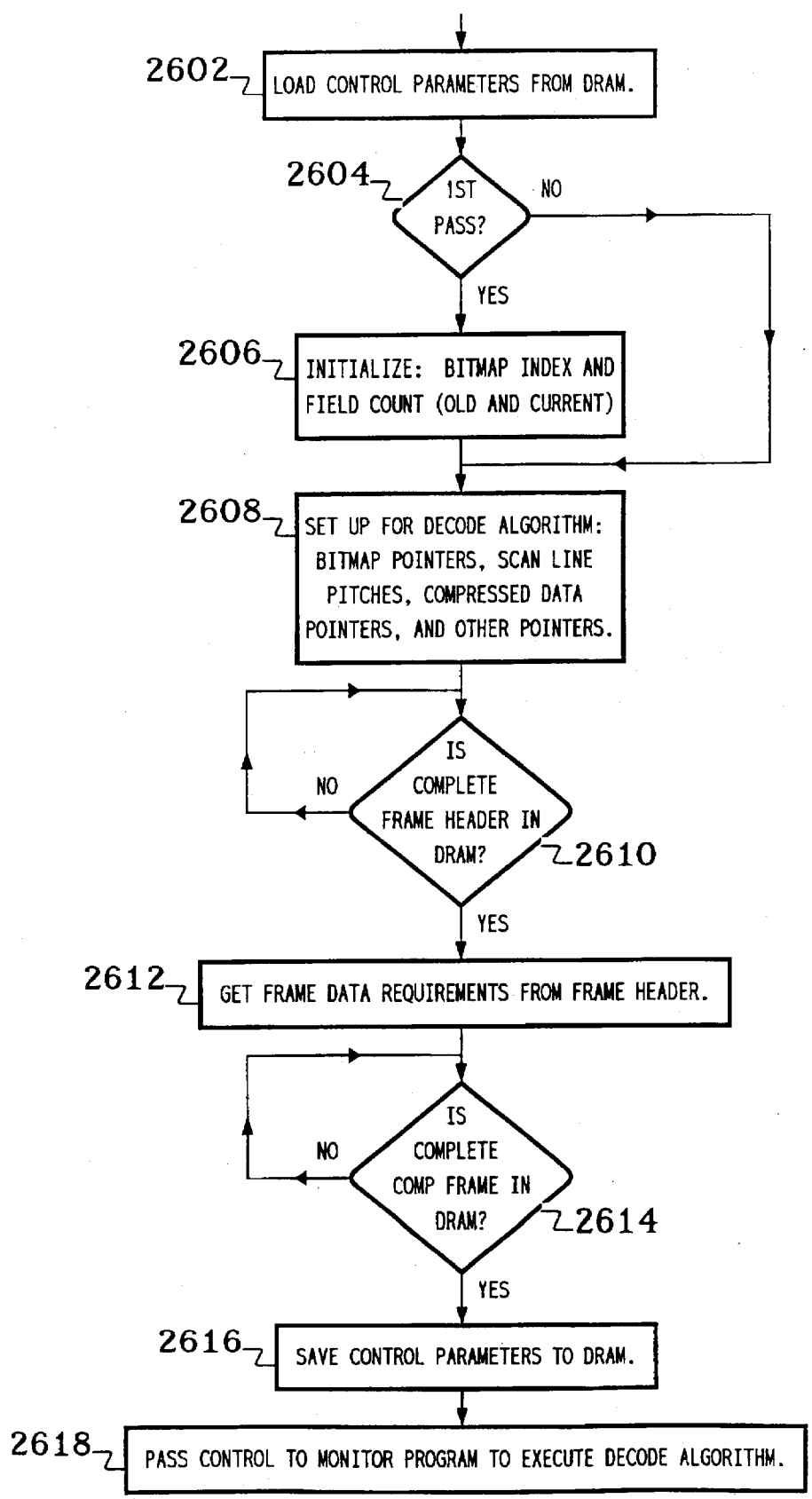
FIG. 26 is a process flow diagram of the algorithm set-up of the pixel processor decompression driver of FIG. 25 for the playback mode processing of FIG. 23.

Referring now to FIG. 26, there is shown a process flow diagram of the algorithm set-up (block 2502 of FIG. 25) of the pixel processor decompression driver for the playback mode processing of FIG. 23. The algorithm set-up performs the following functions before execution of the decode algorithm:

1. Loads control parameters from DRAM 408 into pixel processor 406 (block 2602 of FIG. 26);
2. Initializes bitmap index and field count parameters for the first execution of the repeating decode loop of FIG. 25 (blocks 2604 and
3. Sets up bitmap pointers for Y, U, and V data in pixel processor 406 registers for use by the decode algorithm (block 2608). These pointers are calculated from the current bitmap index, the Y, U, and V bitmap queue bases, and the Y, U, and V bitmap pitches stored in the control parameters;
4. Sets up scan line pitches for Y, U, and V in pixel processor 406 registers for use by the decode algorithm (block 2608). Those skilled in the art will understand that, if U and V have the same bitmap characteristics, then a single scan line pitch value may be used for both U and V. These pitches are copied from scan line pitches stored in the control parameters;
5. Sets up the compressed data pointers in pixel processor 406 registers as calculated from the pixel processor queue pointer in a pixel processor 406 data register (block 2608);
6. Sets up other pointers needed by the decode algorithm, such as workspace pointers and parameter pointers, as calculated from or copied from the control parameters (block 2608);
7. Waits for sufficient data to be available in the compressed data queue to decompress one full frame (blocks 2610, 2612, and 2614);
8. Stores control parameters back into DRAM 408 for later use (block 2616); and
9. Passes control of pixel processor 406 back to the monitor program (block 2618), which in turn loads and executes the decode algorithm.

Decode Algorithm of Pixel Processor Decompression Control

At block 2504 of FIG. 25, pixel processor 406 accesses the compressed bit stream and decompressed reference bitmap from DRAM 408, decompresses the compressed data, and stores the decompressed bitmap back to DRAM 408. In a preferred embodiment of the present invention, the decode algorithm may be any decode code that executes on pixel processor 406 and uses the same parameter interface which is supported by the algorithm set-up. The decode algorithm preferably decodes one frame of compressed video data.

Algorithm Follow-up of Pixel Processor Decompression Control

Figure 27:
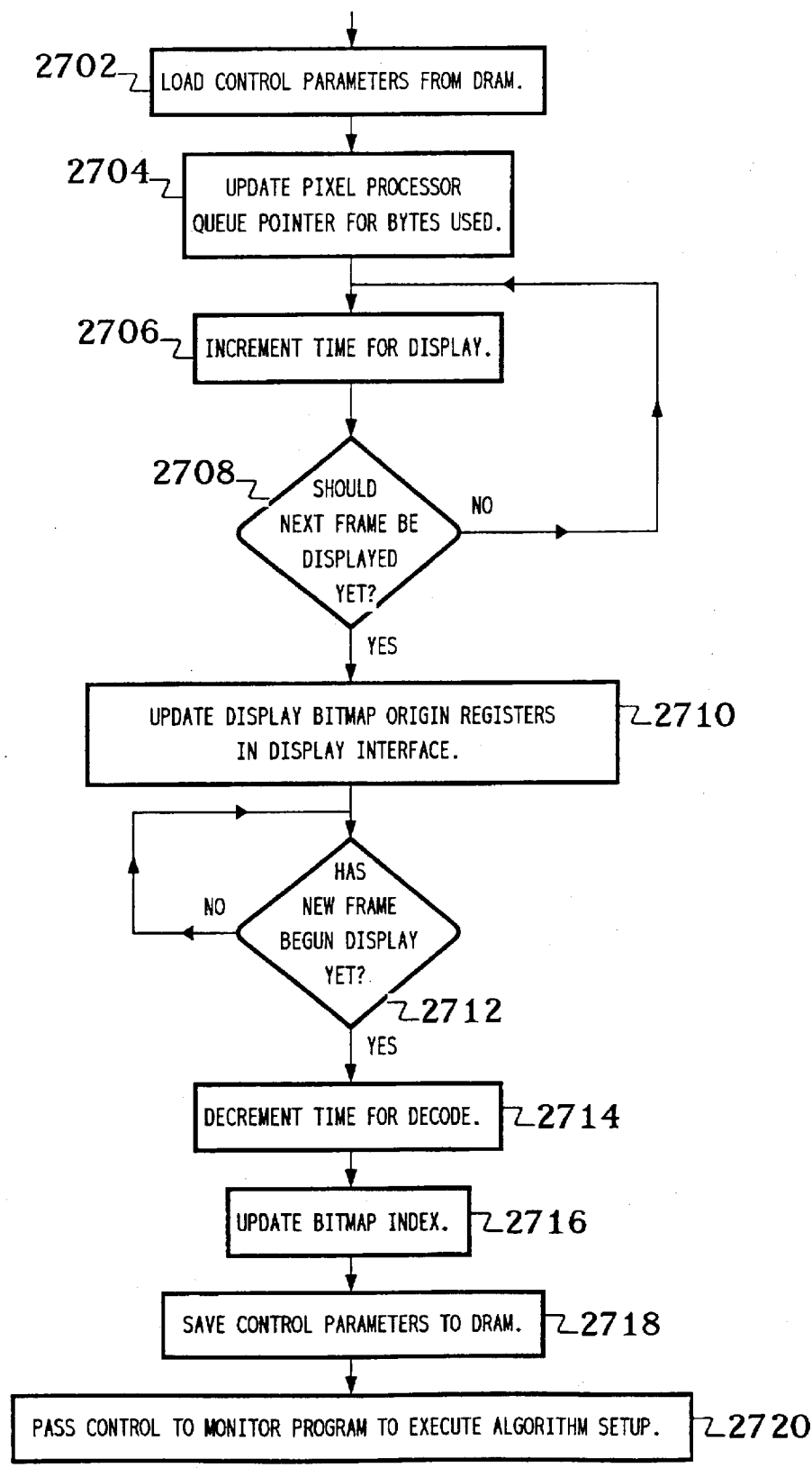
FIG. 27 is a process flow diagram of the algorithm follow-up of the pixel processor decompression driver of FIG. 25 for the playback mode processing of FIG. 23.

Referring now to FIG. 27, there is shown a process flow diagram of the algorithm follow-up (block 2506 of FIG. 25) of the pixel processor decompression driver for the playback mode processing of FIG. 23. The algorithm follow-up performs the following functions after execution of the decode algorithm:

1. Loads control parameters from DRAM 408 into pixel processor 406 (block 2702 of FIG. 27);
2. Updates pixel processor queue pointer in a pixel processor 406 data register to indicate the number of bytes used by the decode algorithm (block 2704);
3. Increments time to reflect the number of display fields since the of display update (block 2706);
4. Waits for time to indicate that the next bitmap should be displayed (block 2708);
5. Updates display bitmap origin registers in video support component 404 to point to new bitmaps to be displayed (block 2710);
6. Waits for display of new bitmap to begin as indicated by the changing of the field count (block 2712);
7. Decrements time by the specified decode time-per-frame value (block 2714);
8. Updates bitmap index to point to the next bitmap in the bitmap queue (block 2716);
9. Stores control parameters back into DRAM 408 for later use (block 2718); and
10. Passes control of pixel processor 406 back to the monitor program (block 2720), which in turn loads and executes the algorithm set-up.

Memory Map for Playback Mode Processing

Figure 28:
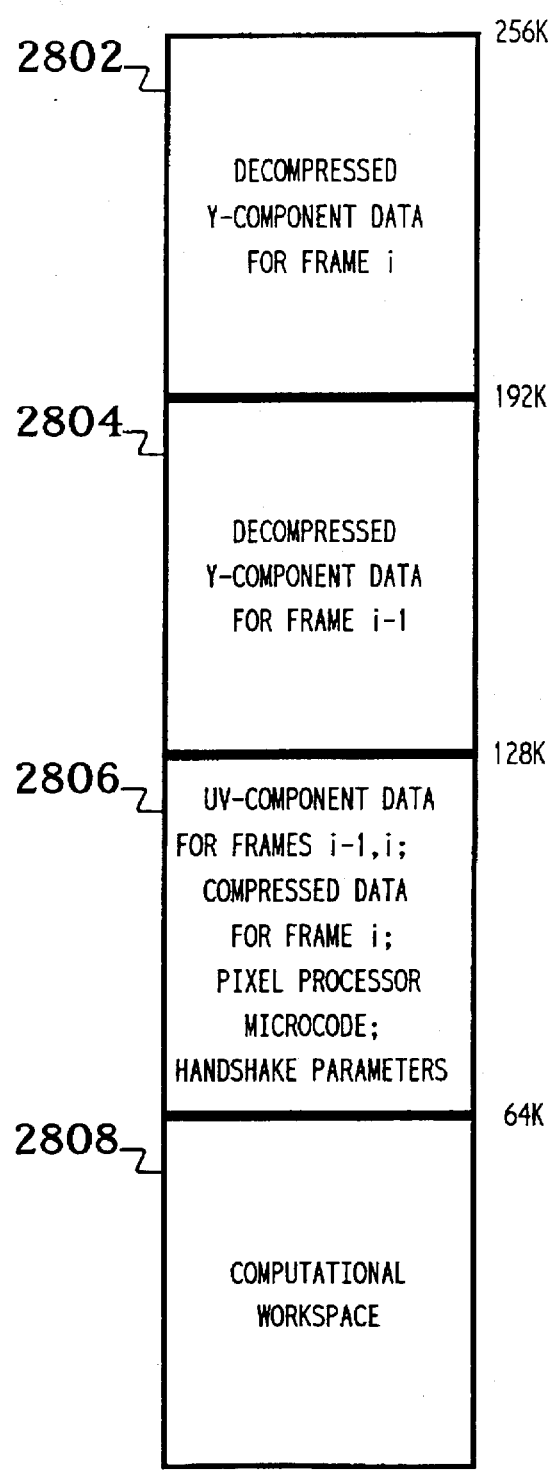
FIG. 28 represents the memory map in the DRAM of the video support component used by the video system of FIG. 3 to decompress and display video data.

Referring now to FIG. 28, there is depicted a representation of memory map 2800 in DRAM 408 used by video system 300 to decompress and display video data. In a preferred embodiment in which a decompressed (256×240) frame of video data is in subsampled YUV9 format, memory map 2800 comprises four 64K memory blocks in DRAM 408. Blocks 2802 and 2804 function as a circular buffer for decompressed Y-component data. For example, in FIG. 28, the decompressed Y-component data for video frame i is written to block 2802, while block 2804 contains the decompressed Y-component data for video frame i-1, which is used as a reference for decoding the compressed bit stream for video frame i, which is stored in block 2806.

Block 2806 also contains the U- and V-component data for video frames i and i-1, the microcode used by pixel processor 406, and certain handshake parameters. Block 2808 serves as computational work space for pixel processor 406.

Those skilled in the art will understand that alternative preferred embodiments of the present invention may be designed to process video data other than subsampled YUV9 data. For example, other video systems according to the present invention process data in full-resolution YUV format, subsampled YUV12 or YUV16 format, and/or formats based on other component schemes such as YIQ or RGB format. It will also be understood by those skilled in the art that the present invention may be used to generate images other than video images, such as still images, graphics, or animation.

Those skilled in the art will also understand that alternative preferred embodiments of the present invention may provide for the concurrent display of two or more video windows on the same or different display monitors.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for horizontally scaling image signals, comprising the steps of:

(a) receiving a plurality of image signals corresponding to an image;

(b) generating one or more first-sum signals using a processor by adding together one or more pairs of image signals;

(c) generating one or more second-sum signals using the processor by adding together one or more pairs of the first-sum signals;

(d) generating one or more first-average signals using the processor in accordance with the first-sum signals;

(e) generating one or more second-average signals using the processor in accordance with the second-sum signals; and (f) selectively storing the image signals, the first-average signals, and the second-average signals into a plurality of registers in accordance with the selection of a mode of operation of a plurality of modes of operation, wherein:

step (a) comprises the step of receiving a first set of image signals mem0, mem1, mem2, and mem3 corresponding to a row of the image;

step (b) comprises the steps of;
   (1) generating a first-sum signal sum2lo by adding the image signals mem0 and meta1; and
   (2) generating a first-sum signal sum2hi by adding the image signals mem2 and mem3;

step (c) comprises the step of generating a second-sum signal sum4 by adding the first-sum signals sum2lo and sum2hi;

step (d) comprises the steps of:
   (1) generating a first-average signal ave2lo by shifting the first-sum signal sum2lo right one bit; and
   (2) generating a first-average signal ave2hi by shifting the first-sum signal sum2hi right one bit;

step (e) comprises the step of generating a second-average signal ave4 by shifting the first-average signal sum4 right two bits;

step (f) comprises the steps of;
   (1) storing the image signal mem0 in a first register, the image signal mem1 in a second register, the image signal mem2 in a third register, and the image signal mem3 in a fourth register, in accordance with the selection of 1:1 scaling;
   (2) storing the first-average signal ave2lo in the first register and the first-average signal ave2hi in the second register, repeating steps (a)–(e) for a second set of image signals mem0, mem1, mem2, and mem3 of the image, and storing the first-average signal ave2lo in the third register and the first-average signal ave2hi in the fourth register, in accordance with the selection of 2:1 scaling; and
   (3) storing the second-average signal ave4 in the first register, repeating steps (a)–(e) for a second set of image signals mem0, mem1, mem2, and mem3 of the image, storing the second-average signal ave4 in the second register, repeating steps (a)–(e) for a third set of image signals mem0, mem1, mem2, and mem3 of the image, storing the second-average signal ave4 in the third register, repeating steps (a)–(e) for a fourth set of image signals mem0, mem1, mem2, and mem3 of the image, and storing the second-average signal ave4 in the fourth register, in accordance with the selection of 4:1 scaling.

2. The method of claim 1, further comprising the step of displaying the image in accordance with the signals stored in the first, second, third, and fourth registers.

3. The method of claim 1, further comprising the step of displaying the image in accordance with the signals stored in the plurality of registers.

4. An apparatus for horizontally scaling image signals, comprising:

(a) means for generating one or more first-sum signals by adding together one or more pairs of image signals corresponding to an image;

(b) means for generating one or more second-sum signals by adding together one or more pairs of the first-sum signals;

(c) means for generating one or more first-average signals in accordance with the first-sum signals;

(d) means for generating one or more second-average signals in accordance with the second-sum signals; and (e) means for selectively storing the image signals, the first-average signals, and the second-average signals into a plurality of registers in accordance with the selection of a mode of operation of a plurality of modes of operation, wherein:

means (a) comprises:
   (1) means for generating a first-sum signal sum2lo by adding image signals mem0 and mem1 of a first set of image signals mem0, mem1, mem2, and mem3 corresponding to a row of the image; and
   (2) means for generating a first-sum signal sum2hi by adding the image signals mem2 and mem3;

means (b) generates a second-sum signal sum4 by adding the first-sum signals sum2lo and sum2hi;

means (c) comprises:
   (1) means for generating a first-average signal ave2lo by shifting the first-sum signal sum2lo right one bit; and
   (2) means for generating a first-average signal ave2hi by shifting the first-sum signal sum2hi right one bit;

means (d) generates a second-average signal ave4 by shifting the first-average signal sum4 right two bits;

means (e) comprises:
   (1) means for storing the image signal mem0 in a first register, the image signal me1 in a second register, the image signal mem2 in a third register, and the image signal mem3 in a fourth register, in accordance with the selection of 1:1 scaling;

(2) means for storing the first-average signal ave2lo in the first register and the first-average signal ave2hi in the second register, wherein the processing of means (a)–(d) is repeated for a second set of image signals mem0, mem1, mem2, and mem3 of the image, and means (e)(2) stores the first-average signal ave2lo in the third register and the first-average signal ave2hi in the fourth register, in accordance with the selection of 2:1 scaling; and (3) means for storing the second-average signal ave4 in the first register, wherein the processing of means (a)–(e) is repeated for a second set of image signals mem0, mem1, mem2, and mem3 of the image, means (e)(3) stores the second-average signal ave4 in the second register, the processing of means (a)–(d) is repeated for a third set of image signals mem0, mem1, mem2, and mem3 of the image, means (e)(3) stores the second-average signal ave4 in the third register, the processing of means (a)–(d) is repeated for a fourth set of image signals mem0, mem1, mem2, and mem3 of the image, and means (e)(3) stores the second-average signal ave4 in the fourth register, in accordance with the selection of 4:1 scaling.

5. The apparatus of claim 4, wherein the image is displayed on a display monitor in accordance with the signals stored in the first, second, third, and fourth registers.

6. The apparatus of claim 4, wherein the image is displayed on a display monitor in accordance with the signals stored in the plurality of registers.

7. A horizontal scaler for horizontally scaling image signals, comprising:

(a) one or more first-sum adders for generating one or more first-sum signals by adding together one or more pairs of image signals corresponding to an image;

(b) one or more second-sum adders for generating one or more second-sum signals by adding together one or more pairs of the first-sum signals;

(c) one or more first-average shifters for generating one or more first-average signals in accordance with the first-sum signals;

(d) one or more second-average shifters for generating one or more second-average signals in accordance with the second-sum signals; and (e) means for selectively storing the image signals, the first-average signals, and the second-average signals into a plurality of registers in accordance with the selection of a mode of operation of a plurality of modes of operation, wherein:

the one or more first-sum adders comprises:
(1) a first adder for generating first-sum signals sum2lo by adding image signals mem0 and mem1 of the image; and
(2) a second adder for generating a first-sum signals sum2hi by adding image signals mem2 and mem3 of the image;

the one or more second-sum adders comprises a third adder for generating second-sum signals sum4 by adding the first-sum signals sum2lo and sum2hi;

the one or more first-average shifters comprises:
(1) a first shifter for generating first-average signals ave2lo by shifting the first-sum signals sum2lo right one bit; and
(2) a second shifter for generating first-average signals ave2hi by shifting the first-sum signals sum2hi right one bit;

the one or more second-average shifters comprises a third shifter for generating second-average signals ave4 by shifting the first-average signals sum4 right two bits;

means (e) comprises:
(1) a first multiplexer;
(2) a second multiplexer;
(3) a third multiplexer;
(4) a fourth multiplexer;
(5) a first register;
(6) a second register;
(7) a third register; and
(8) a fourth register, wherein:

the first multiplexer receives the image signals mem3, a first subset of the first-average signals ave2hi, and a first subset of the second-average signals ave4;

the second multiplexer receives the image signals mem2, a first subset of the first-average signals ave2lo, and a second subset of the second-average signals ave4;

the third multiplexer receives the image signals mem1, a second subset of the first-average signals ave2hi, and a third subset of the second-average signals ave4;

the fourth multiplexer receives the image signals mem0, a second subset of the first-average signals ave2lo, and a fourth subset of the second-average signals ave4;

when 1:1 sealing is selected:
the first multiplexer transmits the image signals mem3 to the first register;
the second multiplexer transmits the image signals mem2 to the second register;
the third multiplexer transmits the image signals mem1 to the third register;
the fourth multiplexer transmits the image signals mem0 to the fourth register;

when 2:1 scaling is selected;
the first multiplexer transmits the first subset of the first-average signals ave2hi to the first register;
the second multiplexer transmits the first subset of the first-average signals ave2lo to the second register;
the third multiplexer transmits the second subset of the first-average signals ave2hi to the third register;
the fourth multiplexer transmits the second subset of the first-average signals ave2lo to the fourth register;

when 4:1 scaling is selected:
the first multiplexer transmits the first subset of the second-average signals ave4 to the first register;
the second multiplexer transmits the second subset of the second-average signals ave4 to the second register;
the third multiplexer transmits the third subset of the second-average signals ave4 to the third register; and
the fourth multiplexer transmits the fourth subset of the second-average signals ave4 to the fourth register.

8. The horizontal scaler of claim 7, wherein the image is displayed on a display monitor in accordance with the signals stored in the first, second, third, and fourth registers.

9. The horizontal scaler of claim 7, further comprising a controller for controlling the operations of the first, second, third, and fourth multiplexers and the first, second, third, and fourth registers.

10. The horizontal scaler of claim 7, wherein the image is displayed on a display monitor in accordance with the signals stored in the plurality of registers.

11. A subsystem for processing image signals, comprising:
   (a) an external memory device; and
   (b) a horizontal scaler, electrically connected to the external memory device, wherein the horizontal scaler comprises:
      (1) one or more first-sum adders for generating one or more first-sum signals by adding together one or more pairs of image signals corresponding to an image;
      (2) one or more second-sum adders for generating one or more second-sum signals by adding together one or more pairs of the first-sum signals;
      (3) one or more first-average shifters for generating one or more first-average signals in accordance with the first-sum signals;
      (4) one or more second-average shifters for generating one or more second-average signals in accordance with the second-sum signals; and
      (5) means for selectively storing the image signals, the first-average signals, and the second-average signals into a plurality of registers in accordance with the selection of a mode of operation of a plurality of modes of operation, wherein;
      the one or more first-sum adders comprises:
         (i) a first adder for generating first-sum signals sum2lo by adding image signals mem0 and mem1 of the image; and
         (ii) a second adder for generating a first-sum signals sum2hi by adding image signals mem2 and mem3 of the image;
      the one or more second-sum adders comprises a third adder for generating second-sum signals sum4 by adding the first-sum signals sum2lo and sum2hi;
      the one or more first-average shifters comprises:
         (i) a first shifter for generating first-average signals ave2lo by shifting the first-sum signals sum2lo right one bit; and
         (ii) a second shifter for generating first-average signals ave2hi by shifting the first-sum signals sum2hi right one bit;
      the one or more second-average shifters comprises a third shifter for generating second-average signals ave4 by shifting the first-average signals sum4 right two bits;
      means (5) comprises:
         (i) a first multiplexer;
         (ii) a second multiplexer;
         (iii) a third multiplexer;
         (iv) a fourth multiplexer;
         (v) a first register;
         (vi) a second register;
         (vii) a third register; and
         (viii) a fourth register, wherein:
      the first multiplexer receives the image signals mem3, a first subset of the first-average signals ave2hi, and a first subset of the second-average signals ave4;
      the second multiplexer receives the image signals mem2, a first subset of the first-average signals ave2lo, and a second subset of the second-average signals ave4;
      the third multiplexer receives the image signals mem1, a second subset of the first-average signals ave2hi, and a third subset of the second-average signals ave4;
      the fourth multiplexer receives the image signals mem0, a second subset of the first-average signals ave2lo, and a fourth subset of the second-average signals ave4;
      when 1:1 scaling is selected:
         the first multiplexer transmits the image signals mem3 to the first register;
         the second multiplexer transmits the image signals mem2 to the second register;
         the third multiplexer transmits the image signals mem1 to the third register;
         the fourth multiplexer transmits the image signals mem0 to the fourth register;
      when 2:1 scaling is selected:
         the first multiplexer transmits the first subset of the first-average signals ave2hi to the first register;
         the second multiplexer transmits the first subset of the first-average signals ave2lo to the second register;
         the third multiplexer transmits the second subset of the first-average signals ave2hi to the third register;
         the fourth multiplexer transmits the second subset of the first-average signals ave2lo to the fourth register;
      when 4:1 scaling is selected:
         the first multiplexer transmits the first subset of the second-average signals ave4 to the first register;
         the second multiplexer transmits the second subset of the second-average signals ave4 to the second register;
         the third multiplexer transmits the third subset of the second-average signals ave4 to the third register; and
         the fourth multiplexer transmits the fourth subset of the second-average signals ave4 to the fourth register.

12. The subsystem of claim 11, wherein the image is displayed on a display monitor in accordance with the signals stored in the first, second, third, and fourth registers.

13. The subsystem of claim 11, wherein the horizontal scaler further comprises a controller for controlling the operations of the first, second, third, and fourth multiplexers and the first, second, third, and fourth registers.

14. The subsystem of claim 11, wherein the image is displayed on a display monitor in accordance with the signals stored in the plurality of registers.

15. A system for processing image signals, comprising:
   (a) a host processor; and
   (b) an image processing subsystem, electrically connected to the host processor, wherein the image processing subsystem comprises:
      (1) an external memory device; and
      (2) a horizontal scaler, electrically connected to the external memory device, wherein the horizontal scaler comprises:
         (i) one or more first-sum adders for generating one or more first-sum signals by adding together one or more pairs of image signals corresponding to an image;
         (ii) one or more second-sum adders for generating one or more second-sum signals by adding together one or more pairs of the first-sum signals;
         (iii) one or more first-average shifters for generating one or more first-average signals in accordance with the first-sum signals;
         (iv) one or more second-average shifters for generating one or more second-average signals in accordance with the second-sum signals; and (v) means for selectively storing the image signals, the first-average signals, and the second-average signals into a plurality of registers in accordance with the selection of a mode of operation of a plurality of modes of operation, wherein:

the one or more first-sum adders comprises:
(a) a first adder for generating first-sum signals sum2lo by adding image signals mem0 and mem1 of the image; and
(b) a second adder for generating a first-sum signals sum2hi by adding image signals mem2 and mem3 of the image;

the one or more second-sum adders comprises a third adder for generating second-sum signals sum4 by adding the first-sum signals sum2lo and sum2hi;

the one or more first-average shifters comprises:
(a) first shifter for generating first-average signals ave2lo by shifting the first-sum signals sum2lo right one bit; and
(b) a second shifter for generating first-average signals ave2hi by shifting the first-sum signals sum2hi right one bit;

the one or more second-average shifters comprises a third shifter for generating second-average signals ave4 by shifting the first-average signals sum4 right two bits;

means (v) comprises:
(a) a first multiplexer;
(b) a second multiplexer;
(c) a third multiplexer;
(d) a fourth multiplexer;
(e) a first register;
(f) a second register;
(g) a third register; and
(h) a fourth register, wherein:

the first multiplexer receives the image signals mem3, a first subset of the first-average signals ave2hi, and a first subset of the second-average signals ave4;

the second multiplexer receives the image signals mem2, a first subset of the first-average signals ave2lo, and a second subset of the second-average signals ave4;

the third multiplexer receives the image signals mem1, a second subset of the first-average signals ave2hi, and a third subset of the second-average signals ave4;

the fourth multiplexer receives the image signals mem0, a second subset of the first-average signals ave2lo, and a fourth subset of the second-average signals ave4;

when 1:1 scaling is selected:
the first multiplexer transmits the image signals mem3 to the first register;
the second multiplexer transmits the image signals mem2 to the second register;
the third multiplexer transmits the image signals mem1 to the third register;
the fourth multiplexer transmits the image signals mem0 to the fourth register;

when 2:1 scaling is selected:
the first multiplexer transmits the first subset of the first-average signals ave2hi to the first register;
the second multiplexer transmits the first subset of the first-average signals ave2lo to the second register;
the third multiplexer transmits the second subset of the first-average signals ave2hi to the third register;
the fourth multiplexer transmits the second subset of the first-average signals ave2lo to the fourth register;

when 4:1 scaling is selected:
the first multiplexer transmits the first subset of the second-average signals ave4 to the first register;
the second multiplexer transmits the second subset of the second-average signals ave4 to the second register;
the third multiplexer transmits the third subset of the second-average signals ave4 to the third register; and
the fourth multiplexer transmits the fourth subset of the second-average signals ave4 to the fourth register.

16. The system of claim 15, wherein the image is displayed on a display monitor in accordance with the signals stored in the first, second, third, and fourth registers.

17. The system of claim 15, wherein the horizontal scaler further comprises a controller for controlling the operations of the first, second, third, and fourth multiplexers and the first, second, third, and fourth registers.

18. The system of claim 15, wherein the image is displayed on a display monitor in accordance with the signals stored in the plurality of registers.

* * * * *